United States Patent [19]

Anderson

[11] 3,825,900
[45] July 23, 1974

[54] TEXTILE MACHINES
[75] Inventor: John Ernest Anderson, Wednesfield, England
[73] Assignee: Midland Industrial Computing Limited, Birmingham, England
[22] Filed: June 28, 1972
[21] Appl. No.: 267,260

[30] Foreign Application Priority Data
June 29, 1971 Great Britain.................. 30322/71
Oct. 20, 1971 Great Britain.................. 48758/71

[52] U.S. Cl...................... 340/172.5, 66/25, 444/1
[51] Int. Cl............................................ D04b 15/66
[58] Field of Search................... 340/172.5; 66/25

[56] References Cited
UNITED STATES PATENTS
3,328,566 6/1967 Kinzie et al................ 340/172.5 X
3,377,622 4/1968 Burch, Jr. et al............ 340/172.5
3,651,484 3/1972 Smeallie...................... 340/172.5
3,670,153 6/1972 Rempert et al............. 235/151.11

FOREIGN PATENTS OR APPLICATIONS
1,194,731 6/1970 Great Britain................ 235/151.1
2,004,194 1/1970 Germany..................... 235/151.1

Primary Examiner—Eugene G. Botz
Attorney, Agent, or Firm—Darby & Darby

[57] ABSTRACT

The invention relates to the combination of a stored program digital computer and a textile producing machine having electromechanical actuators. The combination including one or more hardware buffers, each hardware buffer being associated with one or more of said actuators, the logic unit of the computer supplying information selectively to one or more hardware buffers at a particular point or points in the cycle of operation of the machine according to the operation of the machine.

54 Claims, 20 Drawing Figures

BUFFER 12

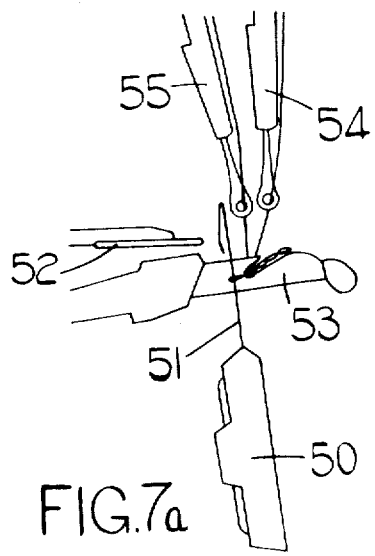
FIG.7a
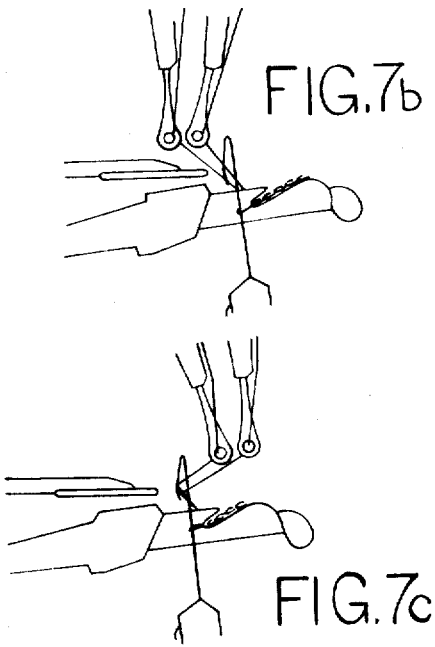
FIG.7b
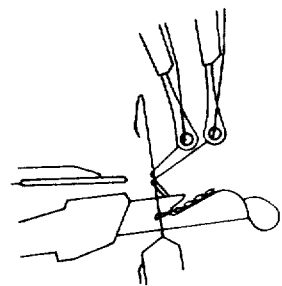
FIG.7d.
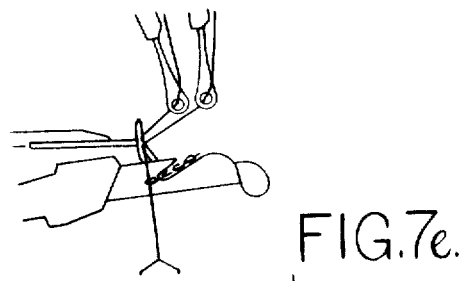
FIG.7c
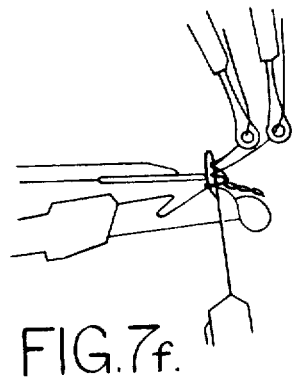
FIG.7f.
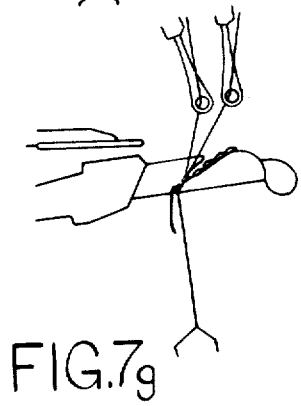
FIG.7e.
FIG.7g

COUNTER 36

TEXTILE MACHINES

This invention relates to the combination of a textile producing machine and a stored program digital computer for controlling the operation of the machine and has for its object to provide such a combination in a simple and convenient form.

According to the invention in the combination of a stored program digital computer and a textile producing machine the computer includes a fast random access store in which is stored information relating to the material to be produced by the machine and a control program, the computer also including a logic unit, the machine including one or more electromechanically controlled actuators and the combination including one or more hardware buffers, each hardware buffer being associated with one or more of said actuators, the logic unit supplying information selectively to one or more hardware buffers at a particular point or points in the cycle of operation of the machine according to the operation of the machine.

Figure 1:
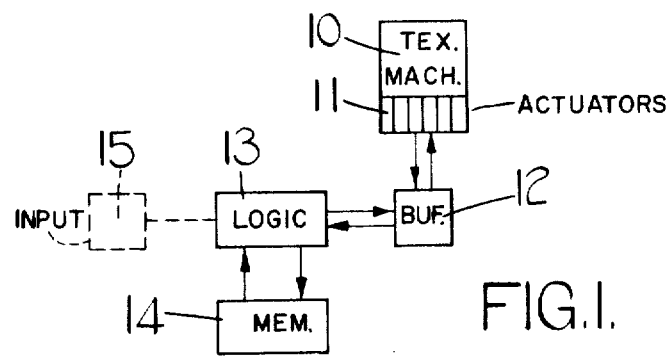
Figure 2:
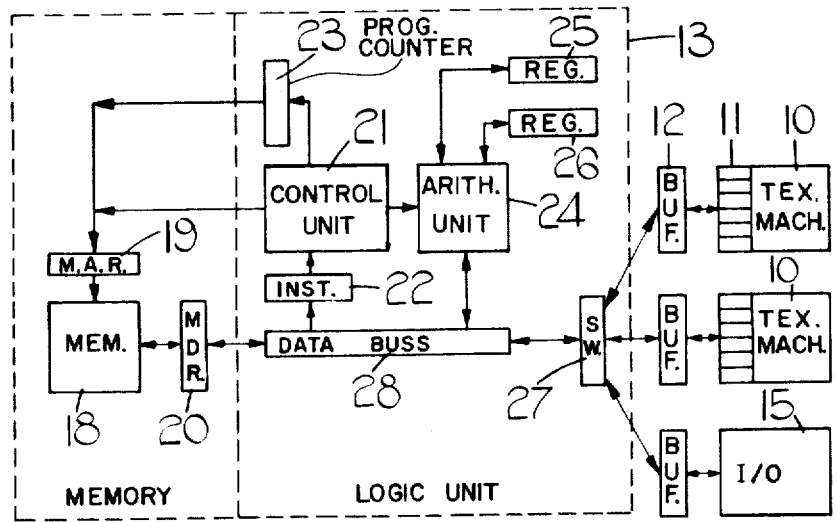
Figure 3:
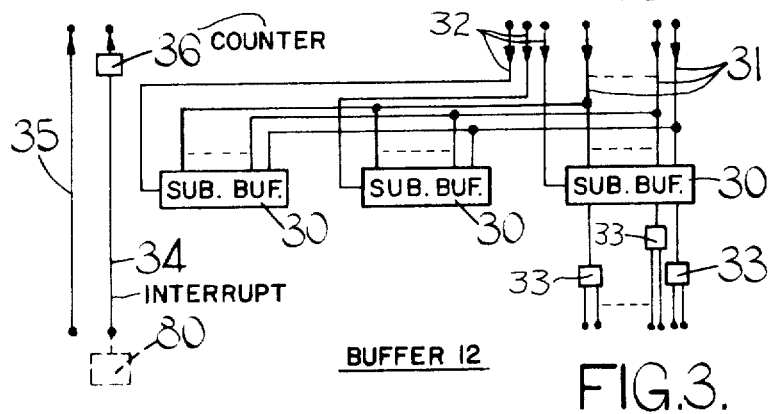
Figure 4:
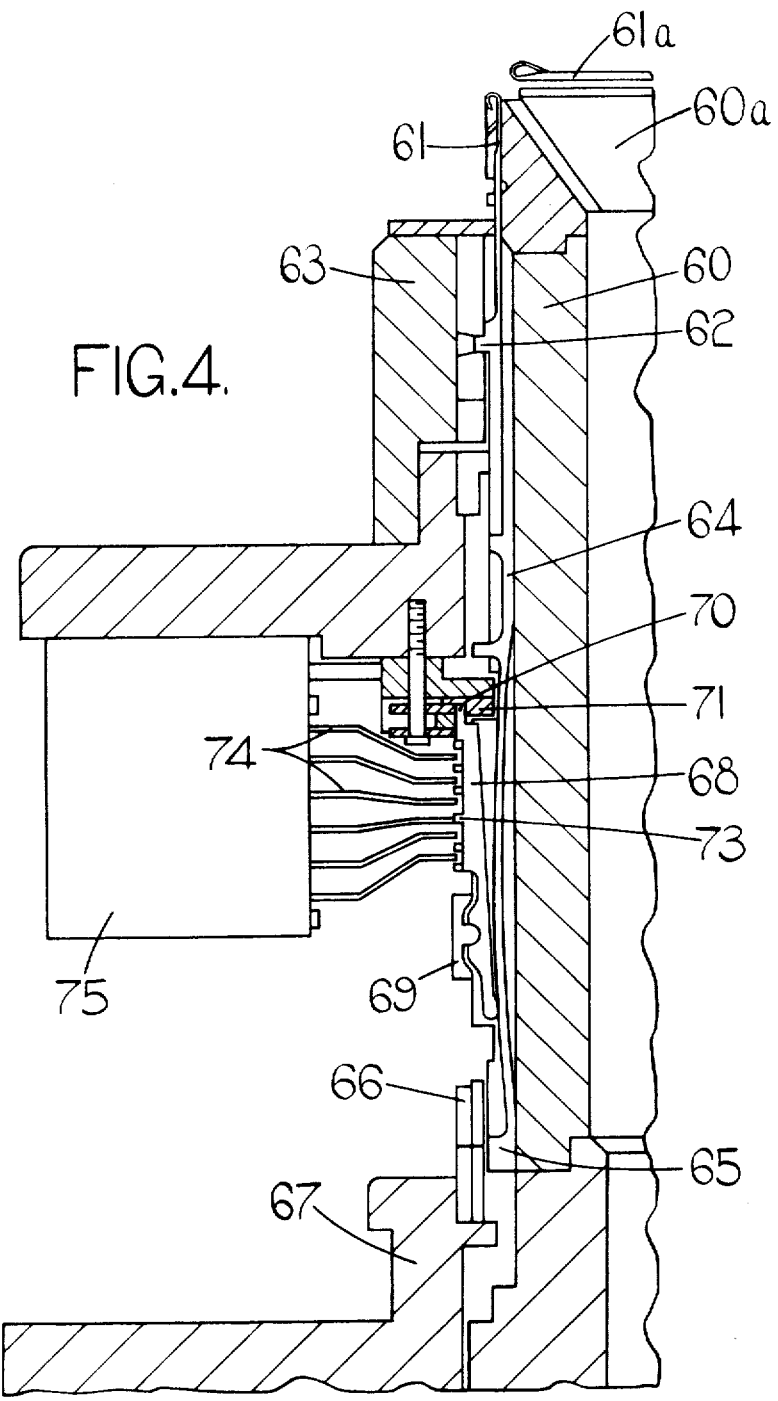
Figure 5:
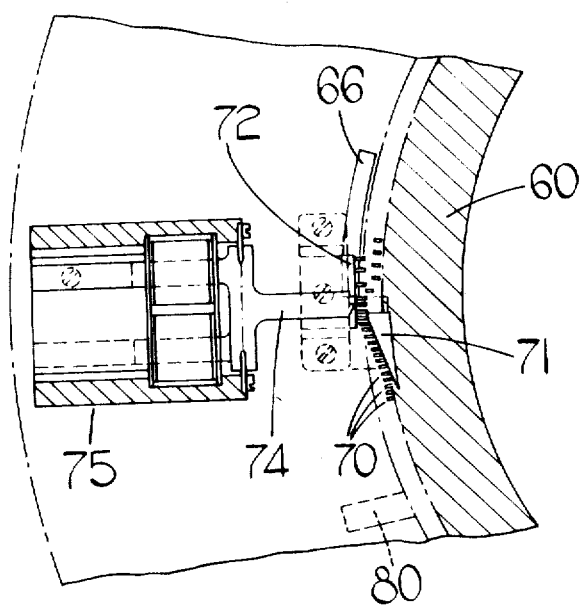
Figure 6:
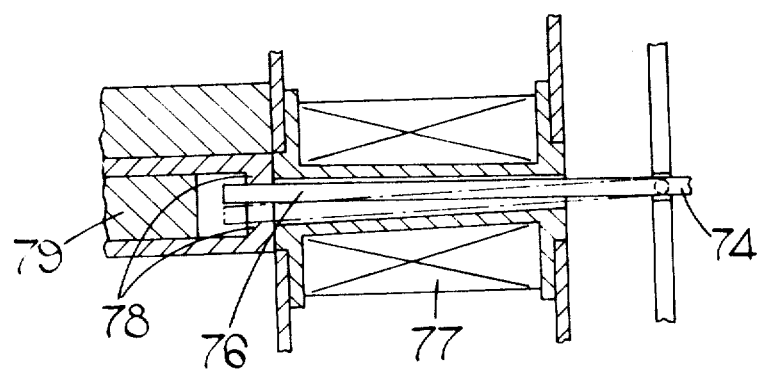
Figure 8:
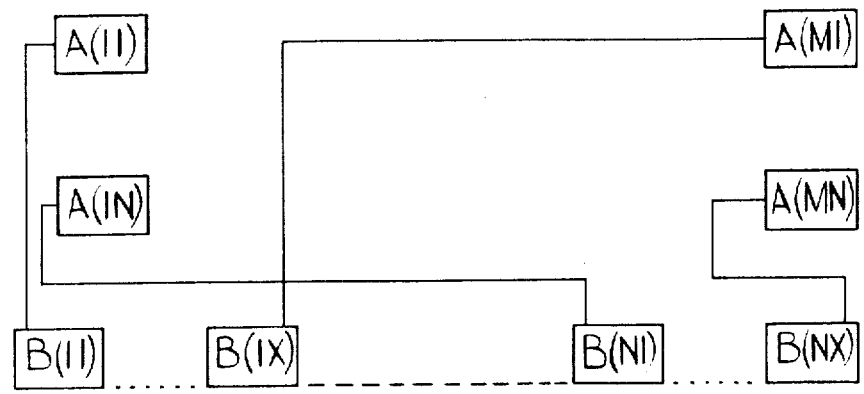
Figure 9:
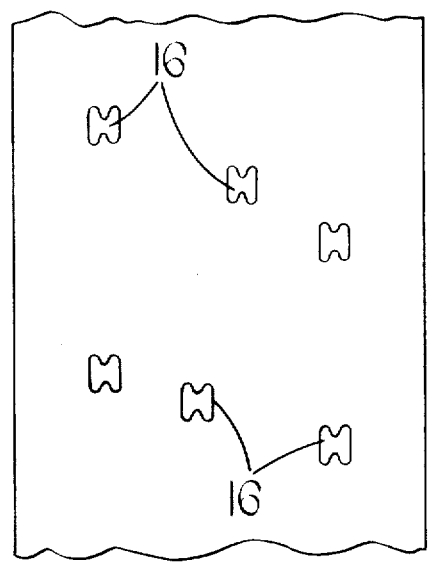
Figure 10:
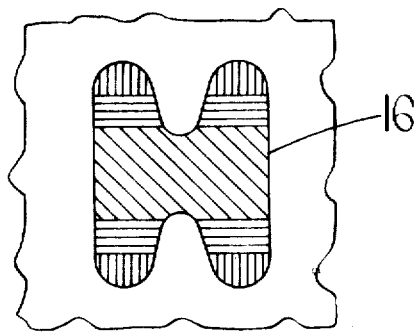
Figure 11:
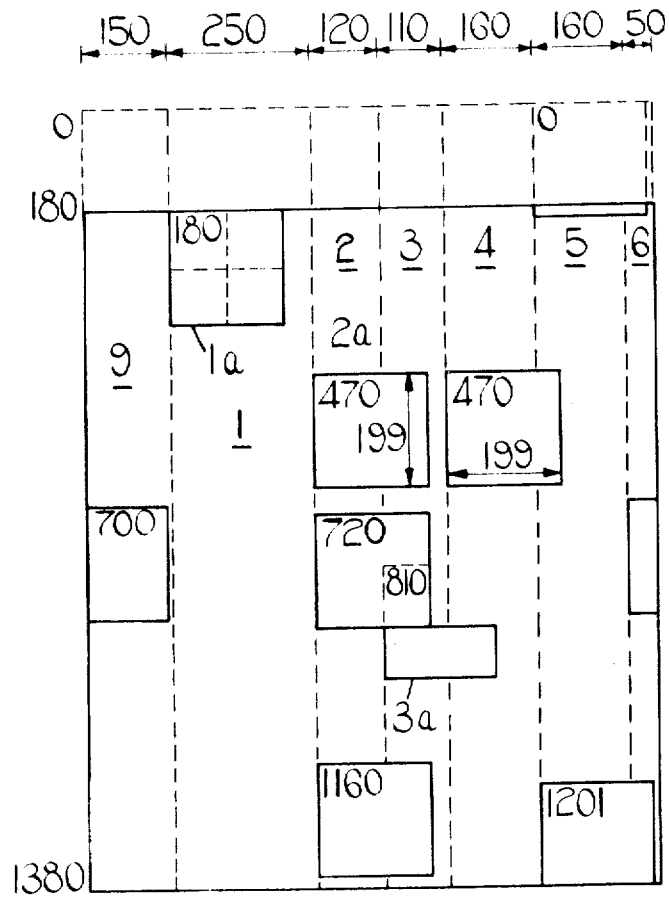
Figure 12:
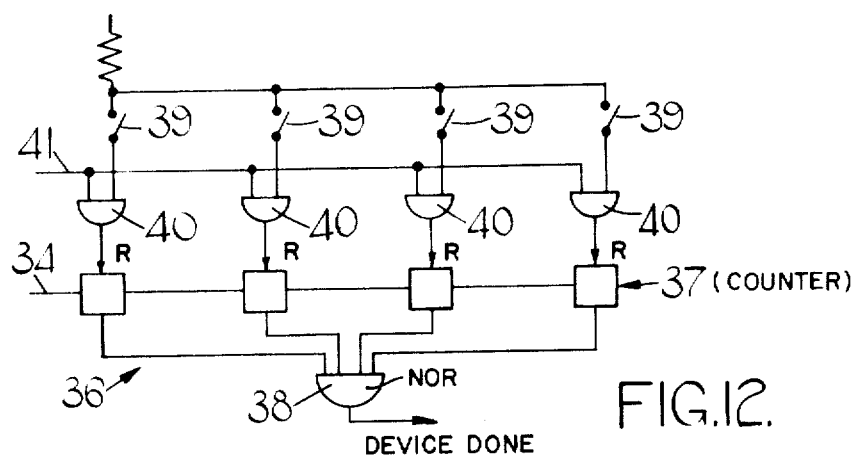
Figure 13:
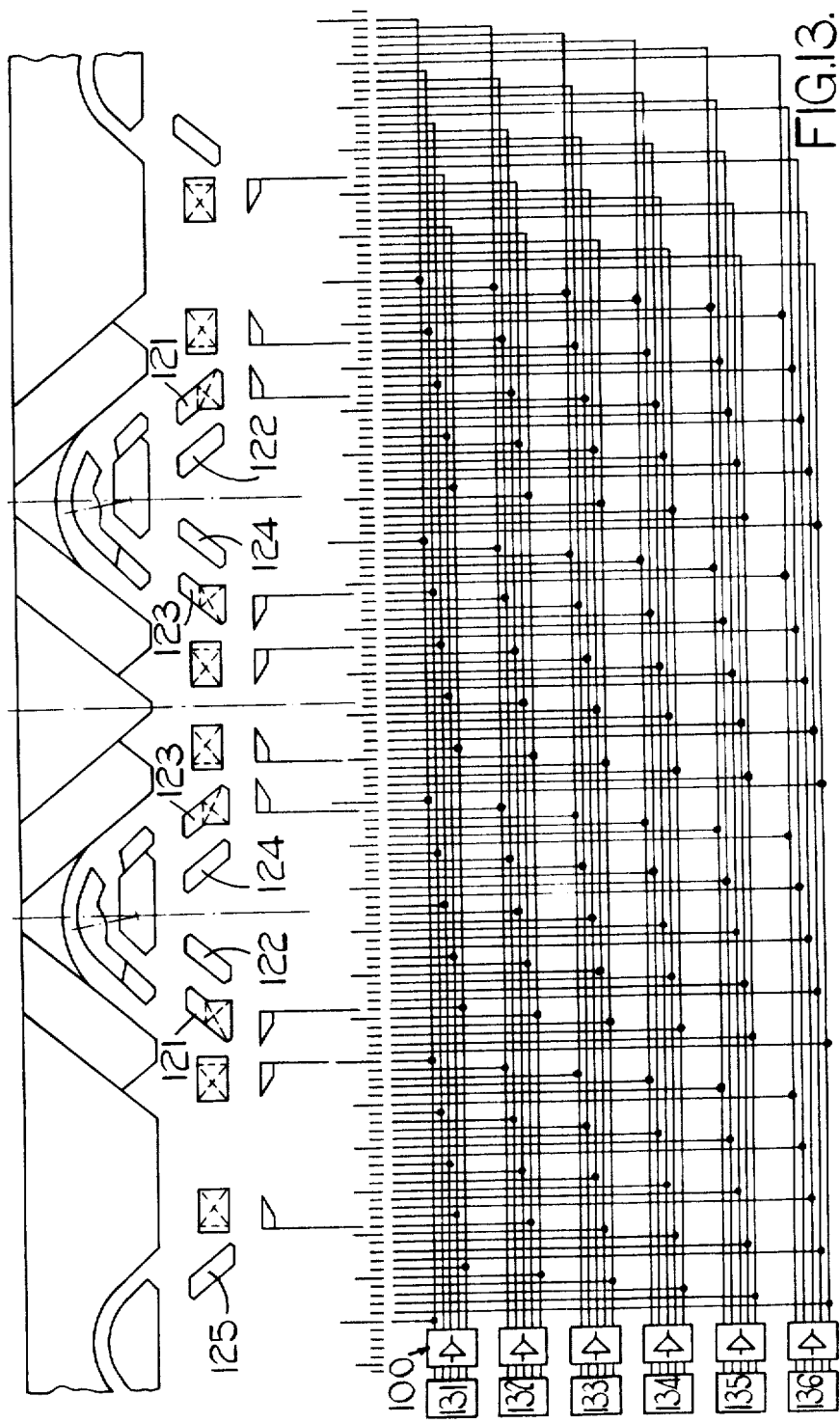
Figure 14:
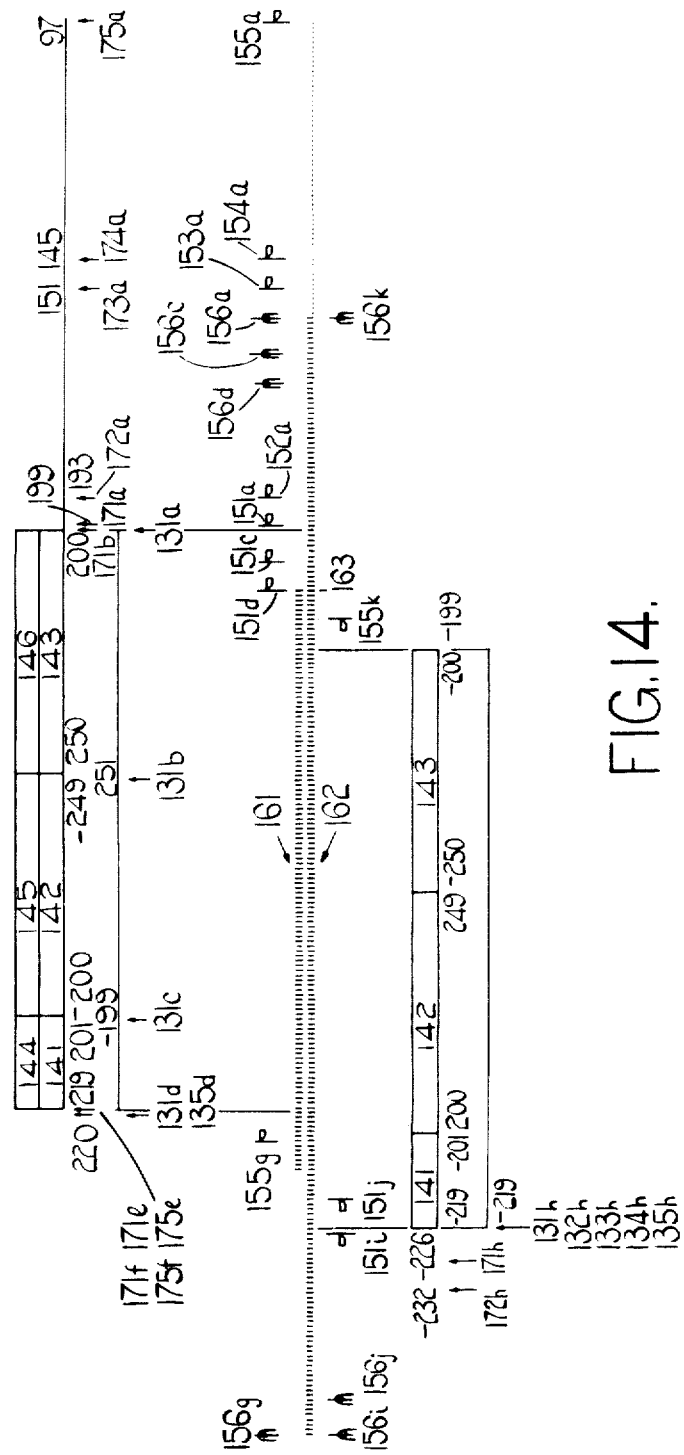

The invention will now be described with reference to the accompanying drawings in which:

FIG. 1 shows a block diagram of one example of a textile producing machine and a stored program digital computer in accordance with the invention, FIG. 2 is similar to FIG. 1 but shows the parts of the computer in greater detail, FIG. 3 shows in greater detail the buffer arrangement associated with the knitting machine, FIGS. 4, 5 and 6 show portions of a circular knitting machine, FIGS. 7a, 7b, 7c, 7d, 7e, 7f and 7g show a portion of the knitting sequence of a warp knitting machine, FIG. 8 shows a buffering arrangement for a stacked actuator, FIG. 9 shows a portion of a length of material produced on a circular knitting machine, FIG. 10 shows to a larger scale a portion of the material shown in FIG. 9, FIG. 11 shows a length of material produced with a pattern repeated at irregular intervals, FIG. 12 shows in greater detail part of the combination shown in FIG. 3, FIG. 13 is a diagrammatic view of a portion of a flat knitting machine, FIG. 14 is a further diagram relative to the flat knitting machine.

With reference to FIG. 1 there is provided a textile producing machine 10 which may be one of a number of types of machine, but which in the particular case is a circular knitting machine, and which is provided with a plurality of electromechanically controlled actuators 11 which can be selectively energised to cause operation of the knitting machine in a particular way. The supply of electrical energy to the actuators is controlled by means of a stored program digital computer and the arrangement is such that the material produced by the machine may be provided with a particular pattern. For example, the pattern can be achieved by variation of the stitch, the type or colour of the yarn or thread used or a combination of these variables and it may be a pattern repeated at regular or irregular intervals in both the horizontal and vertical directions.

A power supply including fast acting switches supplies electrical energy to the actuators. The switches are controlled by a hardware buffer 12. Conveniently the hardware buffer is in the form of an interface card which is plugged into a suitable socket inside the computer. Whilst the hardware buffer 12 controls the supply of electrical energy to the actuators 11 it also permits feedback of information to the computer from the knitting machine.

The digital computer includes a logic unit 13 and a fast random access memory 14 and as is conventional practice, information can be passed between the logic unit 13 and the memory 14 in either direction. The hardware buffer 12 is connected to the logic unit 13 and information relating to the pattern and control signals relating to the operation of the hardware buffer pass between the logic unit and the hardware buffer and information regarding the state of the machine, between the hardware buffer and the logic unit.

The computer is also provided with an input unit 15 by which means a program of computer instructions and information relating to the pattern can be stored in the fast random access storage of the computer. The input unit 15 is associated with the logic unit 13.

The stored program digital computer is shown in greater detail in FIG. 2 which uses the same reference numerals as FIG. 1. The memory 14 is shown to incorporate a memory unit 18, a memory address register 19 and a memory data register 20. The logic unit 13 is shown to incorporate the control unit 21, the instruction register 22, the program counter 23, the arithmetic unit 24, working registers 25, 26, the data switch 27 and the data highway 28.

The arrangement described is well known and whilst variations may be found between individual stored program digital computers such differences as there are do not in general substantially affect the general mode of operation of the computer. The operation of a stored program digital computer is well known in the computer art. Examples of such computers which broadly conform to the layout described above are the Hewlett Packard 2114 and the Data General Corporation Nova 800.

It will be appreciated however that the invention is not limited in its application to any particular model or type of stored program digital computer or to any characteristic of any model or type of stored program digital computer.

As will be seen from FIG. 2 the data switch 27 is connected to three buffers 12 which are connected in turn to two knitting machines 10 and an input or input/output device 15 respectively.

It will be understood that the invention is not limited in its application to a circular knitting machine nor to the production of a pattern in material by colour variation and may be applied to any form of textile producing machine where it is desired to produce a pattern with visual variation, variation in surface texture, variation in the surface level etc., of the material.

The systems so far described utilize one computer to control one or two knitting machines. It will be understood however that depending on the amount of data to be supplied more than two knitting machines may be controlled by a single computer or two or more computers may control a single machine. It is not necessary to provide individual computers with the amount of storage required for the maximum pattern variation and size since in very few cases will the maximum amount of storage be required to produce a particular pattern. It is possible to provide the individual computer with the necessary amount of storage from a convenient stock.

It will be appreciated that this storage is not necessarily limited to conventional random access storage, and may consist of other storage for example "read only" storage if this is consistent with economic considerations.

An example of the buffers 12 associated with the knitting machine will be described in greater detail with reference to FIG. 3. Each buffer 12 comprises three sub buffers 30 each capable of receiving and storing 16 bits of information. Each sub buffer 30 has 16 inputs, only two of which are shown, and the corresponding inputs of each sub buffer are connected together and to respective input lines 31. The sixteen input lines 31 are connected to the data highway 28 of the computer by way of the data switch 27 and it will therefore be seen that when the computer outputs information to the particular buffer 12 the same information is present at the inputs of each sub buffer 30. The sub buffers 30 are set to store the information present at their inputs by means of signals applied by way of control lines 32. Three control lines 32 are provided associated with the three sub buffers 30 respectively. At the appropriate time a signal is transmitted along one of these lines so that the associated sub buffer 30 stores the information at its input terminals. Three such computer operations are required to load the three sub buffers 30 with information.

Each sub buffer has sixteen outputs and associated with the outputs respectively are drive circuits 33. Each drive circuit 33 is associated with a power stage not shown, so as to provide sufficient current to drive the associated actuator 11 of the knitting machine.

The filling of the sub buffers 30 takes place in an extremely short period of time. Since the actuators are electromagnetic in nature with high inertia and do not require accurate timing, it is arranged that the outputs to the associated actuators 11 are energised immediately without further control signals from the knitting machine. These outputs may however be gated with an analogue or digital signal from the knitting machine to give the input signal required for a particular type of actuator. This mode of operation is contrary to normal computer practice where the sub buffers when filled with fresh information would only pass that information to an associated machine on receiving a control signal at some predetermined time.

Also provided in each buffer 12 are lines 34, 35 along which information is passed from the knitting machine to the computer. A signal on line 34 causes an interrupt of normal computer operation each time the knitting machine requires actuation or non-actuation and thereby causes the computer to alter the information contained in the sub buffers 30 thus affecting the actuators when appropriate. The line 34 may include pulse shaping and delay circuits so that the interrupt of normal computer operation to change the information in the sub buffers occurs at the correct time. Such pulse shaping and delay circuits will be necessary if it is not possible to provide a sensor on the knitting machine suitably positioned to produce a signal at the appropriate time. The line 34 may also include a counter 36 to be described, the purpose of which is to prevent an interrupt of normal computer operation until a predetermined number of signals have been generated by the sensor 80 on the knitting machine. In this example the counter is set manually but it will be appreciated that this counter could be set by the computer. The effect of the counter 36 is that the knitting machine will carry out a predetermined number of stitch operations without any change ocurring in the setting up of the actuators. So far as the knitted fabric is concerned the effect will generally be to stretch the pattern horizontally.

With reference now to FIG. 12 of the drawings the counter 36 comprises a four bit decremental counter unit 37 the outputs from the individual stages of which are connected to a NOR gate 38. The stages of the counter are interconnectd in the usual manner and the line 34 from the textile producing machine is connected to the first stage of the counter unit 37 whilst the output of the NOR gate 38 is connected to the "Device Done" circuits of the buffer. In operation, the stages are initially set and the signals arriving from the knitting machine cause the counter unit to count down to zero. When this occurs there are no input signals to the NOR gate so that an output signal is supplied to the "Device Done" circuits of the buffer.

For setting the stages four switches 39 are provided and these are associated with the counter stages respectively, there being interposed between the stages and the switches, AND gates 40 respectively. The outputs of the AND gates are connected to the resetting terminals of the stages respectively and the one set of input terminals of the AND gates is connected to the switches respectively whilst the other inputs are connected to a reset line 41. The switches 39 are set in binary code and when a reset signal is applied to line 41 the individual stages of the counter unit will be reset. Conveniently line 41 is provided with a reset signal each time a signal appears at the output of the "NOR" gate 38 so that the counter stages are automatically reset. As shown the switches 39 are manually operable switches but as mentioned earlier these switches can be set by the computer provided a suitable instruction is inserted in the control program and appropriate information is inserted in the fast random access store.

The interrupt signals are processed in the normal interrupt handling of "Device Done" circuits of the buffer in the normal way. The normal "Device Busy" circuits of the buffer are utilized to ensure that the computer and knitting machine are in step. For this purpose the line 35 provides a signal at a predetermined point in the cycle of operation of the knitting machine. For a circular knitting machine a suitable time might be when needle one is adjacent to feed one, the beginning of a new course, or at the end of the old course. The signal is passed to the "Device Busy" circuits of the buffer and sets the "Device Busy" bistable. It is arranged that the "Device Busy" bistable is only examined by the computer as instructed by the stored program at the time when the computer expects the signal.

If the signal from the knitting machine is present when the "Device Busy" circuits are activated then the computer carries on providing fresh information to the sub buffers 30. If however the signal from the knitting machine is not present when the "Device Busy" circuits are activated then the computer stops providing fresh information to the sub buffers and only starts supplying fresh information when the next signal from the knitting machine occurs on line 35 and the knitting machine and computer are back in step. This will mean that the knitting machine will carry on knitting without change in the setting of the actuators and therefore a fault in the material or pattern produced by the machine will occur. However the fault will normally only last until the next signal from the sensor or for not more than one rotation in the case of a circular knitting machine. It will be appreciated that spurious signals on the line 35 have no effect on the normal mode of operation. It will further be appreciated that while the computer is out of step with the machine it may supply any information to the machine which will not cause a malfunction of the machine. In some circumstances it is advisable to vary the information being supplied to the machine while the computer is out of step with the machine.

The actuators on a knitting machine are generally arranged to cause the needles to knit when no control signals are applied to them so that in the event for example of a power failure yarn does not accumulate on the needles while the machine comes to rest. Stored program digital computers generally incorporate means to close down their operation safely in the event of a power failure. However in the event of a malfunction of the digital computer information might be left in the hardware buffer causing control signals to be wrongly applied to the actuators. It is possible to connect the computer to the safety circuits of the machine in the following manner to avoid such a situation.

The line 35 is connected to a DELAY. The output of the DELAY and the output of the "Device Done" bistable are connected to an AND gate. The output of the AND gate is inverted and supplied to a relay. The output of the relay is connected to the safety circuits of the machine.

The computer will normally reset the "Device Done" bistable before the DELAY outputs a signal to the AND gate. In this case the inverted output of the AND gate will maintain the relay in an energised state and no signal will be supplied to the safety circuits of the machine allowing normal operation.

If however the computer fails to reset the "Device Done" bistable before the DELAY outputs a signal to the AND gate the inverted output of the AND gate will de-energise the relay and a signal will be supplied to the safety circuits of the machine to stop its operation.

Various forms of textile producing machine may be associated with the computer so as to be controlled thereby to produce a patterned fabric. One example only of such a machine will now be described.

The example chosen is a circular knitting machine having two sets of needles. One set of needles is mounted in vertical grooves respectively on the outside of a needle cylinder having its longitudinal axis vertical. The needle cylinder is surrounded by an annular cam box. In the example the cam box is stationary while the needle cylinder rotates to provide relative motion between the cams and the needles. Cam parts are mounted on the internal peripheral wall of the cam box to form passages which may receive butts formed on the needles or on jacks associated with the needles. At various positions around the cam box are mounted thread guides each of which feeds one thread to the needles. In the vicinity of each thread guide the cam parts are shaped to impart movement to any butt which engages the cam parts and thus the needle associated with that butt.

This example of a circular knitting machine employs latch needles. Upward movement of a needle will result in the collection of a thread in the hook of the needle. Full upward movement of a needle will result in the loop positioned on the latch of the needle being displaced over the end of the latch whereas part upward movement of a needle will not. When the needle is moved down after a full upward movement the latch will be closed and the loop will be "knocked over" leaving the newly inserted thread in the closed hook of the needle and thus forming a stitch. In the case where a part upward movement of the needle occurs the loop remains on the latch and cannot therefore close the latch and be "knocked over" during the subsequent downward movement. This eventually results in the formation of a "tuck" stitch. When the needle is retained in its downward position at a thread feed the needle will "miss" the thread and the thread will be "laid in" the knitted fabric. The extent of the upward movement is determined by the cam engaged by the butt. In the example there is only one cam for causing needles to knit at each thread feed but it will be appreciated that there may be a cam for tucking and a cam for knitting or means for altering one cam to fulfill either purpose.

Various means of selecting which butts engage the cam parts and which do not are known. These means include various types of known electromagnetically controlled actuators. One such actuator may be mounted at each thread feed.

The aforesaid cam parts co-operate with selected butts. Some form of selector operated by the actuator is used to determine whether the butt is in a cam engaging position in which case the cam will move the needle to effect a stitch, or whether the butt is held in a position in which it will be clear of the cams so that the needle will remain in the miss or retracted position. A selector is provided for each needle and a single actuator may operate each of the selectors in turn. However, such an arrangement may impose limitations on the speed of operation of the machine. It is therefore known to provide a "stack" of actuators at each thread feed. The actuators in a stack are generally mounted directly above one another and operate at a single needle position but it will be appreciated that other arrangements are possible. Each actuator controls the operation of all those needles associated with selector butts at a certain height. These needles are spaced at equal intervals round the needle cylinder so that the associated actuator has as much time as possible for its operation.

A circular knitting machine employing stacks of actuators will now be briefly described with reference to FIGS. 4, 5 and 6.

With reference to these drawings there is provided a rotary needle cylinder 60 in the outer peripheral surface of which is formed a plurality of axially extending circumferentially spaced grooves. Mounted in the upper portions of the grooves are latch needles 61 respectively each having a butt 62 which co-operates with cams formed on the internal periphery of an annular cam box 63 surrounding the needle cylinder. Also accommodated within the aforesaid grooves are jacks 64. Each jack has a shoulder for engagement with the associated needle and the lower portion of the jack is capable of flexure. At the lower end of the jack is a butt 65 and in the retracted position of the jack as shown in FIG. 4 the butt 65 is held clear of cams 66 which are mounted on a lower portion 67 of the cam box. The cams 66 are provided for raising the jack 64 and hence the needle 61 and a set of such cams 66 is provided at each thread feed position around the needle cylinder. If the jack is not in the retracted position the butt 65 will engage with the cams as the needle cylinder 60 rotates and be raised thereby lifting the needle. The cams on the cam box 63 are shaped to permit raising of the needle at the thread feed position and act when the needle has passed the thread feed position to lower the needle and the associated jack.

Associated with each jack 64 is a selector or presser 68 and this is pivotally mounted upon a part 69 carried by the needle cylinder 60. The lower end of the presser is positioned to engage with the bowed portion of the jack 64 and the upper end of the presser defines an upstanding butt 70. The butt 70 co-operates with a fixed cam 71 which is positioned in advance of the cam 66 and is arranged to urge the butts 70 outwardly away from the needle cylinder. During such outward movement the butt is brought into close proximity with a fixed magnet 72 and is attracted and retained by the magnet against the force exerted by the resilience of the lower portion of the jack. The outward movement of the butt 70 effects inward movement of the butt 65 to the retracted position. The magnet 72 extends circumferentially as shown in FIG. 5 and overlaps the cam 66 so that as long as the butt 70 is retained by the magnet the butt 65 will not be actuated by the cam 66.

Each presser 68 is initially provided on the outer side of its upper portion with a plurality of spaced selector butts but all except one of these butts is broken off when the presser is assembled into the machine to provide a single selector butt 73 at a particular height. As shown each presser was initially provided with six selector butts and adjacent pressers are arranged to have the selector butts at different positions. The selector butts 73 for convenience are arranged in sequence so that every sixth presser has the selector butt at the same height.

For co-operation with the selector butts 73 of the pressers 68 there are provided six operating members in the form of fingers 74 and these extend from a stacked actuator 75. The fingers are at heights corresponding to the various selector butts 73 but they can be tilted about horizontal axes into and out of exact registration with the selector butts 73. The ends of the fingers 74 adjacent to the pressers define cam forms and the arrangement is such that when the finger is in a position to contact a selector butt 73 the presser carrying that butt will be moved inwardly towards the needle cylinder thereby moving the presser away from the magnet 72. When this occurs the resilience of the lower portion of the jack will move the butt 65 into the path of the cam 66.

With particular reference to FIGS. 5 and 6 each finger 74 is pivotally mounted on a part of the stacked actuator 75, about a substantially horizontal axis and each finger has associated therewith an extension or armature 76. The armatures extend through annular electromagnets 77 respectively the current flow through which can be reversed when required so that the magnetic polarity of the end of the armature remote from the pivot can be reversed. Moreover, the end of the armature 76 extends between a pair of pole pieces 78 and these are polarized by a permanent magnet 79. In use therefore the position of the armatures 76 will depend upon the direction of current flow through the associated electromagnets 77 and by suitably controlling the direction of current flow needles may be selected and raised.

A dial 60a in the form of a horizontal disc or "dial" with grooves extending radially from its centre is also provided. The second set of needles is mounted in these grooves and co-operates with the first set of needles to produce patterned fabric. The operation of the second set of needles is generally controlled mechanically but it will be appreciated that it is possible to select the dial needles by means of electromechanically controlled actuators.

In FIG. 9 there is shown a portion of a length of material produced on a circular knitting machine. The material is produced as a tube and is subsequently cut along its length. The pattern on the material comprises repeated areas 16 shown in greater detail in FIG. 10. The repeated areas 16 are of identical colour formation and the remaining portion of the material is white. As shown in FIG. 9 each repeated area 16 includes four arms which are coloured red at their outer extremities. Substantially the whole of the remaining portions of the arms are coloured blue and the remainder of the repeated area is green. It will be appreciated that the shape of the repeated areas 16 is not limited to the particular shape or size shown moreover, the colour make up of the pattern can be as desired, and there may be more than one type of repeated area in a pattern.

In order to produce a course of such a piece of material on a circular knitting machine the machine will require four thread feeds for the different colours respectively and four actuators for operating the outside needles as the cylinder carrying the outside needles rotates. The outside needles when actuated pull a loop of one of the threads onto the outside of the material so as to expose that thread on the outside of the material. The particular knitting machine is required to produce four courses of the material at a time and hence sixteen actuators are required and sixteen individual threads are fed to the machine. The operation of such a machine has been explained and the desired pattern is built up as the material is being knitted, by operation of the individual actuators at the appropriate instants.

As has been mentioned the supply of electrical power to the electromagnetic means may be controlled by a stored program digital computer in which the whole of the actuator control signals are stored in the order in which they are output. With this arrangement a substantial proportion of the information stored in the computer would be duplicated thereby leading to the need to provide a large amount of storage in the computer with the attendant problems of cost. In order to overcome this problem the information concerning the repeated areas which in the example shown are identical is stored only once in the computer and the information is extracted from the fast random access store of the computer as and when it is required.

This is achieved by using the facilities of the logic unit 13 as instructed by the stored program of computer instructions which inspects and updates information stored in the fast random access storage regarding the position of each and every actuator relative to the information stored concerning the repeated area. The stored program of computer instructions also tests and updates information concerning the position of the needle cylinder. The relevant actuator movements are extracted for a position of the needle cylinder at a particular point in time.

If we refer to FIG. 10 it will be noted that the repeated area 16 is symmetrical about both the horizontal and vertical axes, it being understood of course that the horizontal axis in the material is not truly horizontal or at right angles to the vertical axis. By virtue of the symmetry of the repeated areas further economy in the amount of fast random access memory required in the computer can be achieved. It would be possible to store information concerning the upper or lower half of the repeated area or concerning the left hand or right hand portion of the repeated areas. Alternatively to achieve even greater economy the repeated area can be divided into quarters and the information concerning one quarter only stored. The program of computer instructions and the information regarding the position of each and every actuator also contained in the fast random access memory is arranged to take this into account when the information is extracted from the memory. It will be understood that some repeated areas will have a centre of symmetry in which case the amount of information to be stored can be further reduced. It will also be appreciated that one repeated area can be a mirror image of another such area.

TABLE 1

| A | A | B | B | C | C | D | D | 20a |

| Time | Outputs to— A | B | C | D | $A^1$ | $B^1$ | $C^1$ | $D^1$ |
|---|---|---|---|---|---|---|---|---|
| $T_1$ | 0 | | | | 0 | | | |
| $T_2$ | 0 | | | | 0 | 0 | | |
| $T_3$ | 0 | 0 | | | 0 | 0 | | |
| $T_4$ | 0 | 0 | | | 0 | 0 | | |
| $T_5$ | 0 | 0 | 0 | | 0 | 0 | 0 | |
| $T_6$ | 0 | 0 | 0 | | 0 | 1 | 0 | 1 |
| $T_7$ | 1 | 1 | 1 | 1 | 1 | 1 | 1 | 1 |
| $T_8$ | 1 | 1 | 1 | 1 | 1 | 0 | 1 | 0 |
| $T_9$ | | 0 | 0 | 0 | | 0 | 0 | 0 |
| $T_{10}$ | | 0 | 0 | 0 | | | 0 | 0 |
| $T_{11}$ | | | 0 | 0 | | | 0 | 0 |
| $T_{12}$ | | | 0 | 0 | | | 0 | 0 |
| $T_{13}$ | | | | 0 | | | | 0 |
| $T_{14}$ | | | | 0 | | | | |

According to the invention a further advantage can be obtained by storing binary numbers instead of the blocks when storing information concerning the composition of repeated areas known as pattern data. The advantage is best demonstrated with reference to Table 1 in which the desired arrangement of face stitches in a course is shown at 20a. These face stitches are stored as a number of blocks of a repeated area there being no limitation on the size or shape of a block or the nature of the pattern in a block or the number of different blocks which make up the repeated area. In Table 1 the letters A,B,C, and D represent single face stitches of the different colours A,B,C and D. Moreover, beneath the representation of the course are shown lines representing the actuators responsible for the colours A,B,C and D. The course shown is only part of a course and the table shows by the numeral 1 when the actuator is operated and by zero (0) when the actuator is not operated. It will be appreciated however that the opposite representation might be used. The gaps in the table are left because it is desired to illustrate only the knitting of the portion of the course shown at 20a at times $T_7$ and $T_8$ all the actuators are operated and this is due to the particular arrangement of colours chosen. From the table it can be seen that 32 bits of information would need to be stored in all circumstances.

TABLE 2

| A | A | B | B | C | C | D | D | 20a |

Pattern data... 00  00  01  01  10  10  11  11 where 00 is stored instead of a block comprising one face stitch of color A
where 01 is stored instead of a block comprising one face stitch of color B
where 10 is stored instead of a block comprising one face stitch of color C
where 11 is stored instead of a block comprising one face stitch of color D In Table 2 there is shown a system in accordance with the invention and in which binary numbers are used to facilitate the storage of the pattern data. The system is demonstrated for producing the same arrangement of stitches as that shown in Table 1. It will be seen that in order to store the desired pattern data only sixteen bits are required.

TABLE 3

| A | A | B | B | C | C | D | D | 20a |

Pattern data... 00   01   10   11 where 00 is stored instead of a block comprising two face stitches of color A
where 01 is stored instead of a block comprising two face stitches of color B
where 10 is stored instead of a block comprising two face stitches of color C
where 11 is stored instead of a block comprising two face stitches of color D Furthermore, as shown in Table 3 advantage can be taken of the nature of the pattern shown in Table 1 to reduce the number of bits of information to eight. It will be appreciated that the instructions to the actuators in the form of control signals will still need to be the same as for the example shown in Table 1 however this can be produced by the computer from information stored in the fast random access store of the computer as and when it is required. This is achieved as previously described using the facilities of the logic unit 13 as instructed by the stored program of computer instructions etc.

It will be understood that the invention is not limited in its application to a circular knitting machine nor to the production of a pattern in material by colour variation and may be applied to any form of textile producing machine where it is desired to produce a pattern with visual variation, variation in surface texture, variation in the surface level etc., of the material. One binary number would be used to represent one block in the pattern with a particular combination of contents. The size of the binary number would depend on the number of combinations in use in that particular pattern.

It is desirable to limit the amount of fast random access storage used to store the program of computer instructions which controls the textile machines, as well as the storage required to store the pattern data, on cost grounds. In addition, the time available for such programs to operate is limited by the relative speeds of the digital computer and the one or more textile producing machines it controls. This gives rise to certain requirements for very efficient computer programs.

The nature of the pattern data may require as little as one bit to represent a block. Digital computers do not generally address single bits individually as this requires an instruction address which is excessively large, so that the fast random access storage of a digital computer is generally split up into individually addressable 'words' each comprising several bits. In general therefore, each word must hold the binary representation (or bit pattern) of more than one block.

For the purpose of illustration let it be assumed that it is desired to produce a piece of material having a square pattern without a centre of symmetry or axes of symmetry which repeats several times across the width of the material being manufactured. In general, each actuator will need the information from one block in the information relating to the pattern according to the position of that actuator relative to the pattern in the horizontal and vertical directions. The relative position of the actuator will usually travel along a row of the pattern from left to right or vice versa, until the end of the row of pattern is reached and them resume at the first position in the row of pattern. At some time the actuator will move to another course of material and thus to another row of the pattern.

Finally, the actuator will finish the last course which it is required to do for this reproduction of the pattern, and start a new course by using one of the rows from the beginning of the pattern. The following events thus take place in descending order of frequency.

2.1 A normal stitch.
2.2 The end of a row in the pattern.
2.3 The end of a course in the material.
2.4 The end of the pattern.

It is desirable, therefore, to use a method of 'unpacking' the bit patterns from a word which does the least work in event 2.1 and transfers such work as is necessary to events 2.3 and 2.4.

The method of pattern data storage employed is to store the pattern data in such a way that a word of fast random access storage holds the bit patterns representing a number of blocks from a column of pattern data rather than the bit patterns for successive blocks in a row of the pattern data. The successive bit patterns representing the blocks in a row may be unpacked by applying the appropriate mask for that row of the pattern to successive words of storage containing that row. One mask may be used for unpacking the bit pattern, and another, or the same mask, or a test for zero, may be used for comparing it to the bit pattern representing a block. This method of storage has the following advantages:

1. It avoids the provision of hardware for a two register shift instruction to unpack successive bit patterns in a word of storage by shifting the bit patterns from one register to the other.
2. It utilises only one hardware register, and in the case of a two register digital computer, frees a hardware register to hold the word being built up with output bits representing control signals to the actuators.
3. Although the masks being used for one actuator routine change with the position of the actuator relative to the pattern, this method does not require the provision of storage for two masks for each actuator routine since the instructions in the actuator routine referring to the masks can be changed to access the required masks.
4. The same masks may be used throughout 2.1 and 2.2 above and instructions in the stored program referring to the masks have to be changed only in 2.3 and 2.4 above.
5. The use of masks to unpack the bit patterns stored in the way suggested facilitates the use of symmetry as the unpacking operations can conveniently take place in any order, in contrast to any method of unpacking by shifting.
6. Left/right symmetry along a row of the pattern is achieved by the order of access of words of storage during 2.1 above rather than by unpacking bit patterns which must inevitably utilise more instructions and take longer.
7. This method does not require the use of an index register.

The speed of examination by a stored program of computer instructions of the pattern data in the first random access storage of a particular type of digital computer often depends on which instructions are present in the instruction set of that digital computer. For instance, an 'Increment memory and then skip the next instruction if the result is zero' instruction may be used to increment an address, which points to a storage area for pattern data, in order to access that data in ascending address order and thus move right across the pattern. If no 'decrement memory and then skip the next instruction if the result is zero' instruction is present in the instruction set of that particular type of digital computer, then the stored program of computer instructions may have to be made more complex in order to access pattern data while moving left across the pattern. A more complex method of access will take up extra time, and it may thus be desirable to minimise the occurrence of left movement across the pattern.

The amounts of left and right movement across the pattern are not necessarily the same as there may be one more or less left movement than right movement in a course, and the pattern may have a partial repeat at one side of the course. The arrangement of left and right movement is generally the same in each course if the pattern is to be repeated coherently.

These difficulties may be overcome by storing the pattern data from the right hand side to the left hand side of the pattern in ascending address order in order to reduce the frequency of complex action to decrement an address, when the left movement exceeds the right movement on each and every course of the pattern.

In some situations it is advantageous to store the pattern data in a particular way. For example there is the case of a circular knitting machine having sixteen knitting stations and actuators knitting a pattern of 17 lines using two actuators for every helix of stitches which make up the material manufactured by such a machine. Each actuator will only knit the stitches in one particular helix because of the nature of a circular knitting machine. The two actuators knitting a particular helix must be adjacent. It can be seen that this knitting machine will knit a total of eight helices. When the fabric is removed from the knitting machine, and split, each helix will separate into several parts and become every eighth course in the material. Consequently, the first and second actuators will knit every eighth course using every eighth row or line in the pattern and thus knit the following lines in the following order:

1,9,17,8,16,7,15,6,14,5,13,4,12,3,11,2,10,1

In this case the first and second actuators knit every line in the pattern once only before they come back to their respective starting positions relative to the pattern. Since all the other actuators obey the same relationship as these actuators, and their starting positions are present in the above sequence, they must also follow the sequence.

In the above example it is advantageous to store the lines of the pattern in the order in which they are used rather than the order in which they occur in the pattern. This can, of course, be done in both the two ways previously described in the above section. This further novel method of storage has the following advantages:

1. A single test for the end of pattern condition can be used instead of several tests for the end of each course which constitutes the last course in the pattern for the actuators knitting that course.
2. The means for finding and accessing the next line in the pattern at the end of a course for a particular actuator is greatly simplified.

In order to fully understand the stored program of computer instruction it is necessary to examine all the conditions which will occur and require action by the program. These conditions will now be examined with particular reference to program A.

The output of control signals to the actuators takes place when a signal from the textile producing machine causes an 'interrupt' of normal computer operation in order to give priority to that output. Subroutine NEWL effects this output, and also ensures that the computer remains in step with the textile producing machine.

After an interrupt has occurred and been processed, the actuator routines assemble the output due at the next interrupt and then return control to the WAIT loop in order to wait for that interrupt. Provision must also be made for output at the start of operation. The relevant coding of the stored program of computer instructions begins with the label START.

The 'end of a half line of the pattern' for an actuator is the next most frequently occurring condition. Program A assumes a vertical axis of symmetry in the pattern and requires the storage of pattern data for only half of each line in the pattern. Program A further assumes that the pattern repeats several times across each course. Consequently, this condition occurs several times in a course, whenever an actuator reaches the end of a half line of the pattern after moving either left or right across that half line. The direction of movement of that actuator relative to the pattern must be changed from left to right, or vice versa. Consequently, the following action must be taken in subroutine RESET which is called on detection of the end of a half line of the pattern by any actuator routine.

The words of pattern data used by program A hold the bit patterns representing a number of blocks from a column of pattern data. Consequently, successive bit patterns representing the blocks in a row or line of pattern data may be unpacked by accessing successive words of storage containing that line. Program A uses a 'word pointer' to point to the location of the word holding the bit pattern currently being examined for a particular acutator. Program A assumes that no decrement instruction is available on the computer. Consequently, to move left relative to the pattern data the word pointer must be effectively decremented by incrementing a negative value. To move left instead of right, or vice versa, at the end of a half line this value must be changed in sign so that it can be effectively decremented instead of incremented, or vice versa.

However, we have already tested the word pointer to detect the end of a half line and have either incremented or effectively decremented it for convenience in programming terms. The word pointer must therefore be increased by two, to compensate either for that increment instead of an effective decrement or vice versa, which took place during the testing of the word pointer.

The instruction, which accesses the words, must be changed to one which caters for a word pointer of the opposite sign.

Program A assumes that the blocks consist entirely of information concerning single face stitches. The number of big patterns stored for a half line of the pattern in the fast random access storage of the digital computer minus one must be added to the new value of the word pointer to give the test address value for the next end of a half line of the pattern. The number of bit patterns stored in the example is 11 as program A assumes that the block on an axis of symmetry is common to both images and does not repeat adjacent to itself. The number added is always positive, because the value of the word pointer is always actually incremented, and is 10 in the example. The situation at the start of a half line of the pattern can be visualized as follows:

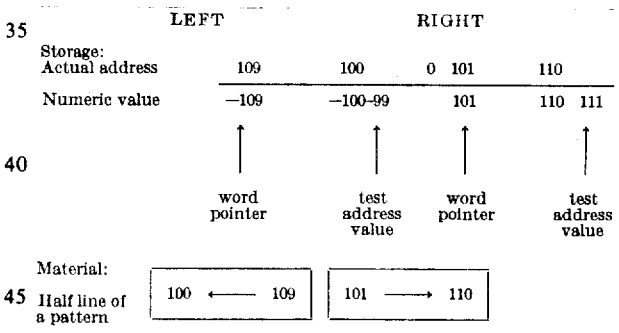

The next most frequent condition occurs when an actuator reaches the end of a course. Since the course may not consist of a whole number of half lines of the pattern the end of a course and the end of a half line of the pattern do not necessarily coincide. It is, however, more convenient in programming terms if they are made to coincide, and all the stitches remaining over and above whole half lines of the pattern are placed at the start of the course.

These stitches may be knitted during a left or a right movement across the half pattern, and they may have been preceded by a left or a right movement at the end of the last course. Consequently, there are four cases to be considered when stitches are left over.

The new course will use different bit patterns in the same words that were used by the old course. The particular bit patterns used will depend on whether this particular actuator is moving up or down relative to the pattern. A bit pattern number is stored by program A for each actuator to identify which bit patterns are being used by this actuator. Since program A stores the lines of the pattern in the order in which they are used, this bit pattern number is altered by plus or minus one at the end of a course. It should be noted that it is more convenient in programming terms if this bit pattern number has a negative value. The masks used to extract and test the bit patterns for this actuator must be changed by changing the appropriate instructions in the actuator routine using the bit pattern number, together with the actions specified for the four cases below.

The following table shows a left movement after a left movement.

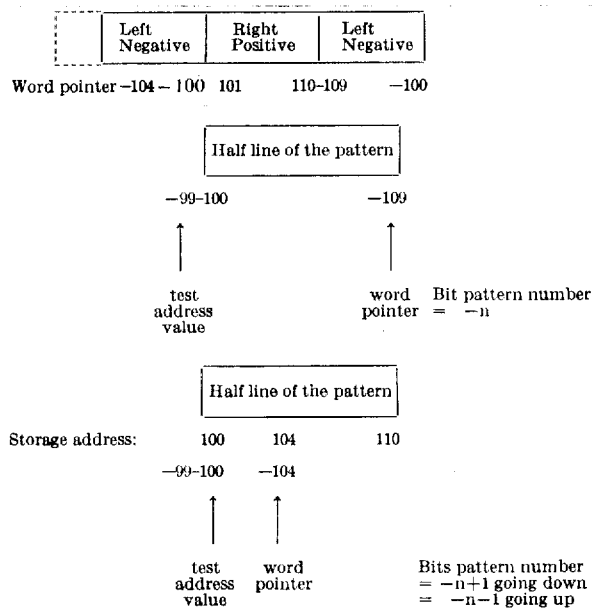

The following actions must be taken to cater for the above condition. The number of stitches in the remainder (5) must be subtracted from the word pointer. The test address value must be left unchanged. The instruction which accesses the words must remain unchanged.

The following table shows a left movement after a right movement.

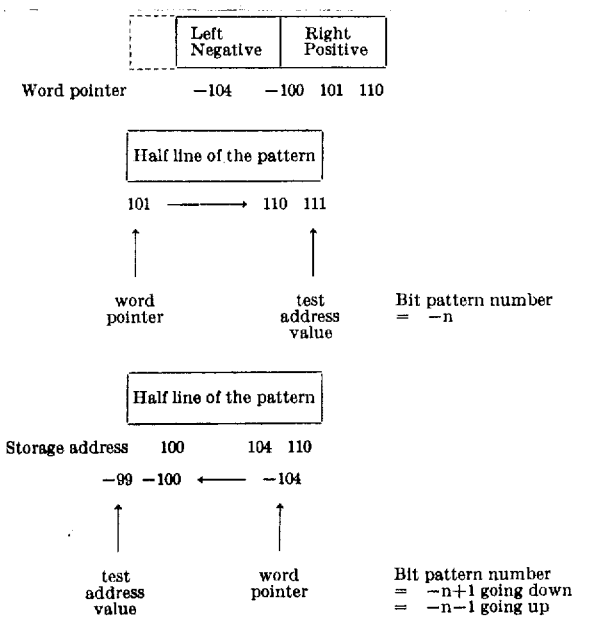

The word pointer must be made negative, and the number of stitches in a half line of pattern plus one (12) must be added to it. The number of stitches in the remainder (5) must be subtracted from the result to give the new word pointer.

The test address value must be made negative, and the number of stitches in a half line of pattern plus one must be added to it.

The instruction which accesses the words must be changed to cater for a negative word pointer.

The following table shows a right movement after a right movement.

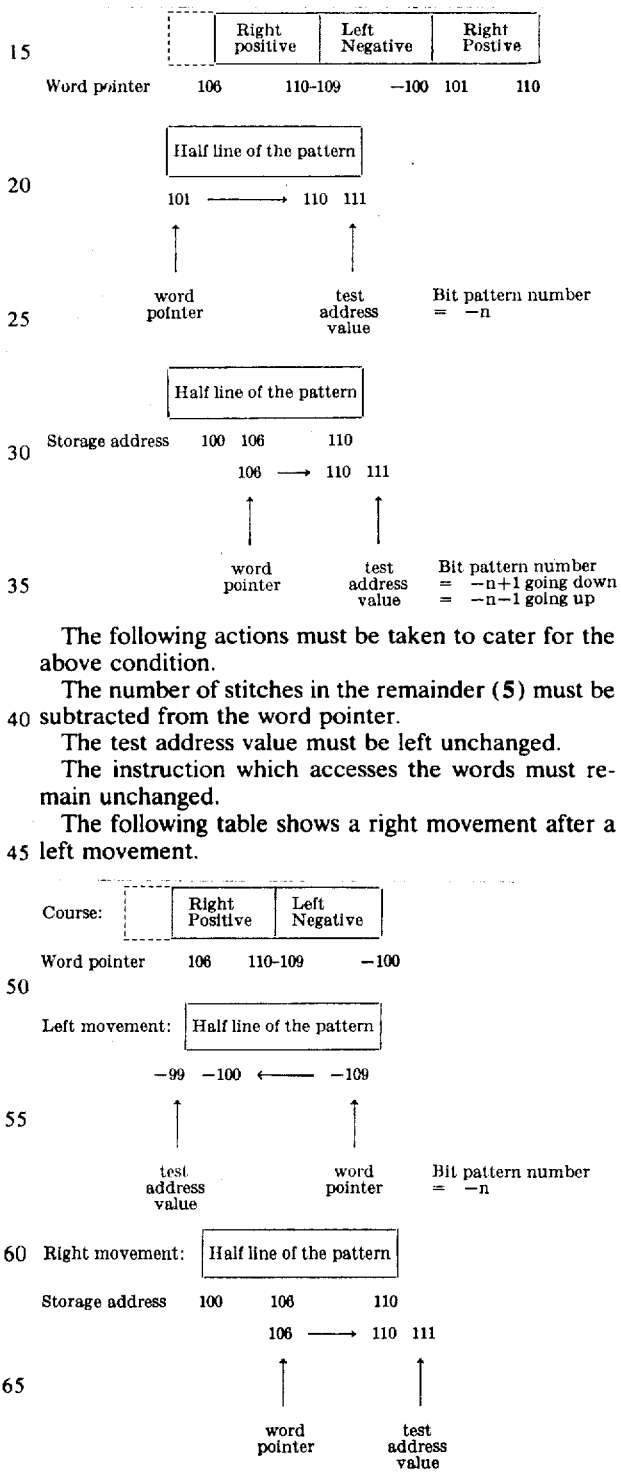

The following actions must be taken to cater for the above condition.

The number of stitches in the remainder (5) must be subtracted from the word pointer.

The test address value must be left unchanged.

The instruction which accesses the words must remain unchanged.

The following table shows a right movement after a left movement.

The following actions must be taken to cater for the above condition.

The word pointer must be made positive, and the number of stitches in a half line of the pattern plus one (12) must be added to it. The number of stitches in the remainder (5) must then be subtracted from the result to give the new word pointer.

The test address value must be made positive, and the number of stitches in a half line of pattern plus one must be added to it.

The instruction which accesses the words must be changed to cater for a positive word value.

Subroutine RESET caters for whichever of these conditions occurs, and the relevant instructions begin at the EOC label.

The next most frequent condition is referred to as the 'end of word' condition. The words of pattern data used by program A hold the bit patterns representing a number of blocks from a column of of pattern data. When all the bit patterns in each and every word holding a number of half lines of the pattern and referred to as a 'line' of words have been used a new line of words has to be used for the next course. If the word pointer is positive for the movement at the start of a course, the selection of the next line of words is achieved simply by adding the number of bit patterns in a half line of pattern to the word pointer and test address value as calculated in cases 3 and 4 above in order to increase their numeric value, when going down, or subtracting that number of bit patterns in order to decrease their numeric value, when going up. If the word pointer is negative for the movement at the start of a course the selection of the next line of words is achieved subtracting the number of bit patterns in a half line of pattern from the word pointer and test address value as calculated in cases 1 and 2 above in order to increase their numeric value, when going down, or adding that number of bit patterns in order to decrease their numeric value, when going up.

The bit pattern number is reset to the value appropriate for the first bit pattern in a word when going down, and the last bit pattern in a word, when going up. The masks used to extract and test the bit patterns for this actuator must be changed by changing the appropriate instructions in the actuator routine using the bit pattern number. Appropriate action is taken over the instruction which accesses the words as specified in cases 1 to 4 above. The following diagram illustrates this in case 1.

The following table shows a left movement after a left movement at the end of the previous course, with the actuator going down relative to the pattern.

| Old course: | Left Negative | Right Positive | Left Negative |
|---|---|---|---|

Word pointer   −98   −89 90   99-98   −89

| New course: | Left Negative | Right Positive | Left Negative |
|---|---|---|---|

Word pointer   −104   −100 101   110-109   −100

Left Movement:   −88   −80   ←   −98

↑ test address value     ↑ word pointer     Bit pattern number = −1

| Old half line | New half line |
|---|---|

Storage address   89   93   99   100   104   110
Left movement:            −99  −100 ← −104

↑ test address value     ↑ word pointer

Bit pattern number = −8
(assuming 8 bit patterns to a word).

In this case, therefore, we must subtract the number of bit patterns in a half line of pattern from the word pointer in order to add to its numeric value and make the actuator go down relative to the pattern, because the word pointer is negative.

The end of word condition is catered for by subroutine RESET, and the relevant instructions start at the label NOTOP.

The half line at the top of the pattern is always represented by the first set of bit patterns in a line of words to conserve storage. Consequently, the test for reaching the top of the pattern is a word pointer address of a certain value and the end of word condition. But the action taken is similar to that taken at the end of a course because the same line of words will be used for the next course. The following additions to the action taken at the end of a course cater for the top of pattern condition. Up is reset to down. The bit pattern number is set to a value appropriate to the second set of bit patterns in the line of words with consequent changes to the instructions in the actuator routine.

The following table illustrates this condition.

| Material: Next course: | Left Negative | Right Positive | Left Negative |
|---|---|---|---|

−104   −100   101   110-109   −100

| Top course: | Left Negative | Right Positive | Left Negative |
|---|---|---|---|

−104   −100   101   110-109   −100

| Last course before the top course: | Left Negative | Right Positive | Left Negative |
|---|---|---|---|

−104   −100   101   110-109   −100

It should be noted that the next course and the last course before the top course are identical, because of the horizontal axis of symmetry in this pattern.

Left movement   −99   −100   ←   −109

↑ test address value     ↑ word pointer     Bit pattern number = −8

| Top half line | |
|---|---|

Storage address   100   104   110
Left movement   −99   −100   ←   −104

↑ test address value     ↑ word pointer and top of pattern test value     Bit pattern number = −7

The top of pattern condition is catered for by subroutine RESET, and the relevant instructions start with label TOP.

A similar condition occurs at the bottom of the pattern, although the bottom of the pattern may not occur at the end of a word. Appropriate action is taken in subroutine RESET to cater for the bottom of the pattern, and the relevant instructions start at label BOP.

Program A is used for the control of one textile producing machine by one computer using one pattern of four colours but no stitch variations with contiguous rectangular repeated areas, arranged as a matrix, whose blocks store information concerning single face stitches. The program caters for a pattern of undetermined size with horizontal and vertical axes of symmetry. The axes of symmetry run through stitches rather than between them so that the stitch on an axis of symmetry never repeats adjacent to itself.

Program A assumes that a number of stitches are left over above the repeats in a course and are knitted at the start of the course. The first and last parts of a course are assumed to use the pattern by moving left across it. The program assumes that all the actuators manufacture all the lines of the pattern and that the words of storage holding pattern data hold successive bit patterns representing the blocks in a column of pattern data. The textile producing machine can have any number of actuators and any number of needles. Provision can be made to duplicate part of this program to allow the control of a second textile producing machine producing the same pattern, provided certain minor alterations are made to the program.

A series of modifications to the program provide buffered output, the storage of lines of pattern in their order of occurence and the output of large blocks.

| Label | Operation | Operand | Comment | Cycles |
|---|---|---|---|---|
| Storage for the interrupt subroutine. | | | | |
| ØUT1 | Octal | 135740 | Storage for output bits 00 - 15. | |
| ØUT2 | Octal | 026047 | Storage for output bits 16 - 31. | |
| ØUT3 | Octal | 172563 | Storage for output bits 32 - 47. | |

Storage words can be provided to hold as many output bits as are required. It should be noted that the initial values of the output words allow an immediate interrupt at the start of operation. The initial values of the output words are for the first output in a course.

| Label | Operation | Operand | Comment |
|---|---|---|---|
| NEWLB | Octal | 0 | Temporary storage for the B register. |
| NPØS | Octal | 177777 | Minus count of the needle position. An initial value of minus one forces the textile machine and the computer into step as soon as possible. See the interrupt routine for details. |
| FLAG | Octal | 0 | Output complete flag. This flag is not set because we do not need to set up the output words at the start of operation. |

Constants for the interrupt subroutine

| Label | Operation | Operand | Comment |
|---|---|---|---|
| MNN | Decimal | -U | Minus the number of needle positions on this textile machine. |

| Label | Operation | Operand | Comment | Cycles |
|---|---|---|---|---|

The storage words used by the actuator routines.

It should be noted that there are initial values but that the values given are not intended to be significant.

| Label | Operation | Operand | Comment | |
|---|---|---|---|---|
| A00ST | Octal | 000370 | Actuator 00 status word: Bits 0 - 7 Count of the number of half patterns to be completed in this course. Maximum value 256. Bits 8 - 11.The Bit pattern number. Maximum value 16. Bits 12 - 13 The colour on this actuator. Bit 14 spare. Bit 15 Up/down flag. | |
| A00W | Absolute | -BEGIN-(exp 1) | Actuator 00 word pointer. | |
| A00T | Absolute | -BEGIN-(exp 2) | Actuator 00 test address value. | |
| A01ST | Octal | 011773 | Actuator 01 status word. | |
| A01W | Absolute | BEGIN+(exp 3) | Actuator 01 word pointer. | |
| A01T | Absolute | BEGIN+(exp 4) | Actuator 01 test address value. | |
| . | | | | |
| . | | | | |
| . | | | | |
| . | | | | |
| A15ST | Octal | 030371 | Actuator 15 status word. | |
| A15W | Absolute | -BEGIN-(exp 31) | Actuator 15 word pointer. | |
| A15T | Absolute | -BEGIN-(exp 32) | Actuator 15 test address value. | |

The values of the expressions above are dependent on both the pattern and the knitting machine. The program itself can be used to calculate these values.

Bit pattern extract and compare masks for 4 colours.

Colour A bit pattern is always zero.

Colour B masks.

| BIT0 | Octal | 1 | 01 |
| BIT2 | Octal | 4 | 0100 |
| BIT4 | Octal | 20 | 010000 |
| BIT6 | Octal | 100 | 01000000 |
| BIT8 | Octal | 400 | 0100000000 |
| BIT10 | Octal | 2000 | 010000000000 |
| BIT12 | Octal | 10000 | 01000000000000 |
| BIT14 | Octal | 40000 | 0100000000000000 |

Colour C masks.

| BIT1 | Octal | 2 | 10 |
| BIT3 | Octal | 10 | 1000 |
| BIT5 | Octal | 40 | 100000 |
| BIT7 | Octal | 200 | 10000000 |
| BIT9 | Octal | 1000 | 1000000000 |
| BIT11 | Octal | 4000 | 100000000000 |
| BIT13 | Octal | 20000 | 10000000000000 |

| Label | Operation | Operand | Comment | Cycles |
|---|---|---|---|---|

Colour D and unpacking masks

| Label | Operation | Operand | | Cycles |
|---|---|---|---|---|
| MASK1 | Octal | 3 | | 11 |
| MASK2 | Octal | 14 | | 1100 |
| MASK3 | Octal | 60 | | 110000 |
| MASK4 | Octal | 300 | | 11000000 |
| MASK5 | Octal | 1400 | | 1100000000 |
| MASK6 | Octal | 6000 | | 110000000000 |
| MASK7 | Octal | 30000 | | 11000000000000 |
| MASK8 | Octal | 140000 | | 1100000000000000 |

The storage words used by the RESET subroutine. The RESET subroutine can be used by more than one program provided the textile machines controlled by said programs are producing the same pattern. The programs will not of course use the RESET subroutine simultaneously.

| Label | Operation | Operand | Comment |
|---|---|---|---|
| ØUTN | Octal | 0 | Holds the output word currently in the B register. |
| CNT8 | Octal | 0 | Temporary storage for the bit pattern number. |

Pointers.

| Label | Operation | Operand | Comment |
|---|---|---|---|
| ASTAT | Octal | 0 | Points to the current actuator status word. |

Constants.

| Label | Operation | Operand | Comment |
|---|---|---|---|
| M1 | Decimal | -1 | 1111111111111111 |
| M3 | Decimal | -3 | 1111111111111101 |
| M7 | Decimal | -7 | 1111111111111001 |
| M8 | Decimal | -8 | 1111111111111000 |
| PØFST | Decimal | X | The part of the pattern left over at the left hand side of the course. |
| MØFST | Decimal | -X | The offset is negative for left movement. The offset is also negative for right movement. |
| PNSLP | Decimal | W | The number of stitches in a line of half pattern. |
| MNSLP | Decimal | -W | Minus the number of stitches in a line of half pattern. |
| EØPCV | Decimal | -Y | The end of pattern value of the bit pattern number. |
| ICNT8 | Decimal | -Z | The initial value of the bit pattern number at the bottom of the pattern. |
| PNSHM | Decimal | W-1 | The number of stitches in a line of half pattern minus one. |

| Label | Operation | Operand | Comment | Cycles |
|---|---|---|---|---|
| Masks. | | | | |
| ADDX | Octal | 001777 | 0000001111111111 10 bit address mask. | |
| MSK1 | Octal | 177400 | 1111111100000000 | |
| MSK2 | Octal | 170377 | 1111000011111111 | |
| IAST | Octal | 00740V | 00001111BBBBBBBB Leading ones and the initial value of the minus number of half patterns completed in a course. | |

Instruction pointer.

| Label | Operation | Operand | Comment |
|---|---|---|---|
| PØINT | Octal | 0 | Points to the instructions in the actuator routine. |

Instructions.

| Label | Operation | Operand |
|---|---|---|
| JSB | Jump to Subroutine | LDIW |
| LDAI | Load the A register with the contents of the address held in the A register. | |
| IMASK | A register and memory | MASK8+1 |
| ISEL | Add to the A register | ISEL |
| ITSTB | Compare the A register with | BIT14+1 |
| ITSTC | Compare the A register with | BIT15+1 |
| ITSTD | Compare the A register with | MASK8+1 |

Address constants.

| Label | Operation | Operand | Comment |
|---|---|---|---|
| BØPAV | Absolute | -END+W-X | The bottom of pattern store address value modified by offset. |
| TØPAV | Absolute | -BEGIN-X+1 | The top of pattern store address value modified by offset. |

Storage used by power fail routine.

| Label | Operation | Operand | Comment |
|---|---|---|---|
| SAVEA | Octal | 0 | Temporary storage for the A register. |
| SAVEB | Octal | 0 | Temporary storage for the B register. |
| SAVEP | Octal | 0 | Temporary storage for the program location counter. |

The beginning of a rotation and a new needle position are arranged to come simultaneously and share a common interrupt and interrupt subroutine for convenience.

| Operation | Operand | Comment | Cycles |
|---|---|---|---|
| Jump to subroutine | NEWL | The interrupt location for the textile machine. The computer forces execution of this instruction on an interrupt from the textile machine. | 2 |

| LABEL | Operation | Operand | Comment | Cycles |
|-------|-----------|---------|---------|--------|

The program continues after the interupt locations.

NEWL — No operation — — Holds the/return address

| | Store the B register in | NEWLB | Save the contents of the B register. | 2 |
| | Load the B register with | ØUT1 | Load an output word. | 2 |
| | Output the B register to channel | N | Output 16 bits in parallel to the buffer on output channel N. In general no control signal would be required by the textile machine and the output lines from the buffer would give a steady signal and only be reset by the next 16 bits output on channel N. So no interrupt is required when the output is finished. | 2 |

Any number of words or bits may be output in this way to any number of channels.

| | Increment memory and then skip the next instruction if the result is zero | NPØS | Test the needle position count to see whether the computer expects the beginning of a new rotation. | 3 |
| | Jump to | IEXIT | The count is still negative so take a normal exit as the computer says it is not the beginning of a new rotation. | 2 |

The computer says it is the beginning of a new rotation.

| | Input into the B register | N | Load the input signal from the input buffer on channel N. If Bit 15 is set this signifies the beginning of a new rotation. | (2) |
| | Skip if the B register is negative | | Test whether the hardware says it is the beginning of a new rotation. | (2) |
| | Jump to | HØLD | Positive, so the computer and the textile producing machine are out of step. | N/A |

Negative, so the computer and the textile producing machine are in step

| | Load the B register with | MNN | Minus the number of needles. | (2) |
| | Store the B | NPØS | Reset the needle position | (2) |

| Label | Operation | Operand | Comment | Cycles |
|---|---|---|---|---|
| IEXIT | Increment memory and then skip the next instruction if the result is zero. | FLAG | FLAG is never minus one so there will be no skip. This instruction sets the output complete flag to allow the next setup of output words. | 3 |
| | Load the B register with | NEWLB | Restore the B register | 2 |
| | Set and clear/control bistables on channel | N | Set and clear the appropriate control bistable on channel N to allow the next interrupt. | 2 |
| | Jump to the address in | NEWL | Exit from the interrupt subroutine. | 3 |

The computer but not the hardware says it is the beginning of a rotation. Make the computer wait for the textile machine.

| Label | Operation | Operand | Comment | Cycles |
|---|---|---|---|---|
| HØLD | Clear and then complement the B register. | | Set the B register to minus one to force a computer beginning of rotation condition on the next interrupt. | N/A |
| | Store the B register in | NPØS | Store in the needle position count. | N/A |
| | Jump to | IEXIT+1 | Exit but do not allow new output words to be setup. | N/A |

The entry point at start of operation.

| Label | Operation | Operand | Comment | Cycles |
|---|---|---|---|---|
| START | Enable all interrupts. | | | N/A |
| | Set and clear the Control bistables on channel. | N | Set and clear the appropriate control bistables on channel N to allow the first interrupt. | N/A |

Wait loop

| Label | Operation | Operand | Comment | Cycles |
|---|---|---|---|---|
| WAIT | Load the B register with | FLAG | | 2 |
| | Skip if bit 0 of the B register is one. | | Test bit 0 of FLAG | 2 |
| | Jump to | WAIT | Bit 0 is zero so the output is not complete. | 2 |

Bit 0 is one so the output is complete.

| Label | Operation | Operand | Comment | Cycles |
|---|---|---|---|---|
| | Clear the B register. | | | 2 |
| | Store the B register in | FLAG | Reset FLAG | 2 |

Actuator routines.

| Label | Operation | Operand | Comment | Cycles |
|---|---|---|---|---|

The B register has been cleared to hold the first output word. The following coding repeats for all the actuators with minor variations. The colour of the yarn being fed at the actuator position will normally be the colour specified in the program for that actuator. The actuator 00 routine is left going initially.

| Label | Operation | Operand | Comment | Cycles |
|---|---|---|---|---|
| | Increment memory and then skip the next instruction if the result is zero. | A00W | A00W is always large and negative when going left so there is no skip and the word pointer becomes $-N+1 = -(N-1)$ to point to the next word left. | 3 |
| | Load the A register with | A00W | Load this word pointer value. | 2 |
| | Compare the A register with | A00T | Compare it with the (negative) test address value. | 2 |
| | Jump to Subroutine | RESET | They are equal so the half line of pattern is complete. | N/A |
| | Jump to Subroutine | LDIW | They differ. Jump to a subroutine to load the word holding the current bit pattern for this actuator using a negative word pointer. | 2 |
| | A register and memory | MASK1 | Extract the bit pattern in the word using the appropriate mask for this course. It should be noted that there is an initial value for the operand, but that its value is not intended to be significant as it is dependent on pattern size. | 2 |
| | Skip if the A register is not zero. | | Compare the bit pattern with the appropriate value for the colour on this actuator (colour A) in appropriate position in word for this course. (Colour A is always zero). | 2 |
| | Add to the B register | BITO | Add the output bit for this actuator on a match. It should be noted that it is possible to change the block represented by the bit pattern by changing this instruction. This enables the various colour ways to be knitted in real time. | (2) |

3 words of storage are required per actuator so the routine is 11 words in total. The LDIW subroutine takes 8 cycles so the routine takes 21 cycles normally and 23 cycles on a bit pattern match.

| Label | Operation | Operand | Comment | Cycles |
|---|---|---|---|---|

The actuator 01 routine is right moving initially

| | Increment memory and then skip the next instruction if the result is zero. | A01W | A01W is always positive going right so there is no skip and A01W points to the next word right. | 3 |
| | Load the A register with | A01W | Load this word pointer value | 2 |
| | Compare the A register with | A01T | Compare it with the test address value. | 2 |
| | Jump to subroutine | RESET | They are equal so the half line is complete. | N/A |
| | Load the A register with the contents of the address held in the A register. | | They differ. Load the word holding the current bit pattern for this actuator. | 3 |
| | A register and memory | MASK 1 | Extract the bit pattern in the word with the appropriate mask for this course. It should be noted that there is an initial value of this operand. | 2 |
| | Compare the A register with | BITO | Compare the bit pattern with the appropriate value for the colour on this actuator (colour B) in the appropriate position in the word for this course. It should be noted that there is an initial value of this operand. | 2 |
| | Add to the B register | BIT1 | Add an output bit for this actuator on a match. | (2) |

The actuator 15 routine is left moving initially

| | Increment memory and then skip the next instruction if the result is zero | A15W | A15W is always negative going left so there is no skip and the word pointer becomes $-N+1=-(N-1)$ to point to next word left. | 3 |
| | Load the A register with | A15W | Load this word pointer value. | 2 |
| | Compare the A register with | A15T | Compare it with the (negative) test address value. | 2 |
| | Jump to Subroutine | RESET | They are equal so the half line is complete. | N/A |
| | Jump to Subroutine | LDIW | They differ. Jump to subroutine to load the word holding the current bit pattern for this | 2 |

| Label | Operation | Operand | Comment | Cycles |
|---|---|---|---|---|
| | A register and memory | MASK 4 | Extract the bit pattern in the word using the appropriate mask for this course. It should be noted that there is an initial value of this operand. | 2 |
| | Compare the A register with | MASK 4 | Compare the bit pattern with the appropriate value for the colour on this actuator (colour D) in appropriate position in word for this course. It should be noted that the initial value of the operand is same as last instruction. | 2 |
| | Add to the B register | BIT15 | Add output bit for this actuator on a match. | (2) |
| | Store the B register in | OUT1 | Store output word 1. | 2 |
| | Clear the B register | | Clear the B register to hold output word 2. | 2 |

This procedure continues until all the output bits for all the actuators have been completed.

| | Jump to | WAIT | Go back into the wait loop until the interupt routine says output complete again. | 2 |

Three words of storage are required for each actuator routine so each routine is eleven words in total.

The right moving routine takes 14 cycles normally and 16 cycles on a match. Consequently the average of the times for the left and right moving routines is 17.5 cycles normally and 19.5 cycles on a match. Since a match takes place one in two times for a two colour pattern and less often for other variations the average time per routine is less than or equal to 18.5 cycles.

Subroutine loads a word using a negative word pointer.

| Label | Operation | Operand | Comment | Cycles |
|---|---|---|---|---|
| LDIW | No operation. | | Holds the return address. | |
| | Complement and then increment the A register. | | Make the pointer value positive and true. | 2 |
| | Load the A register with the contents of the address held in the A register. | | Load the word holding the current bit pattern for this actuator. | 3 |
| | Jump to the address in | LDIW | Return. | 3 |

This subroutine changes an actuator routine at the end of a half line, course, word, or pattern, for that actuator.

B/F 2

| Label | Operation | Operand | Comment | Cycles |
|---|---|---|---|---|
| RESET | No operation. | | This word holds the address after the ' Jump to subroutine RESET ' instruction. | |
| | Store the B register in | ØUTN | Store the output word currently being assembled. | 2 |
| | Store the contents of the A register in the B register. | | Transfer the current word pointer to the B register for use in the remainder of the actuator routine. | 2 |
| | Load the A register with | RESET | Load the return address. | 2 |
| | Store the A register in | PØINT | Store it for use as the instruction pointer. | 2 |
| | Add to the A register | M3 | Adding minus three makes the A register hold the address of the ' Load A register with ANNW ' instruction in the actuator routine. | 2 |
| | Load the A register with the contents of the address held in the A register. | | Load the ' Load A register with ANNW ' instruction. | 3 |
| | Add to the A register | M1 | Add minus one. | 2 |
| | A register and memory | ADDX | Extract the 10 bit address of ANNW-1. | 2 |
| | Store the A register in | ASTAT | Store the status word address for later use. | 2 |
| | Load the A register with the contents of the address in | ASTAT | Load the status word for this actuator | 3 |
| | Inclusive or the A register with | MSK1 | Extract the number of half lines of pattern completed this course while leaving leading ones. | 2 |
| | Increment the A register. Skip if the result is not zero. | | Increment that negative number and then test the result. | 2 |
| | Jump to | EØC | Zero result. The course is complete. | (2) |

Not zero result, so not the end of a course.

| Label | Operation | Operand | Comment | Cycles |
|---|---|---|---|---|
| | Increment memory and then skip if the result is zero, using the contents of the address in. | ASTAT | The stored value of the number of half lines of pattern completed this course was not minus one, and cannot therefore overflow, so this instruction only increments the stored value directly. | 4 |
| | Load the A register with | JSB | Load the A register with a ' Jump to subroutine - LDIW' instruction. | 2 |
| | Compare the A register with the contents of the address in | RESET | Compare this instruction with the return instruction. | 3 |

The next instruction is interchangeable with the last load instruction. It may not always be executed. The following instructions may also be rearranged to cater for the four permutations of the movements at the start and end of a course.

| Label | Operation | Operand | Comment | Cycles |
|---|---|---|---|---|
| | Load the A register with | LDAI | They are equal, so we have just come left. Load the A register with a 'Load A register with the contents of the address held in the A register' instruction instead. | 2 |
| | Store the A register in the location at the address in | RESET | Store the appropriate instruction in order to go left or right. | 3 |
| | Load the A register with | PNSHM | The number of stitches in a half line of pattern minus one, which is always positive as the test address value is always numerically greater than or equal to the word pointer. | 2 |
| | Complement and then increment the B register. | | The common stitch never repeats so the word pointer changes sign. | 2 |
| | Add to the B register | BIT$_1$ | Add plus 2 to correct the word pointer. | 2 |
| EXIT | Increment memory and then skip the next instruction if the result is zero. | ASTAT | ASTAT now points to the word pointer for the current actuator. | 3 |
| | Store the B register in the location at the address in | ASTAT | Store the new word pointer | 3 |

| Label | Operation | Operand | Comment | Cycles |
|---|---|---|---|---|
| | Increment memory and then skip the next instruction if the result is zero. | ASTAT | ASTAT now points to the test address value for the current actuator. | 3 |
| | Add the B register to the A register. | | The test address value equals the word pointer plus either the number of stitches in a half line of pattern or the offset. | 2 |
| | Store the A register in the location at the address in | ASTAT | Store the new test address value. | 3 |
| | Load the A register with the contents of the B register. | | Restore the word pointer to the A register for the remainder of the actuator routine. | 2 |
| | Load the B register with | ØUTN | Restore the current output word to the B register. | 2 |
| | Jump to the location at the address in | RESET | Return to the actuator routine. | 3 |

The End of course for an actuator.     B/F 2

| Label | Operation | Operand | Comment | Cycles |
|---|---|---|---|---|
| EØC | Load the A register with the contents of address in | ASTAT | Load the status word. | 3 |

The following coding assumes a left movement at the start of a new course.

| Label | Operation | Operand | Comment | Cycles |
|---|---|---|---|---|
| | ( Complement and then increment the B register. ) | | ( The word pointer is positive only if the last course was right moving in which case this instruction makes the word pointer negative for the start of a new course. ( If there is a right movement at the start of a new course then the word pointer should be made positive. ) This instruction is not needed if the movements at the start and end of a course are the same.) | (2) |
| | Add to the B register | MØFST | MØFST caters for that part of a pattern which is left over at the left hand side of a course. The Offset is negative for both left and right moving remainders. | 2 |
| | Skip if the A register is positive. | | Test whether we are moving up or down. | 2 |

| Label | Operation | Operand | Comment | Cycles |
|---|---|---|---|---|
| | Inclusive or the A register with | MSK2 | 1111000011111111 Extract the bit pattern number by setting all other bits to ones. | 2 |
| | Rotate the A register 8 bits left. | | 1111111111110000 The bit pattern number becomes a true negative number. | 2 |

The following instruction is part of the test for the bottom of the pattern. The test value is always positive or always negative as the remainder at the start of a course is always left or always right moving.

| Label | Operation | Operand | Comment | Cycles |
|---|---|---|---|---|
| | Compare the B register with | BØPAV | Compare the result with bottom of pattern test address value modified by MØFST. | 2 |
| | Jump to | BØP | Equal, so go and complete the test for the bottom of the pattern. | 2 |

Not the bottom of the pattern.

| Label | Operation | Operand | Comment | Cycles |
|---|---|---|---|---|
| NØBØP | Increment the A register and then skip the next instruction if it is zero. | | Increment the bit pattern number and then test for the end of word when going down. | 2 |
| | Jump to | NØTEW | Not zero, so not the end of a word. | 2 |
| | Add to the B register | MNSLP | This value assumes that there is a left movement at the beginning of the course and is therefore negative to add to the numeric value of the word pointer for the current actuator. | 2 |
| | Load the A register with | M8 | Load minus eight as no bit patterns have been used in the new word. | 2 |

Not the end of a word for both up and down movement, and the entry to the common routine for other conditions.

| Label | Operation | Operand | Comment | Cycles |
|---|---|---|---|---|
| NØTEW | Store the A register in | CNT8 | Store the appropriate value as the new bit pattern number. | 2 |
| | Increment memory amd then skip the next instruction if the result is zero. | PØINT | Point to the next instruction in the actuator routine. | 3 |
| | Add to the A register | IMASK | Use the new bit pattern number to modify the ' A register and memory MASK8+1 ' instruction. | 2 |
| | Store the A register in the location at | PØINT | Store the modified instruction in the current | 3 |

| Label | Operation | Operand | Comment | Cycles |
|---|---|---|---|---|
| | Increment memory and then skip the next instruction if the result is zero. | PØINT | Point to the next instruction in the actuator routine. | 3 |

The next two instructions are not needed if the movements at the start and end of a course are the same.

| Label | Operation | Operand | Comment | Cycles |
|---|---|---|---|---|
| | ( Load the A register with | JSB | Load a ' Jump to subroutine LDIW ' instruction. | (2) |
| | Store the A register in the location at the address in | RESET | Store it to force a left movement at the start of the new course. ) | (3) |
| | Load the A register with the contents of the address in | ASTAT | Load the status word for the current actuator. | 3 |
| | A register and memory | MASK7 | Extract the colour code for this actuator. | 2 |
| | Rotate the A register left 4 bits. | | | 2 |
| | Skip if the A register is not zero. | | | 2 |
| | Jump to | NØACT | Zero indicates that this actuator routine is testing for colour A and does not use a compare instruction. | (2) |

Make up the new compare instruction.

| Label | Operation | Operand | Comment | Cycles |
|---|---|---|---|---|
| | Add to the A register | ISEL | The A register holds the colour. Use it to make up an instruction to select the correct set of masks for this colour. | 2 |
| | Store the A register in | I | Store that instruction for later use. | 2 |
| | Load the A register with | CNT8 | Load the bit pattern number to modify the compare instruction to make it select the correct bit patterns in the words. | 2 |
| I | No operation | | Add the appropriate compare instruction. | 2 |
| | Store the A register in the location at the address in | PØINT | Store the modified instruction in the current actuator routine. | 3 |

| Label | Operation | Operand | Comment | Cycles |
|---|---|---|---|---|
| | Assemble the new status word for the current actuator. | | | |
| NØACT | Load the A register with the contents of the address in | ASTAT | Load the status word for the current actuator. | 3 |
| | A register and memory | MSK1 | 1111111100000000 Extract the up/down flag for the current actuator. | 2 |
| | Inclusive or the A register and memory | IAST | Merge in the initial value of the negative number of half patterns completed in this course. The bits in positions 8 - 11 will later preserve CNT8. | 2 |
| | Rotate the A register left 8 bits. | | Put the flag in bit 7 of the A register. | 2 |
| | A register and memory | CNT8 | 111111111111BBBB Merge the new bit pattern number into the A register. The leading ones preserve the colour and flag. | 2 |
| | Rotate the A register left 8 bits. | | Rotate the A register back to its original position. | 2 |
| | Store the A register in the location at the address in | ASTAT | Store the new status word for this actuator. | 3 |
| | Load A register with | PØFST | Load the A register with the offset for the remainder of the course. A positive value must be used. | 2 |
| | Jump to | EXIT | | 2 |
| UP | Inclusive or the A register with | MSK2 | 1111000011111111 Extract the bit pattern number by setting all the other bits to ones. | 2 |
| | Rotate the A register 8 bits left. | | 1111111111110000 The bit pattern number becomes a true negative number. | 2 |
| | Compare the A register with | M8 | Test for the end of the word when going up. | 2 |
| | Jump to | TØP | The end of a word. Go and try the top of pattern test. | 2 |
| | Add to the A register | M1 | Not the end of a word. Add minus one to give the next bit pattern number up. | 2 |
| | Jump to | NØTEW | Join the main routine. | 2 |

| Label | Operation | Operand | Comment | Cycles |
|---|---|---|---|---|

Test for the bottom of the pattern.

| Label | Operation | Operand | Comment | Cycles |
|---|---|---|---|---|
| BØP | Compare the A register with | EØPCV | Compare the bit pattern number with the value at the end of the pattern. | 2 |
| | Jump to | YBØP | Equal. | 2 |
| | Jump to | NØBØP | Different, so not the bottom of the pattern. | 2 |

The bottom of the pattern.

| Label | Operation | Operand | Comment | Cycles |
|---|---|---|---|---|
| YBØP | Load the A register with the contents of the address in | ASTAT | Load the status word. | 3 |
| | Inclusive or the A register with memory | BIT15 | We came down so the actuator status is positive and bit 15 merges in to change to up. | 2 |
| | Store the A register in the location at the address in | ASTAT | Store the new status word. | 3 |
| | Add to the B register | PNSLP | If the last line in the pattern is the only line in the last word, we need next the line up as the common line never repeats. We assumed a left at the beginning of the line so the word pointer is negative. We need to add a positive value to go back up the pattern by reducing the numerical value of the word pointer. | 2 |
| | Load the A register with | ICNT8 | Load the initial value of the bit pattern number. In the above case the value is -1. (EØPCV = -8) | 2 |
| | Jump to | NØTEW | | 2 |

The end of a word when going up. Test for the top of the pattern.

| Label | Operation | Operand | Comment | Cycles |
|---|---|---|---|---|
| TØP | Compare the B register with | TØPAV | Compare the result with the top of pattern store address value modified by MØFST. | 2 |
| | Jump to | YTØP | Equal, so the top of the pattern. | 2 |

The end of a word, but not the top of the pattern.

| Label | Operation | Operand | Comment | Cycles |
|---|---|---|---|---|
| | Add to the B register | PNSLP | Add the number of stitches in a half line of pattern. | 2 |
| | Clear and then complement the A register. | | Minus one is the bottom bit pattern number. | 2 |

| Label | Operation | Operand | Comment | Cycles |
|---|---|---|---|---|
| | Jump to | NØTEW | Return to the main routine. | 2 |

The top of the pattern.

| Label | Operation | Operand | Comment | Cycles |
|---|---|---|---|---|
| YTØP | Load the A register with the contents of the address in | ASTAT | Load the status word. | 3 |
| | Exclusive or the A register and memory | BIT15 | We came up so the actuator status is negative. Bit 15 of the A register is the only modulus two sum and thus changes to zero for a down movement. | 2 |
| | Store the A register in the location at the address in | ASTAT | Store the new status word. | 3 |
| | Load the A register with | M7 | Load minus seven as the next line must be the second line in the pattern. | 2 |
| | Jump to | NØTEW | Return to the main routine. | 2 |

Buffered output

Program A assembles a set of words for output to the actuators of a circular knitting machine after each interupt. Since one set of output words is already stored at the start of operation, program A is always one step ahead of the knitting machine.

However, a number of software buffers, each containing one set of words for output to the actuators, may be provided. These buffers may be emptied by interupts and filled by the actuator routines in rotation, thus allowing the program to be several steps ahead of the knitting machine. This lead allows the knitting machine to run faster.

There must be sufficient time between the interupts to program A to allow the program to assemble the output words in whatever set of conditions requires the longest possible program execution time. However, the longest possible program execution time occurs very rarely, and the provision of buffers allows the time between interupts to approach the average execution time because the program is more than one step ahead of the knitting machine and can afford to take longer for one set of words as the extra time taken will merely reduce the program's lead over the knitting machine. This allows a considerable increase in the running speed of the knitting machine because the following events occur relatively infrequently for an actuator.

1. A colour match.
2. The end of a half line of the pattern.
3. The end of a course.
4. The end of a word.
5. The top or bottom of the pattern.

The following program modifications cater for buffering. It should be noted that these modifications do not check whether the textile machine is running too fast. Excessive textile machine speed may cause the program to output incorrect information. The absence of this check is normal practice unless the digital computer controls the speed of the textile machine.

| Label | Operation | Operand | Comment | Cycles |
|---|---|---|---|---|
| Interupt Routine. | | | | |
| NEWL | No operation. | | | |
| | Store the B register in | NEWLB | | N/C |
| | Load the B register with the contents of the address in | LDP | Load the output word indicated by the output pointer. | 3 |
| | Output the B register to | N | | N/C |

| Label | Operation | Operand | Comment | Cycles |
|---|---|---|---|---|
| | Increment memory and skip if the result is zero | LDP | The output pointer selects the next output word. | 3 |

This coding may repeat for as many output words as are required. The input of textile machine status should then be effected. This routine requires 4 extra cycles to output each word compared with unbuffered output.

. . .

| Label | Operation | Operand | Comment | Cycles |
|---|---|---|---|---|
| IEXIT | Load the B register with | LDP | | 2 |
| | Compare the B register with | ENDB | Test for the end of the output buffers. | 2 |
| | Load the B register with | INITP | The end of the output buffers. Select the first buffer again. | 2 |
| | Store the B register in | LDP | | 2 |
| | Clear and then complement the B register. | | Gives minus one. | 2 |
| | Add to the B register | FLAG | FLAG = 0: No buffers empty. FLAG = -E: E buffers empty. | 2 |
| | Store the B register in | FLAG | | 2 |
| RHØLD | Load the B register with | NEWLB | | N/C |
| | Set and clear the control bistables | N | | N/C |
| | Jump to the address in | NEWL | | N/C |
| HØLD | Clear and then complement the B register. | | | N/A |
| | Store the B register in | NPØS | | N/A |
| | Load the B register with | LDP | Bring the load pointer back to its position at the beginning of this interupt, assuming three words were output during the interupt. | N/A |
| | Add to the B register | M3 | | N/A |
| | Store the B register in | LDP | | N/A |
| | Jump to | RHØLD | Return to the main routine for the exit. | N/A |

Wait loop.

| Label | Operation | Operand | Comment | Cycles |
|---|---|---|---|---|
| WAIT | Load A register with | FLAG | | 2 |
| | Skip if A register is not zero. | | Test for empty buffers. | 2 |

| Label | Operation | Operand | Comment | Cycles |
|---|---|---|---|---|
| | Jump to | WAIT | No empty buffers. | 2 |
| | Increment memory and skip if zero<br>.<br>.<br>.<br>.<br>.<br>. | FLAG | Decrement the number of empty buffers. FLAG is only tested by the wait loop so this can be done anywhere. A single instruction cannot be interupted. | 3 |
| | Jump to subroutine | STØRE | | 2 |

This instruction replaces:

| Label | Operation | Operand | Comment | Cycles |
|---|---|---|---|---|
| | Store B register in | ØUT1 | | |
| | Clear B register.<br>.<br>.<br>.<br>. | | | |
| STØRE | No operation. | | | |
| | Store B register in location at address in | STP | Store assembled output word in appropriate buffer. | 3 |
| | Increment memory and skip if zero. | STP | Select the next output buffer. | 3 |
| | Load A register with | STP | Load store pointer. | 2 |
| | Compare A register with | ENDB | Test for the end of the buffers. | 2 |
| | Load the A register with | INITP | Start again at the first buffer. | 2 |
| | Store the A register in | STP | | 2 |
| | Clear the B register. | | Clear the B register in order to assemble the next output word. | 2 |
| | Jump to the location at the address in | STØRE | Return. | 3 |

Storage.

| Label | Operation | Operand | Comment |
|---|---|---|---|
| STP | Defined | ØUT1 | The initial value of the storage pointer gives the store to be used after the first interupt. |
| ENDB | Defined | ØUT12+1 | The test address value for the end of buffer condition. |
| INITP | Defined | ØUT1 | An address constant to reset the store pointer to the first buffer. |
| FLAG | Octal | 0 | No buffers are empty initially. |
| LDP | Defined | ØUT1 | The first interupt requires the first buffer to be output. |

| Label | Operation | Operand | Comment | Cycles |
|---|---|---|---|---|
| ØUT1 | Octal | 137056 | | |
| ØUT2 | Octal | 042077 | | |
| ØUT3 | Octal | 016235 | | |
| . | | | | |
| . | | | | |
| ØUT10 | Octal | 163476 | | |
| ØUT11 | Octal | 057003 | | |
| ØUT12 | Octal | 151251 | | |

It should be noted that we cannot use a common pointer test routine because the load routine takes place on an interupt and may destroy the contents of such a routine while it is being used for storage.

As has already been stated, there are certain advantages in storing the lines of a pattern in the order in which they are used, rather than the order in which they occur. But in some circumstances it is not possible to store the entire pattern in the order of use.

However, a stored program of computer instructions, designed to use the lines of pattern stored in the order in which they occur, may be greatly simplified in certain configurations of knitting machine, pattern, and digital computer, which are commonly met in practice. The following program modifications give the technique used for testing several word addresses for the end of pattern condition with particular reference to one of these special cases.

Let us consider a pattern, which has been stored line by line from the top of the pattern to the bottom in the order in which the lines occur, in the fast random access storage of a digital computer, in ascending address order, using the novel methods explained earlier. Given the number of knitting stations or actuators in the circular knitting machine being used to manufacture this pattern, and the number of actuators required to produce each course, it is possible to calculate the number of separate helixes being knitted at any one time. Let us assume that 48 actuators are available and that two actuators produce each course, one for each of two colours of yarn. The number of separate helixes is 24.

The number of bits required to store a bit pattern is easily calculated from the number of different bit patterns which make up the pattern data. If there are no possible style of stitch variations then each block can be represented by one bit whose state is zero for one colour and one for the other.

The fast random access storage of a digital computer can be visualised as comprising 'lines of words,' with the words orientated vertically, when using our novel methods of storage. Each word holds bit patterns from one or more lines in the pattern, depending on the size of the bit pattern in relation to the word. Given the number of bits in a word of fast random access storage, a fixed distance can be calculated in terms of lines of words, in which no two courses from the same helix occur in the material. Assuming a word length of 16 bits, this fixed distance is 1½ lines of words.

To avoid wasting fast random access storage, the top of the pattern should start at the beginning of a word, with a test address value of X. Since the fixed distance enclosing the top courses from all the helixes is 1½ lines of words, the stored program of computer instructions can test whether its current word address value indicates that the top of the pattern has been reached tests. The partially filled word is used for both a word address test and a test of the position of the bit pattern currently in use.

A similar procedure is used to test for the bottom of the pattern but in this case the pattern may not end at the end of a word but at the end of a half word. (Indeed, in other configurations, where the bottom of the pattern covers two partial words, the bottom of pattern test may require two word address tests of partially filled words and two tests of the bit pattern currently in use.)

The following diagram illustrates how the special circumstances chosen for this example allow one of only two actions to be taken for a downward movement of an actuator relative to the pattern according to whether the status of that actuator is 'odd' or 'even.' It should be noted that the axis of symmetry runs between two lines so that the common line at the top of the pattern repeats adjacent to itself.

| Line of words | Bit pattern | Corresponding Bit patterns | Actuator status | Action down, Bit pattern, owrd | | Action up, Bit pattern, word | |
|---|---|---|---|---|---|---|---|
| 1 | 0,1,2,3,4 | A | Odd | +4 | +1W | | |
| | 5,6,7 | B | Even | −4 | +2W | | |
| | 0,1,2,3 | C | Odd | +4 | +1W | | |
| | 4,5,6,7 | A | Even | −4 | +2W | −4 | −1W |
| 2 | 0,1,2 | B | Odd | +4 | +1W | +4 | −2W |
| | 3,4,5,6,7 | C | Even | −4 | +2W | −4 | −1W |
| 3 | 0,1,2,3,4 | A | | | | | |
| | 5,0,7 | B | | | | | |
| | 0,1,2,3 | C | | | | | |

| Label | Operation | Operand | Comment | Cycles |
|---|---|---|---|---|

The following extra storage is required for this program.

| Label | Operation | Operand | Comment | Cycles |
|---|---|---|---|---|
| ANDM1 | A register and memory | MASK1 | | |
| B15.0 | Octal | 100001 | 1000000000000001 | |
| P3 | Octal | 3 | Plus 3 | |
| RESET | No operation. | | | |

. . . . . .

| | Load A register with the contents of the address in | ASTAT | Load status word: Bits 0 - 7 odd/even count. 8 - 14 Count of number of half patterns completed in course. Maximum value 128. Bit 15 Up/down flag. | 3 |
| | Inclusive or A register with | MSK1 | In this case: 1000000011111111 | 2 |
| | Increment A register. Skip if result is not zero. | | | 2 |
| | Jump to | EØC | | (2) |
| | Load A register with the contents of the address in | ASTAT | | 3 |
| | Add to A register | BIT8 | 0000000100000000 | 2 |
| | Store A register at address in | ASTAT | | 3 |

. . . .

| EØC | Load the A register with | JSB | Force a left movement at the start of the next course | 2 |
| | Store the A register in the location at the address in | RESET | | 3 |
| | Increment memory and skip if the result is zero | PØINT | PØINT points to the ' A register and memory MASKN' instruction | 3 |

| Label | Operation | Operand | Comment | Cycles |
|---|---|---|---|---|
| | Load the A register with the contents of the address in | ASTAT | Up     1                    1 odd<br>Down 01111111XXXXXXX0 even | 3 |
| | Increment the A register. | | Swap odd and even before testing status | 2 |
| | Add to the B register | MØFST | | 2 |
| | A register and memory | IAST | The A register is:<br>Up     1           (guff) 1 odd<br>Down 01111111XXXXXXX0 even<br>IAST is:1NNNNNNN00000001<br>          Initial value | 2 |
| | Store the A register in the location at the address in | ASTAT | Store the new status word. | 3 |
| | Skip if the A register is positive | | Test for up or down | 2 |
| | Jump to | TØPQ | | 2 |
| | Compare the B register with | Y | Test for the bottom of the pattern. | 2 |
| | Jump to | YE | Go and test for even. | (2) |
| | Compare the B register with | YP1 | The test address value of the full word. | 2 |
| | Jump to | YP1ØE | Bottom of the pattern. | (2) |
| DØWN | Add to the B register | MNSLP | One line down. Add minus the number of stitches in a half line of pattern. | 2 |
| | Skip of bit 0 of the A register is one. | | Test for odd or even. | 2 |
| | Jump to | DE | Down and even. | 2 |
| PLUS | Load the A register with | BIT2 | Plus 4. | 2 |
| STA | Store the A register in | CNT8 | Store the modifier value temporarily. | 2 |
| STA1 | Add to the A register the contents of the location at the address in | PØINT | Add + or - 4 to the address part of the "A register and memory - MASKN" instruction. | 3 |
| | Store the A register in the location at the address in | PØINT | | 3 |
| | Increment memory and skip if the result is zero | PØINT | Point to the compare instruction. | 3 |

| Label | Operation | Operand | Comment | Cycles |
|---|---|---|---|---|
| | Load the A register with | CNT8 | Plus or minus 4. | 2 |
| | Add to the A register the contents of the location at the address in | PØINT | Modify the address part of the 'Compare A register with - BITN' instruction. This does not allow the use of a test for zero in the actuator routines. | 3 |
| | Store the A register in the location at the address in | PØINT | | 3 |
| | Load the A register with | PØFST | | 2 |
| | Jump to | EXIT | | 2 |
| DE | Add to the B register | MNSLP | Go down a second line of words. | 2 |
| MINUS | Load the A register with | M4 | Set up the modifier value to subtract 4 from the addresses in the actuator routine. | 2 |
| | Jump to | STA | | 2 |
| TØPQ | Compare the B register with | XP1 | Test for the top of the pattern. | 2 |
| | Jump to | XP1Ø | Test for odd. | (2) |
| | Compare the B register with | X | The test address for the full word at the top of the pattern. | 2 |
| | Jump to | XØE | The top of pattern. | (2) |
| UP | Add to the B register | PNSLP | Go up one line of words | 2 |
| | Skip if bit 0 of the A register is one | | Test for odd or even. | 2 |
| | Jump to | MINUS | Even. | 2 |
| | Add to the B register | PNSLP | Odd, so go up a second line of words. | 2 |
| | Jump to | PLUS | | 2 |
| YE | Skip if bit 0 of the A register is zero. | | Test for even. | 2 |
| | Jump to | DØWN | Not the bottom of the pattern. | 2 |
| | Add to the B register | MNSLP | Go down a line of words. | 2 |
| | Jump to | AM4 | | 2 |
| XP1Ø | Skip if bit 0 of the A register is one | | Test for odd | 2 |

| Label | Operation | Operand | Comment | Cycles |
|---|---|---|---|---|
| | Jump to | UP | Not the top of pattern | 2 |
| | Add to the B register | PNSLP | Go up a line of words. | 2 |
| | Jump to | AØ | | 2 |
| YP1ØE | Skip if bit 0 of the A register is 0. | | Test for even. | 2 |
| | Jump to | AØ | Odd. | 2 |
| | Add to the B register | PNSLP | Go up a line of words. | 2 |
| | Jump to | AM4 | | 2 |
| XØE | Skip if bit 0 of the A register is 1. | | Test for odd. | 2 |
| | Jump to | AM4 | Even. | 2 |
| | Add to the B register | MNSLP | Go down a line of words. | 2 |

Calculate the modifier.

| Label | Operation | Operand | Comment | Cycles |
|---|---|---|---|---|
| AØ | Clear the A register and then skip the next instruction. | | Odd status with the bit pattern number as 0, 1, 2 or 3. | 2 |
| AM4 | Load the A register with | M4 | Even status with the bit pattern number as 4, 5, 6 or 7. | 2 |
| | Add to the A register the contents of the address in | PØINT | Add 0 or -4 to the 'A register and memory -MASKN ' instruction to make the bit pattern number 0, 1, 2, or 3. | 3 |
| | Complement and then increment the A register | | Negate the bit pattern number and the instruction. | 2 |
| | Add to the A register | ANDM1 | Extract the negative bit pattern number by adding the instruction. | 2 |
| | Shift the A register one bit left. | | Double the negative bit pattern number. | 2 |
| | Add to the A register | P3 | Reverse the value of the bit pattern number. | 2 |
| | Store the A register in | CNT8 | Store the modifier value temporarily | 2 |
| | Load the A register with the contents of the address in | ASTAT | Load the status word. | 3 |

| Label | Operation | Operand | Comment | Cycles |
|---|---|---|---|---|
|  | Exclusive or the A register with | B15.0 | Swap up/down and even/odd. | 2 |
|  | Store the A register in the address in | ASTAT | Restore the new status word. | 3 |
|  | Load the A register with | CNT8 | Load the modifier. | 2 |
|  | Jump to | STA1 | Return to the main routine to modify the instructions. | 2 |

Table 1 shows at 20a the desired arrangement of face stitches in a portion of a course of fabric to be knitted by the circular knitting machine previously described. In Table 1 the letters A, B, C and D represent single face stitches of the different colours A, B, C and D. Moreover, beneath the representation of the course are shown lines representing the actuators responsible for the colours A, B, C and D in their positions relative to the stitches at time $T_8$. The needles which formed these face stitches are moving to the right in the view shown in Table 1. The course shown in only part of a course and the table shows by the numeral one (1) when an actuator is operated and by zero (0) when an actuator is not operated. The gaps in the table are left because it is desired to illustrate only the knitting of the portion of the course shown at 20a. At times $T_7$ and $T_8$ all the actuators are operated and this is due to the particular arrangement of actuators, colours and face stitches chosen. From the table it can be seen that output to the hardware buffer must take place at times $T_1$, $T_2$, $T_3$, $T_4$, $T_5$, $T_6$, $T_7$, $T_8$, $T_9$, $T_{10}$, $T_{11}$, $T_{12}$, $T_{13}$, $T_{14}$ and that 32 bits of information need to be stored and delivered to the knitting machine to produce the eight face stitches.

According to the invention however the information placed in the buffer for the actuator responsible for colour A at times $T_1$, $T_3$, $T_5$, and $T_7$, is allowed to remain at times $T_2$, $T_4$, $T_6$, and $T_8$. The information placed in the buffer for the actuator responsible for colour B at times $T_3$, $T_5$, $T_7$ and $T_9$ is allowed to remain at times $T_4$, $T_6$, $T_8$ and $T_{10}$. The information placed in the buffer for the actuator responsible for colour C at times $T_5$, $T_7$, $T_9$ and $T_{11}$ is allowed to remain at times $T_6$, $T_8$, $T_{10}$ and $T_{12}$. The information placed in the buffer for the actuator responsible for colour D at times $T_7$, $T_9$, $T_{11}$ and $T_{13}$ is allowed to remain at times $T_8$, $T_{10}$, $T_{12}$ and $T_{14}$. Consequently the signals from the machine at the even numbered times $T_2$, $T_4$, $T_6$, $T_8$, $T_{10}$, $T_{12}$, and $T_{14}$ are ignored by use of a counter and the processing involved for the outputs at these times avoided. Furthermore, only 16 bits of information need to be stored and delivered to the knitting machine to produce the eight face stitches.

In this example the counter is provided by a uniquely addressable portion of the fast random access store of the computer called a word. The following stored program of computer instructions increments, tests and resets this counter and ignores those interrupts from the textile producing machine which do not require a change in the output, thereby reducing the processing time required for the supply of information to that machine and possibly allowing multiple machines to be controlled by the computer in place of that machine.

A further feature of the invention allows the stored program digital computer to keep in step with the textile producing machine by the use of a needle position counter in conjunction with the counter and the sensor already described. It should be noted however that the multiple in which the stitches occur in the sets should divide the number of needles in the cylinder without remainder. Otherwise the computer and the machine cannot be kept in step.

| Label | Operation | Operand | Comment | Cycles |
|---|---|---|---|---|

The following extra storage is provided for this program modification.

| Label | Operation | Operand | Comment | Cycles |
|---|---|---|---|---|
| MNNDM | Decimal | -U/M | Minus the number of needles on this textile machine divided by the multiple in which the stitches in a set occur. | |
| C1 | Octal | 177777 | The machine 1 counter. Its initial value of minus one forces interrogation of the needle position count during the first interrupt so that the computer will be forced into step with the textile machine as soon as possible. | |

| Label | Operation | Operand | Comment | Cycles |
|---|---|---|---|---|
| MMULT | Decimal | -M | Minus the multiple in which the stitches in a set occur. | |

The signals for the beginning of a rotation and a new needle position are arranged so as to occur simultaneously at the beginning of a rotation so that they share a common interrupt and interrupt subroutine for convenience.

Interrupt location

| | | | | |
|---|---|---|---|---|
| | Jump to subroutine | NEWL | The interrupt location for the textile machine. The computer forces execution of this instruction on an interrupt from the textile machine | 2 |

The program for a particular textile machine is stored after the interrupt locations.

Interrupt subroutine

| Label | Operation | Operand | Comment | Cycles |
|---|---|---|---|---|
| NEWL | No operation. | | This location holds the return address. | - |
| | Increment memory and then skip the next instruction if the result is zero | C1 | Increment and test the machine 1 counter | 3 |
| | Jump to | NEXIT | No change in output is required, so exit from the interrupt routine as soon as possible. | (2) |
| | Store the B register in | NEWLB | Save the contents of the B register. | 2 |
| | Load the B register with | ØUT1 | Load an output word. | 2 |
| | Output the B register to sub buffer | N | Output 16 bits in parallel to the sub buffer N. In general no control signal would be required by the textile machine and the output lines from the buffer would give a steady signal and only be reset by the next 16 bits placed in sub buffer N. Consequently no interrupt is required when the output is finished. | 2 |

Any number of words or bits may be output to any number of sub buffers in this way.

| Label | Operation | Operand | Comment | Cycles |
|---|---|---|---|---|
| | Increment memory and skip if the result is zero | NPØS | Increment and test the needle position count to see whether the computer expects the beginning of a new rotation. Each increment represents multiple needles rather than one needle. | 3 |
| | Jump to | IEXIT | The count is still negative so take a normal exit as the computer says it is not the beginning of a new rotation. | 2 |

The computer says it is the beginning of a new rotation.

| Label | Operation | Operand | Comment | Cycles |
|---|---|---|---|---|
| | Input into the B register | N | Load the input signal from the input buffer on channel N. If bit 15 is set this signifies the beginning of a new rotation. | (2) |
| | Skip if the B register is negative | | Test whether the hardware says it is the beginning of a new rotation. | (2) |
| | Jump to | HØLD | Positive, so the computer and the textile producing machine are out of step. | N/A |

Negative, so the computer and the textile producing machine are in step.

| Label | Operation | Operand | Comment | Cycles |
|---|---|---|---|---|
| | Load the B register with | MNNDM | Minus the number of needles divided by the multiple in which the stitches in a set occur. | (2) |
| | Store the B register in | NPØS | Reset the needle position count. | (2) |
| IEXIT | Increment memory and then skip if the result is zero | FLAG | FLAG is never minus one so this instruction never results in a skip. This instruction sets the output complete flag to allow the next setup of the output word or words. | 3 |
| | Load the B register with | MMULT | Minus the multiple in which the stitches in a set occur. | 2 |
| | Store the B register in | C1 | Reset the machine 1 counter. | 2 |
| | Load the B register with | NEWLB | Restore the B register. | 2 |

| Label | Operation | Operand | Comment | Cycles |
|---|---|---|---|---|
| NEXIT | Set and clear the control bistables | N | Set and clear the appropriate control bistables on channel N to allow the next interrupt. This instruction does not alter the steady state output from sub buffer N. | 2 |
| | Jump to the address in | NEWL | Exit from the interrupt subroutine. | 3 |

The computer but not the hardware says it is the beginning of a rotation. The computer is out of step with the textile machine so make the computer wait for the textile machine.

| Label | Operation | Operand | Comment | Cycles |
|---|---|---|---|---|
| HØLD | Clear and then complement the B register. | | Set the B register to minus one. | N/A |
| | Store the B register in | NPØS | Store minus one in the needle position count to force the computer to say it is the beginning of a new rotation during the next interrupt. (It should be noted that the needle position count only changes when the output changes.) | N/A |
| | Store the B register in | C1 | Store minus one in the machine 1 counter to force a change of output and thus interrogation of the needle position count during the next interrupt. | N/A |
| | Jump to | IEXIT+1 | Exit but do not allow the new output word or words to be set up. | N/A |

In Table 1 an alternative arrangement of the actuators responsible for the colours A, B, C and D is shown by lines identified by the letters $A^1$, $B^1$, $C^1$, and $D^1$ at the positions of the actuators at time $T_8$.

From the table it can be seen that output to the hardware buffer for the actuator responsible for colour A takes place at the odd numbered times $T_1$, $T_3$, $T_5$ and $T_7$ and that for the actuator responsible for colour C at the odd numbered times $T_5$, $T_7$, $T_9$ and $T_{11}$, whereas output to the hardware buffer for the actuator responsible for colour B takes place at the even numbered times $T_2$, $T_4$, $T_6$ and $T_8$ and that for the actuator responsible for colour D at the even numbered times $T_6$, $T_8$, $T_{10}$ and $T_{12}$.

Thus while the information placed in the buffer for actuators A and C is allowed to remain at the even numbered times and the information placed in the buffer for actuators B and D is allowed to remain at the odd numbered times the signals from the machine may not be ignored at any of these times.

The following modification to the stored program of computer instructions caters for this case.

The use of the machine 1 counter in the interrupt routine is no longer appropriate as no interrupt is ignored. All references to the counter in the interrupt routine are omitted. This part of the modification has been omitted from the text in the interests of brevity.

The portion of the program following the WAIT loop is expanded to insert the new output in the software buffer ØUT1. The machine 1 counter takes the form of a program instruction for convenience.

The program modification requires the following storage.

| Label | Operation | Operand | Comment | Cycles |
|---|---|---|---|---|
| MS11 | Octal | 125252 | 1010101010101010 The mask appropriate to the first word of the first output | |
| MS12 | Octal | 052525 | 0101010101010101 The mask appropriate to the second word of the second output | |
| TABS | Defined | SUB1 | The start address of the routine for the first subset of the actuators | |
| | Defined | SUB2 | The start address of the routine for the second subset of the actuators | |
| IC 1 | Jump to the address in | TABS-1 | The initial value for the counter | |

The program modification follows the WAIT loop and replaces those instructions which previously followed the WAIT loop.

| Label | Operation | Operand | Comment | Cycles |
|---|---|---|---|---|
| | Increment memory and then skip the next instruction if the result is zero | C1 | Increment the machine 1 counter | 3 |
| C1 | Jump to the address in | TABS-1 | Jump to the start of the appropriate output routine | 3 |
| SUB1 | Load the A register with | ØUT1 | Load the current output | 2 |
| | A register and memory | MS11 | Clear the outputs for the appropriate actuators using the mask for word 1 and output 1 | 2 |
| | Store the A register in | ØUT1 | Store the remaining output temporarily. | 2 |

The actuator routines for actuators 1,3,5,7,9,11,13 and 15 follow. The outputs from these routines are accumulated in the B register as before.

| Label | Operation | Operand | Comment | Cycles |
|---|---|---|---|---|
| | Add to the B register | ØUT1 | Add in the output remaining from the last output | 2 |
| | Store the B register in | ØUT1 | Restore the newly assembled output. | 2 |

These actions may be repeated for as many output words or bits as are required.

| | Jump to | WAIT | | 2 |

| Label | Operation | Operand | Comment | Cycles |
|---|---|---|---|---|
| SUB2 | Load the A register with | ∅UT1 | Load the current output | 2 |
| | A register and memory | MS12 | Clear the outputs for the appropriate actuators using the mask for word 1 and output 2 | 2 |
| | Store the A register in | ∅UT1 | Store the remaining output temporarily. | 2 |

The actuator routines for actuators 0,2,4,6,8,10,12, and 14 follow.
The outputs from these routines are accumulated in the B register as before.

| | Add to the B register | ∅UT1 | Add in the output remaining from the last output | 2 |
|---|---|---|---|---|
| | Store the B register in | ∅UT1 | Store it in the output word | 2 |

These actions may be repeated for as many output words or bits as are required.

| | Load the A register with | IC1 | Load the initial value of the counter | 2 |
|---|---|---|---|---|
| | Store the A register in | C1 | Reset the machine 1 counter | 2 |
| | Jump to | WAIT | | 2 |

A circular knitting machine may have one actuator at each thread feed. These actuators are able to operate at the desired speed and such actuators are well known. In order to operate at the desired speed, the machine may make use of the "stacked actuator" system in which several actuators are positioned at each thread feed, successive actuators at that thread feed causing successive needles to knit. So that if there are six actuators at a thread feed, then the first actuator only knits needles numbered 1, 7, 13 etc. Since the operation of each actuator in the stack will overlap the operation of the other actuators in the stack, some method must be provided for storing the commands from the computer to the actuators to actuate or not actuate. Associated with each of the stacks of actuators is an electrical signal memory system which can store the command signal output by the computer so that the actuators of the stack are caused to operate in sequence at the appropriate time by a timing signal device associated with each actuator. The device includes a distributor to distribute signals to the individual memories at the appropriate time. Consequently if the signals are maintained for a period the distributor will distribute each signal to several memories and the associated actuators will select or not select several successive needles.

As an alternative to the provision of a separate electrical signal memory system for each stack of actuators, the hardware buffer may comprise a number of hardware output buffers equal to the number of actuators in a stack and in this case each actuator of the stack is connected to one of the buffers. Such an arrangement is shown with reference to FIG. 8.

We will assume that there are n actuators at a thread feed and that they are positioned vertically above one another. The needles 1, 2 . . . . . n are caused to knit at different periods of time. Consequently, commands to the actuators 1, 2, . . . . . , n in a stack are placed in different hardware buffers at different times. It is arranged that the commands placed in a number of successive buffers for a stacked actuator are the same so that a number of successive needles are caused to select or not select by that stack of actuators.

The following program modification further illustrates this method when the spacing of the actuators in terms of a number of needles is not a multiple of the number of stitches in a set. It will however be appreciated that the spacing of the actuators may be a multiple of the number of stitches in a set.

| Label | Operation | Operand | Comment | Cycles |
|---|---|---|---|---|

This program modification requires the following extra storage.

| Label | Operation | Operand | Comment | Cycles |
|---|---|---|---|---|
| LSTP | Defined | ØUT61 | The store pointer for the last buffer used. | |

The following instructions follow the WAIT loop and replace those instructions which previously followed the WAIT loop.

| Label | Operation | Operand | Comment | Cycles |
|---|---|---|---|---|
|  | Increment memory and then skip the next instruction if the result is zero | C1 | Increment the machine 1 counter | 3 |
| C1 | Jump to the address in | TABS-1 | Jump to the start of the appropriate output routine | 3 |
| SUB1 | Load the A register with the contents of the address in | LSTP | Load the current output | 3 |
|  | A register and memory | MS11 | Clear the outputs for the appropriate actuators using the mask for word 1 and output 1. | 2 |
|  | Store the A register at the address in | LSTP | Store the remaining output temporarily | 3 |

The actuator routines for actuators 1,3,5,7,9,11,13, and 15 follow. The outputs from these routines are accumulated in the B register as before.

| Label | Operation | Operand | Comment | Cycles |
|---|---|---|---|---|
|  | Add to the B register the contents of the address in | LSTP | Add in the output remaining from the last output | 3 |
|  | Store the B register at the address in | STP | Restore the newly assembled output | 3 |

These actions may be repeated for as many output words or bits as are required.

| Label | Operation | Operand | Comment | Cycles |
|---|---|---|---|---|
|  | Jump to | BØTH | | |
| SUB2 | Load the A register with the contents of the address in | LSTP | Load the current output | 3 |
|  | A register and memory | MS12 | Clear the outputs for the appropriate actuators using the mask for word 1 and output 2 | 2 |

| Label | Operation | Operand | Comment | Cycles |
|---|---|---|---|---|
| | Store the A register at the address in | LSTP | Store the remaining output temporarily | 3 |

The actuator routines for actuators 0,2,4,6,8,10,12, and 14 follow.
The outputs from these routines are accumulated in B register as before.

| Label | Operation | Operand | Comment | Cycles |
|---|---|---|---|---|
| | Add to the B register the contents of the address in | LSTP | Add in the output remaining from the last output | 3 |
| | Store the B register at the address in | STP | Store the newly assembled output | 3 |

These actions may be repeated for as many output words or bits as are required.

| Label | Operation | Operand | Comment | Cycles |
|---|---|---|---|---|
| BØTH | Load the A register with | LSTP | Load the last store pointer | 2 |
| | Jump to subroutine | NEXT | Update it | 2 |
| | Store the A register in | LSTP | Store its new value | 2 |
| | Load the A register with | STP | Load the store pointer | 2 |
| | Jump to subroutine | NEXT | Update it | 2 |
| | Store the A register in | STP | Store its new value | 2 |
| | Jump to | WAIT | | 2 |
| NEXT | No operation | | This location holds the return address | - |
| | Increment the A register | | Select the next output buffer | 2 |
| | Compare the A register with | ENDB | Test for the end of the buffers | 2 |
| | Load the A register with | INITP | Start again at the first buffer | (2) |
| | Jump to the address in | NEXT | Return | 3 |

The Output of Large Blocks

It has already been pointed out that the contents of a block may comprise any number or variety of actuator movements. It is in particular possible for needles on the cylinder of a circular knitting machine to tuck instead of knit or not knit. The needles on the dial may also tuck. The following program modifications applicable to programs A, B or C cater for such conditions in a convenient manner.

Cylinder Outputs

The size of the output buffers must be increased, but there is no other overhead in execution time or core storage.

| | Feed 8 | Feed 7 | Feed 6 | Feed 5 | Feed 4 | Feed 3 | Feed 2 | Feed 1 |
|---|---|---|---|---|---|---|---|---|
| Output buffer | 0 0 | 0 0 | 0 0 | 0 0 | 0 0 | 0 0 | 0 0 | 1 0 |

Tuck Knit

On the detection of a block:

|  | Add to the B register | BIT0 | Knit on feed 1. |
|---|---|---|---|
| or: | Add to the B register | BIT1 | Tuck on feed 1. |

Dial and Cylinder Outputs

Two methods are available. The size of the output buffers must be increased in both cases. The first method requires 2 cycles per feed extra execution time in addition.

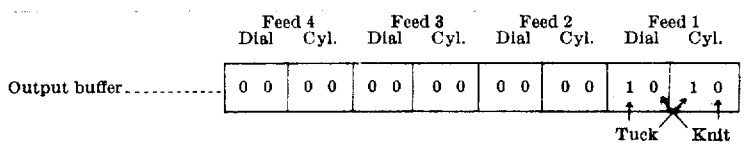

On the detection of a block:

| Add to the B register | BIT1 | Tuck on cylinder feed 1. |
|---|---|---|
| Add to the B register | BIT3 | Tuck on dial feed 1. |

The second method requires no extra execution time, but requires the provision of up to 16 extra output words.

On the detection of a block:

| Add to the B register | DTCT1 | Dial and cylinder tuck feed 1. |
|---|---|---|

Storage:

| DKCK1 | Octal | 0000000000000101 | Dial and cylinder knit feed 1 |
|---|---|---|---|
| DKCT1 | Octal | 0000000000000110 | Dial knit cylinder tuck feed 1 |
| DTCK1 | Octal | 0000000000001001 | Dial tuck cylinder knit feed 1 |
| DTCT1 | Octal | 0000000000001010 | Dial tuck cylinder tuck feed 1 |
| DKCK2 | Octal | 0000000001010000 | |
| DKCT2 | Octal | 0000000001100000 | |
| DTCK2 | Octal | 0000000010010000 | |
| DTCT2 | Octal | 0000000010100000 | |
| DKCK3 | Octal | 0000010100000000 | |
| DKCT3 | Octal | 0000011000000000 | |
| DTCK3 | Octal | 0000100100000000 | |
| DTCT3 | Octal | 0000101000000000 | |
| DKCK4 | Octal | 0101000000000000 | |
| DKCT4 | Octal | 0110000000000000 | |
| DTCK4 | Octal | 1001000000000000 | |
| DTCT4 | Octal | 1010000000000000 | |

The remaining permutations of output bits are already available.

In the case of a circular knitting machine employing stacked actuators several actuators are positioned at each thread feed, successive actuators at that thread feed causing successive needles to knit. If there are six actuators at a thread feed, then the first actuator only causes operation of needles numbered 1, 7, 13 etc. Since the operation of each actuator in the stack will overlap the operation of the other actuators in the stack, some method must be provided for storing the commands from the computer to the actuators to actuate or not actuate. In a known arrangement there is associated with each of the stacks of actuators, an electrical signal memory system which can store the command signal output by the computer so that the actuators of the stack are caused to operate in sequence at the appropriate time by a timing signal device associated with each actuator. This form of electrical signal memory system can therefore be used in conjunction with the buffer described with reference to FIG. 3. As an alternative to the provision of a separate electrical signal memory system for each stack of actuators, the hardware buffer may comprise a number of hardware output buffers equal to the number of actuators in a stack and each actuator of the stack is connected to one of the output buffers. Such an arrangement is shown with reference to FIG. 8.

We will assume that there are n actuators in a stacked actuator at a thread feed. The needles 1, 2 . . . ., n of the knitting machine are caused to knit at different periods of time. Consequently, commands to the actuators 1, 2 . . . ., n in a stack are placed in different hardware output buffers at different times.

In general, it will be convenient to split up each hardware output buffer into sets of smaller buffers, each set consisting of x buffers, so that the small hardware buffers are numbered B(11), . . . . ,B(1x), - - - -B(n1), . . . . ,B(nx). There are m feeders, each with a stack of n actuators. The nth set of small hardware buffers B(n1), . . . . ,B(nx) commands the actuators A(1n) . . . . ,A(mn) at the same point in time.

It will be seen that the storage of the commands in the hardware buffer allows the action of the actuators A(1n) . . . . ,A(mn) to overlap with the action of all the other actuators.

It will be appreciated that in the example described, successive feeders are separated by a number of needles which is a multiple of n, but that all other combinations are possible provided that each actuator is connected to the appropriate buffer.

The method of packing words of fast random access storage employed with program A as described is to store the pattern data in such a way that a word of fast random access storage holds the bit patterns representing a number of blocks from a column of pattern data rather than the bit patterns for successive blocks in a row of the pattern data. The successive bit patterns representing the blocks in a row may be unpacked by applying the appropriate mask for that row of the pattern to successive words of storage containing that row. One mask may be used for unpacking the bit pattern, and another, or the same mask, or a test for zero, may be used for comparing it to the bit pattern representing a block.

In contrast the unpacking method used by program B to be described, utilizes words of fast random access storage which hold successive bit patterns representing the blocks in a row of the pattern data. The unpacking operation is performed by storing the word of fast random access storage currently being examined for a particular actuator in a temporary store for that actuator and rotating the bit patterns in that word right or left so that a single mask can access all the bit patterns in that word successively, and in an appropriate order. Alternatively, the roles of the mask and the word of the fast random access storage holding the bit patterns may be reversed, and the mask stored in a temporary store for that actuator and rotated right or left.

An advantage of the unpacking method used by program B is that there are certain types of computer which cannot obey program A but which can obey program B.

It will be understood that all the techniques of program A can be utilised in program B with the exception of the storage of pattern data in such a way that a word of fast random access storage holds the bit patterns representing a number of blocks from a column of pattern data rather than the bit patterns for successive blocks in a row of the pattern data. Furthermore, stacked actuators as discussed earlier in this specification may be controlled by both programs A and B in both the manners described and the example of program B in this specification provides for the operation of a machine employing the stacked actuator system and our control system, it being understood that program B is equally applicable to the conventional form of knitting machine which does not employ stacked actuators and to the control of stacked actuators without our control system.

For program B the pattern data, describing the blocks extending along a row of the pattern, is stored in successive words of fast random access storage, so that at the end of a row of the pattern there may not be enough bit patterns to fill the last word of storage for that row. Instead of filling the remaining portion of the word with bit patterns representing the next row of blocks in the pattern, the word may be left partly full and the pattern data representing the next row of blocks in the pattern starts to fill the next word of fast random access storage. This method of storage has the advantage that a given position along any row of the pattern always corresponds to a particular bit pattern position in the words representing that row, thus simplifying the stored program of computer instructions. Alternatively the partly full word may relate to the start of a row of blocks in the pattern with the same effect.

PROGRAM B

This example of program B does not include all the routines or storage areas required for its operation. The necessary routines should be included from the relevant sections of program A and/or C. The specification of this example of program B is identical to that of the example of program A, with the following exceptions:

1. Software buffers are provided for stacked actuators controlled by the method described in this specification.

2. The words of storage holding the pattern data do not hold successive bit patterns representing the blocks in a column of pattern data, and an alternative unpacking method is used.

3. Partly full storage words are utilised for program convenience.

Unpacking Method:

The pattern data is stored in memory as follows:

Pattern data.......... 1 2 3 4 5 6 7 8 9 10 11 12 13 14 15 16

Words................             1                    2

Bit patterns......... | 1  2  3  4 5  6  7  8 | 1'  2'  3'  4'  5'  6'  7'  8' |

The words are accessed as follows:

Going right......... | 1  2  3  4  5  6  7  8 | 1'  2'  3'  4'  5'  6'  7'  8' |

| 1 | 2 | 3 | 4 | 5 | 6 | 7 | 8 |

Original word

By rotating left.......

| 2 | 3 | 4 | 5 | 6 | 7 | 8 | 1 |  Rotation number 1
| 3 | 4 | 5 | 6 | 7 | 8 | 1 | 2 |  2
| 4 | 5 | 6 | 7 | 8 | 1 | 2 | 3 |  3
| 5 | 6 | 7 | 8 | 1 | 2 | 3 | 4 |  4
| 6 | 7 | 8 | 1 | 2 | 3 | 4 | 5 |  5
| 7 | 8 | 1 | 2 | 3 | 4 | 5 | 6 |  6
| 8 | 1 | 2 | 3 | 4 | 5 | 6 | 7 |  7
| 1 | 2 | 3 | 4 | 5 | 6 | 7 | 8 |  8

The following actions are required:

1. At the end of a word of bit patterns, a new word of bit patterns is placed in the word store for the appropriate actuator.

2. The actuator routine rotates the bit patterns left and then accesses the bit pattern at the right hand side of the word store.

Going left.......... | 8'  7'  6'  5'  4'  3'  2'  1' | 8  7  6  5  4  3  2  1 |

By rotating right.---

| 1' | 2' | 3' | 4' | 5' | 6' | 7' | 8' |  Original word
| 8' | 1' | 2' | 3' | 4' | 5' | 6' | 7' |  Rotation number 1
| 7' | 8' | 1' | 2' | 3' | 4' | 5' | 6' |  2
| 6' | 7' | 8' | 1' | 2' | 3' | 4' | 5' |  3
| 5' | 6' | 7' | 8' | 1' | 2' | 3' | 4' |  4
| 4' | 5' | 6' | 7' | 8' | 1' | 2' | 3' |  5
| 3' | 4' | 5' | 6' | 7' | 8' | 1' | 2' |  6
| 2' | 3' | 4' | 5' | 6' | 7' | 8' | 1' |  7

The following actions are required:

1. At the end of a word of bit patterns, a new word of bit patterns is placed in the word store for the appropriate actuator. When control is returned to the actuator routine, the Rotate instruction is bypassed so that the actuator routine first accesses the bit patterns at the right hand side of the original word.

2. Thereafter, the actuator routine rotates the bit patterns right and then accesses the bit pattern at the right hand side of the word store.

The following actions are required:

1. The same procedures as previously described are used to load new words when going left or right.

2. At the end of the pattern, the word store is unchanged but the Rotate instruction is changed from left to right or vice versa. The Rotate instruction is not bypassed, so that the block on an axis of symmetry never repeats adjacent to itself.

End of course

End of a half pattern:

The half line of pattern is stored in memory as follows:

| Words | 1 | 2 |
|---|---|---|
| Bit patterns | X X X X 5 6 7 8 | 1' 2' 3' 4' 5' 6' 7' 8' |

The words are accessed as follows:

6 5 6 7 8 1' 2' 3' 4' 5' 6' 7' 8' 7' 6' 5' 4' 3' 2' 1' 8 7 6 5 6

| | | | | | | | | | |
|---|---|---|---|---|---|---|---|---|---|
| By rotating right | 7 | 8 | X | X | X | X | 5 | 6 | Word 1 |
| By rotating left | 6 | 7 | 8 | X | X | X | X | 5 | |
| | 7 | 8 | X | X | X | X | 5 | 6 | |
| | 8 | X | X | X | X | 5 | 6 | 7 | |
| | X | X | X | X | 5 | 6 | 7 | 8 | |
| | 1' | 2' | 3' | 4' | 5' | 6' | 7' | 8' | Word 2 |
| | 2' | 3' | 4' | 5' | 6' | 7' | 8' | 1' | |
| | 3' | 4' | 5' | 6' | 7' | 8' | 1' | 2' | |
| | 4' | 5' | 6' | 7' | 8' | 1' | 2' | 3' | |
| | 5' | 6' | 7' | 8' | 1' | 2' | 3' | 4' | |
| | 6' | 7' | 8' | 1' | 2' | 3' | 4' | 5' | |
| | 7' | 8' | 1' | 2' | 3' | 4' | 5' | 6' | |
| | 8' | 1' | 2' | 3' | 4' | 5' | 6' | 7' | |
| | 1' | 2' | 3' | 4' | 5' | 6' | 7' | 8' | |
| By rotating right | 8' | 1' | 2' | 3' | 4' | 5' | 6' | 7' | |
| | 7' | 8' | 1' | 2' | 3' | 4' | 5' | 6' | |
| | 6' | 7' | 8' | 1' | 2' | 3' | 4' | 5' | |
| | 5' | 6' | 7' | 8' | 1' | 2' | 3' | 4' | |
| | 4' | 5' | 6' | 7' | 8' | 1' | 2' | 3' | |
| | 3' | 4' | 5' | 6' | 7' | 8' | 1' | 2' | |
| | 2' | 3' | 4' | 5' | 6' | 7' | 8' | 1' | |
| | X | X | X | X | 5 | 6 | 7 | 8 | Word 1 |
| | 8 | X | X | X | X | 5 | 6 | 7 | |
| | 7 | 8 | X | X | X | X | 5 | 6 | |
| | 6 | 7 | 8 | X | X | X | X | 5 | |
| By rotating left | 7 | 8 | X | X | X | X | 5 | 6 | |

1. A left movement after a left movement, going down.

| Words | 1 | 2 |
|---|---|---|
| Bit patterns | X X X X 5 6 7 8 | 1' 2' 3' 4' 5' 6' 7' 8' |

| Words | 3 | 4 |
|---|---|---|
| Bit patterns | X X X X 5'' 6'' 7'' 8'' | 1''' 2''' 3''' 4''' 5''' 6''' 7''' 8''' |

The words are accessed as follows .................. 6  5   4'''  3'''  2'''

| 1''' | 2''' | 3''' | 4''' | 5''' | 6''' | 7''' | 8''' |
|---|---|---|---|---|---|---|---|

Word 4

By rotating right:

| 5''' | 6''' | 7''' | 8''' | 1''' | 2''' | 3''' | 4''' |
|---|---|---|---|---|---|---|---|
| | | | | | | | 3''' |
| | | | | | | | 2''' |

The following actions are required:
1. The offset, 1, is added to the word pointer.
2. The number of words in a half line of pattern, 2, is added to the word of pointer.
3. The new word of bit patterns is rotated to the correct alignment and stored in the word store.
4. The Rotate instruction is unchanged.
5. Up is changed to down.

Bottom of the pattern:

Words: 1, 2

Bit patterns:

| X | X | X | X | 5 | 6 | 7 | 8 | 1' | 2' | 3' | 4' | 5' | 6' | 7' | 8' |
|---|---|---|---|---|---|---|---|---|---|---|---|---|---|---|---|

Words: 3, 4 (END and test address value)

Bit patterns:

| X | X | X | X | 5'' | 6'' | 7'' | 8'' | 1''' | 2''' | 3''' | 4''' | 5''' | 6''' | 7''' | 8''' |
|---|---|---|---|---|---|---|---|---|---|---|---|---|---|---|---|

The words are accessed as follows: 6''  5''  4'  3'  2'  etc.

| 1' | 2' | 3' | 4' | 5' | 6' | 7' | 8' |
|---|---|---|---|---|---|---|---|

Word 2

By rotating right:

| 5' | 6' | 7' | 8' | 1' | 2' | 3' | 4' |
|---|---|---|---|---|---|---|---|
| | | | | | | | 3' |
| | | | | | | | 2' |

The following actions are required:
1. The offset, 1, is added to the word pointer.
2. Minus the number of words in a half line of pattern, −2, is added to the word pointer.
3. The new word of bit patterns is rotated to the correct alignment and stored in the word store.
4. The Rotate instruction is unchanged.
5. Down is changed to up.

Top of the pattern:

Words: 1 (BEGIN), 2 (test address value)

Bit patterns:

| X | X | X | X | 5 | 6 | 7 | 8 | 1' | 2' | 3' | 4' | 5' | 6' | 7' | 8' |
|---|---|---|---|---|---|---|---|---|---|---|---|---|---|---|---|

Words: 3, 4

Bit patterns:

| X | X | X | X | 5'' | 6'' | 7'' | 8'' | 1''' | 2''' | 3''' | 4''' | 5''' | 6''' | 7''' | 8''' |
|---|---|---|---|---|---|---|---|---|---|---|---|---|---|---|---|

The words are accessed as follows: 6  5  4'''  3'''  2'''

| 1''' | 2''' | 3''' | 4''' | 5''' | 6''' | 7''' | 8''' |
|---|---|---|---|---|---|---|---|

Word 4

By rotating right:

| 5''' | 6''' | 7''' | 8''' | 1''' | 2''' | 3''' | 4''' |
|---|---|---|---|---|---|---|---|
| | | | | | | | 3''' |
| | | | | | | | 2''' |

The following actions are required:
1. The offset, 1, is added to the word pointer.
2. The number of words in a half line of pattern, 2, is added to the word pointer.
3. The new word of bit patterns is rotated to the correct alignment and stored in the word store.
4. The Rotate instruction is unchanged.

| Label | Operation | Operand | Comment | Cycles |
|---|---|---|---|---|

Interupt routine for stacked actuators.

| Label | Operation | Operand | Comment | Cycles |
|---|---|---|---|---|
| NEWL | No operation. | | | (2) |
| | Store the B register in | NEWLB | | 2 |
| | Jump to | BSET1 | This initial value forces the use of the first buffer for the first output. | 2 |

Note that in this example of an interupt routine for stacked actuators the same software buffers always fill the same hardware buffers.

| Label | Operation | Operand | Comment | Cycles |
|---|---|---|---|---|
| BSET1 | Load the B register with | ØUT11 | Buffer set 1. | 2 |
| | Output the B register to | N | | 2 |
| | Load the B register with | ØUT12 | | 2 |
| | Output the B register to | N+1 | | 2 |
| | Load the B register with | ØUT13 | | 2 |
| | Output the B register to | N+2 | | 2 |
| | Jump to | CØM | | 2 |
| BSET2 | Load the B register with | ØUT21 | Buffer set 2. | N/A |
| | Output the B register to | N+3 | | |
| | Load the B register with | ØUT22 | | |
| | Output the B register to | N+4 | | |
| | Load the B register with | ØUT23 | | |
| | Output the B register to | N+5 | | |
| | Jump to | CØM | | |
| BSET3 | Load the B register with | ØUT31 | Buffer set 3. | N/A |
| | Output the B register to | N+6 | | |
| | Load the B register with | ØUT32 | | |

| Label | Operation | Operand | Comment | Cycles |
|---|---|---|---|---|
| | Output the B register to | N+7 | | |
| | Load the B register with | ØUT33 | | |
| | Output the B register to | N+8 | | |
| | Jump to | CØM | | |
| BSET4 | Load the B register with | ØUT41 | Buffer set 4. | |
| | Output the B register to | N+9 | | |
| | Load the B register with | ØUT42 | | |
| | Output the B register to | N+10 | | |
| | Load the B register with | ØUT43 | | |
| | Output the B register to | N+11 | | |
| | Jump to | CØM | | |
| BSET5 | Load the B register with | ØUT51 | Buffer set 5. | |
| | Output the B register to | N+12 | | |
| | Load the B register with | ØUT52 | | |
| | Output the B register to | N+13 | | |
| | Load the B register with | ØUT53 | | |
| | Output the B register to | N+14 | | |
| | Jump to | CØM | | |
| BSET6 | Load the B register with | ØUT61 | Buffer set 6. | |
| | Output the B register to | N+15 | | |
| | Load the B register with | ØUT62 | | |
| | Output the B register to | N+16 | | |
| | Load the B register with | ØUT63 | | |

| Label | Operation | Operand | Comment | Cycles |
|---|---|---|---|---|
| | Output the B register to | N+17 | | |
| CØM | Increment memory and skip if the result is zero | NPØS | Initial value of minus one | 3 |
| | Jump to | IEXIT | | 2 |
| | Input into the B register | N | | (2) |
| | Skip if the B register is negative | | | (2) |
| | Jump to | HØLD | | N/A |
| | Load the B register with | MNN | | (2) |
| | Store the B register in | NPØS | | (2) |
| IEXIT | Load the B register with the contents of the address in | PJMPN | | 3 |
| | Store the B register in | NEWL+2 | | 2 |
| | Load the B register with | PJMPN | | 2 |
| | Increment the B register. | | | 2 |
| | Compare the B register with | PJMPT | | 2 |
| | Load the B register with | IPJMP | | (2) |
| | Store the B register in | PJMPN | | 2 |
| | Clear and then complement the B register | | Minus one | 2 |
| | Add to the B register | FLAG | | 2 |
| | Store the B register in | FLAG | | 2 |
| RHØLD | Load the B register with | NEWLB | | 2 |
| | Set and clear control bistables | N | | 2 |
| | Jump to the address in | NEWL | | 3 |
| HØLD | Clear and then complement the B register | | Minus one | N/A |

| Label | Operation | Operand | Comment | Cycles |
|---|---|---|---|---|
| | Store the B register in | NPØS | | |
| | Jump to | RHØLD | | |
| IPJMP | Defined | PJMPN+1 | | |
| PJMPN | Defined | PJMPN+2 | The first jump in this table has already been used for the first interupt before this pointer is used. | |
| | Jump to | BSET1 | | |
| | Jump to | BSET2 | | |
| | Jump to | BSET3 | | |
| | Jump to | BSET4 | | |
| | Jump to | BSET5 | | |
| | Jump to | BSET6 | | |
| PJMPT | Defined | PJMPT | | |
| STP | Defined | ØUT11 | | |
| INITP | Defined | ØUT11 | | |
| ØUT11 | Octal | 120736 | | |
| ØUT12 | Octal | 075351 | | |
| ØUT13 | Octal | 026476 | | |
| . | | | | |
| . | | | | |
| . | | | | |
| . | | | | |
| . | | | | |
| . | | | | |
| ØUT61 | Octal | 170045 | | |
| ØUT62 | Octal | 053351 | | |
| ØUT63 | Octal | 102604 | | |
| ENDB | Defined | ENDB | | |
| FLAG | Octal | 0 | | |

Storage

Output bits and masks.

| BIT0 | Octal | 1 |
|---|---|---|
| . | | |
| . | | |
| . | | |
| BIT15 | Octal | 100000 |

| | | | |
|---|---|---|---|
| BPMSK | Octal | B | If the bit patterns consist of two bits, then B is; 0000000000000011 |
| MSK1 | Octal | 177400 | 1111111100000000 |
| MSK2 | Octal | 140377 | 1100000011111111 |
| INITV | Octal | C | Where C is: 11XXXXXXYYYYYYYY The initial values of the number of half patterns to be completed in a course and the number of words in a half pattern. |

Storage words used by the RESET subroutine.

| | | | |
|---|---|---|---|
| ØUTN | Octal | 0 | Holds the output word currently in the B register. |
| HWØRD | Octal | 0 | Stores the word of bit patterns temporarily. |

Pointers.

| | | | |
|---|---|---|---|
| ASTAT | Octal | 0 | Points to the current actuator status word. |

Constants.

| | | |
|---|---|---|
| M7 | Decimal | -7 |
| M8 | Decimal | -8 |

| | | | |
|---|---|---|---|
| PØFST | Decimal | X | The offset in words. |
| PNWLP | Decimal | W | The number of words in a half line of pattern. |
| MNWLP | Decimal | -W | Minus the number of words in a half line of pattern. |
| IBPC | Decimal | -I | Initial value of the bit pattern counter at the end of a half line of pattern. |
| INITC | Decimal | -J | The initial value of the bit pattern counter for a new course. |

Instructions.

| | |
|---|---|
| LRØT | Rotate the A register N bits left. |
| RRØT | Rotate the A register N bits right |

Address constants.

| | | | |
|---|---|---|---|
| BØPAV | Defined | END-W+X+1 | The bottom of pattern store address value modified by offset. |
| TØPAV | Defined | BEGIN+X | The top of pattern store address value modified by offset. |

Actuator routines.

| Label | Operation | Operand | Comment | Cycles |
|---|---|---|---|---|

The B register has been cleared to hold the first output word. The following coding repeats for all the actuators with minor variations. The colour of the yarn being fed at the actuator position must be the colour specified in the program for that actuator.

| Label | Operation | Operand | Comment | Cycles |
|---|---|---|---|---|
| | Increment memory and skip the next instruction if the result is zero. | A00C | Increment and then test the bit pattern counter for actuator 00. | 3 |
| | Jump to | A00L | A bit pattern is still available in the word store for this actuator. | 2 |
| | Jump to Subroutine | RESET | All the bit patterns in the word store have been used. | (2) |
| A00ST | Octal | 000370 | Actuator 00 status word:<br>Bits 0 - 7 Count of the number of words completed in the half pattern.<br>Maximum value 256.<br>Bits 8 - 13 Count of the number of half patterns completed in this course.<br>Maximum value 64.<br>Bit 14 Up/down flag.<br>Bit 15 Left/right flag. | |
| A00W | Defined | -BEGIN-( exp 1 ) | Actuator 00 word pointer. | |
| A00WS | Octal | 101653 | Actuator 00 word store. | |
| A00C | Decimal | -6 | Actuator 00 bit pattern counter. | |
| A00L | Load the A register with | A00WS | Load the word store holding the bit patterns | 2 |
| | Rotate the A register N bits left or right | | Select the next bit pattern left or right. | 2 |

A second rotate instruction is optional if N is larger than the rotation available in a single instruction of the computer in use.

| Label | Operation | Operand | Comment | Cycles |
|---|---|---|---|---|
| | Store the A register in | A00WS | Store the word of bit patterns as rotated. | 2 |
| | A register and memory | BPMSK | Use the bit pattern mask to extract the correct number of low order bits. | 2 |
| | Compare the A register with | BIT0 | Compare the selected bit pattern with the value for the colour on this actuator ( Colour B). | 2 |
| | Add to the B register | BIT0 | Add an output bit for this actuator on a match | (2) |

This actuator routine requires 13 words of storage, and takes 15 cycles to

| Label | Operation | Operand | Comment | Cycles |
|---|---|---|---|---|

The following unpacking method is an alternative unpacking method which uses rotation but with the roles of mask and storage word reversed. The subroutine RESET requires appropriate modifications for use with this actuator routine.

| Label | Operation | Operand | Comment | Cycles |
|---|---|---|---|---|
| | Increment memory and skip the next instruction if the result is zero. | A00C | Increment and then test the bit pattern counter for actuator 00. | 3 |
| | Jump to | A00L | A bit pattern is still available in the word store for this actuator. | 2 |
| | Jump to Subroutine | RESET | All the bit patterns in the word store have been used. | (2) |
| A00ST | Octal | 000370 | Actuator 00 status word: Bits 0 - 7 Count of the number of words completed in the half pattern. Maximum value 256. Bits 8 - 13 Count of the number of half patterns completed in this course. Maximum value 64. Bit 14 Up/down flag. Bit 15 Left/right flag. | |
| A00W | Defined | -BEGIN- (exp 1 ) | Actuator 00 word pointer. | |
| A00MK | Octal | 3 | 0000000000000011 Note that there is an initial value but that its value is not intended to be significant. | |
| A00C | Decimal | -6 | Actuator 00 bit pattern counter. | |
| A00L | Load the A register with | A00MK | Load the current mask value for this actuator. | 2 |
| | Rotate the A register N bits left or right | | Select the next bit pattern left or right. | 2 |

A second rotate instruction is optional if N is larger than the rotation available in a single instruction of the computer in use.

| Label | Operation | Operand | Comment | Cycles |
|---|---|---|---|---|
| | Store the A register in | A00MK | Store the new mask value | 2 |
| | A register and the contents of the address in | A00W | Extract the appropriate bit pattern in the appropriate storage word. | 3 |
| | Compare the A register with | BIT0 | Compare the selected bit pattern with the value for the colour on this actuator (Colour B). | 2 |
| | Add to the B register | BIT0 | Add an output bit for this actuator on a match. | (2) |

This actuator routine requires 13 words of storage, and takes 16 cycles to execute normally or 18 cycles on a bit pattern match.

Reset Subroutine.

This subroutine refills actuator word stores, and changes an actuator routine at the end of a half line, course, or pattern, for that actuator.

| Label | Operation | Operand | Comment | Cycles |
|---|---|---|---|---|
| RESET | No operation. | | This word points to the actuator status word. | B/F 2 |
| | Load the A register with the contents of the address in | RESET | Load the actuator status word. | 3 |
| | Inclusive or the A register and memory. | MSK1 | Leaves the number of words completed in this half pattern with leading ones. | 2 |
| | Increment the A register and skip if the result is not zero. | | Test for the end of a half pattern. | 2 |
| | Jump to | EØHP | End of half pattern. | (2) |
| | Increment memory and then skip if the result is zero, using the contents of the address in | RESET | Increment the stored value of the number of words completed in this half pattern. | 4 |
| | Load the A register with the contents of the address in | RESET | Load the actuator status | 3 |
| | Increment memory and then skip if the result is zero. | RESET | RESET points to the word address pointer for this actuator. | 3 |
| | Skip the next instruction if the A register is positive. | | Test for right movement. | 2 |
| | Jump to | LEFT1 | | (2) |
| | Increment memory and skip if the result is zero, using the contents of the address in | RESET | Increment the word pointer. | 4 |
| | Load the A register with the contents of the address in | RESET | Load the word pointer. | 3 |
| | Load the A register with the contents of the address in the A register. | | Load the word of pattern data addressed by the word pointer. | 3 |
| | Increment memory and then skip if the result is zero | RESET | RESET points to the word store for this actuator. | 3 |

| Label | Operation | Operand | Comment | Cycles |
|---|---|---|---|---|
| | Store the A register at the address in | RESET | Store the word of pattern data in the word store. | 3 |
| | Increment memory and then skip if the result is zero | RESET | RESET points to the bit pattern counter for this actuator. | 3 |
| | Load the A register with | M8 | Minus eight | 2 |
| | Store the A register at the address in | RESET | Store as the initial value of the bit pattern counter. | 3 |
| | Increment memory and then skip if the result is zero. | RESET | RESET points to the return instruction. | 2 |
| | Jump to the address in | RESET | Return. | 3 |
| LEFT1 | Clear and then complement the A register. | | Minus one. | 2 |
| | Add to the A register the contents of the address in | RESET | Add the word pointer for this actuator. | 3 |
| | Store the A register at the address in | RESET | Store the decremented word pointer. | 3 |
| | Load the A register with the contents of the address in the A register. | | Load the word of pattern data addressed by the word pointer. | 3 |
| | Increment memory and then skip if the result is zero. | RESET | RESET points to the word store for this actuator. | 3 |
| | Store the A register in | HWØRD | Store the word temporarily. | 2 |
| | Store the A register at the address in | RESET | Store the word of pattern data in the word store. | 3 |
| | Increment memory and then skip if the result is zero. | RESET | RESET points to the bit pattern counter for this actuator. | 3 |
| | Load the A register with | M8 | Minus eight. | 2 |
| | Store the A register at the address in | RESET | Store as the initial value of the bit pattern counter. | 3 |
| | Load the A register with | RESET | | 2 |
| | Add to the A register | BIT2 | Plus four. | 2 |
| | Store the A register in | RESET | RESET points to the 'A register and memory - BPMSK' instruction. | 2 |

| Label | Operation | Operand | Comment | Cycles |
|---|---|---|---|---|
| | Load the A register with | HWØRD | Restore the word of bit patterns to the A register. | 2 |
| | Jump to the address in | RESET | Return | 3 |

End of a half pattern.

| Label | Operation | Operand | Comment | Cycles |
|---|---|---|---|---|
| EØHP | Load the A register with | RESET | Load the current pointer value. | 2 |
| | Store the A register in | ASTAT | Store it to access the status word for this actuator. | 2 |
| | Load the A register with the contents of the address in | RESET | Load the status word. | 3 |
| | Inclusive or the A register and memory. | MSK2 | Leaving the number of half patterns completed in this course with leading and trailing ones. | 2 |
| | Rotate the A register 8 bits left. | | Gives the true negative value. | 2 |
| | Increment the A register and then skip the next instruction if the result is not zero. | | Test for the end of a course. | 2 |
| | Jump to | EØC | End of a course. | (2) |
| | Load the A register with | BIT8 | 0000000100000000 | 2 |
| | Add to the A register the contents of the address in | RESET | Add the status word to get an incremented value for the number of half patterns completed in this course. | 3 |
| | Skip the next instruction if the A register is positive | | Test for right movement. | 2 |
| | Jump to | LEFT2 | | (2) |
| | Inclusive or the A register and memory | BIT15 | Change status from right to left. | 2 |
| RLT2 | Store the A register at the address in | RESET | Store the new status word for this actuator. | 3 |
| | Increment memory and then skip if the result is zero | RESET | RESET points to the word address pointer for this actuator. | 3 |
| | Increment memory and then skip if the result is zero | RESET | RESET points to the word store for this actuator. | 3 |
| | Increment memory and then skip if the result is zero | RESET | RESET points to the bit pattern counter for this actuator. | 3 |

| Label | Operation | Operand | Comment | Cycles |
|---|---|---|---|---|
| | Load the A register with the contents of the address in | ASTAT | Load the status word. | 3 |
| | Skip if the A register is negative. | | Test the status word. If it is negative then we came right and are about to go left. | 2 |
| | Jump to | RGHT2 | About to go right. | (2) |
| | Load the A register with | M7 | Minus seven, assuming the full words are at the right hand ends of the half patterns. | 2 |
| RRT2 | Store the A register at the address in | RESET | Store the new value of the bit pattern counter. | 3 |
| | Increment memory and then skip if the result is zero | RESET | RESET points to the ' Load A register with – AnnWs ' instruction. | 3 |
| | Increment memory and then skip if the result is zero | RESET | RESET points to the ' Rotate the A register N bits left or right' instruction. | 3 |
| | Load the A register with | LRØT | Left rotate instruction. | 2 |
| | Compare the A register with the contents of the address in | RESET | Compare it with the rotate instruction in the actuator routine. | 2 |
| EXIT | Load the A register with | RRØT | They are equal, so load a right rotate instruction. | 2 |
| | Store the A register at the address in | RESET | Store the appropriate instruction in order to go left or right. | 3 |
| | Clear and then complement the A register. | | Minus one. | 2 |
| | Add to the A register | RESET | | 2 |
| | Store the A register in | RESET | RESET points to the ' Load the A register with – AnnWS ' instruction. | 2 |
| | Jump to the address in | RESET | Return. | 3 |
| LEFT2 | Exclusive or the A register and memory | BIT15 | Change status from left to right. | 2 |
| | Jump to | RLT2 | | 2 |
| RGHT2 | Load the A register with | IBPC | The initial value of the bit pattern counter at the left hand side of the half line of pattern caters for a partly full word. | 2 |

| Label | Operation | Operand | Comment | Cycles |
|---|---|---|---|---|
| | Jump to | RRT2 | | 2 |

End of course.

| Label | Operation | Operand | Comment | Cycles |
|---|---|---|---|---|
| EØC | Store the B register in | ØUTN | Save the B register | 2 |
| | Increment memory and then skip if the result is zero | RESET | RESET points to the word address pointer for this actuator. | 3 |
| | Load the B register with the contents of the address in | RESET | Load the word address pointer. | 3 |
| | Add to the B register | PØFST | PØFST caters for that part of a pattern which is left over at the left hand side of a course. (This instruction may be ommitted if the offset is less than the first word) | 2 |
| | Load the A register with the contents of the address in | RESET | Load the status word: LU RD1111111111111 | 3 |
| | Rotate the A register one bit left. | | U     L D111111111111111R | 2 |
| | Skip if the A register is positive. | | Test for down. | 2 |
| | Jump to | UP | | (2) |
| | Compare the B register with | BØPAV | Compare the result with the bottom of pattern store address value modified by PØFST. | 2 |
| | Jump to | BØP | Equal. | (2) |
| RTØP | Add to the B register | PNWLP | The number of words in a half line of pattern. | 2 |
| | Store the B register at the address in | RESET | Store the new word address pointer. | 3 |
| | Load the B register with the contents of the address in the B register. | | Load the new word of bit patterns. | 3 |
| | Rotate the B register M bits left or right. | | Bring the first bit pattern to be examined in the word to the right hand side of the word. | 2 |

A second rotate instruction is optional if M is larger than the rotation available in a single instruction of the computer in use.

| Label | Operation | Operand | Comment | Cycles |
|---|---|---|---|---|
| | Increment memory and then skip if the result is zero. | RESET | RESET points to the word store for this actuator. | 3 |

| Label | Operation | Operand | Comment | Cycles |
|---|---|---|---|---|
| | Store the B register at the address in | RESET | Store the correctly aligned word in the word store. | 3 |
| | Increment memory and then skip if the result is zero | RESET | RESET points to the bit pattern counter for this actuator. | 3 |
| | Load the B register with | INITC | Load the initial value of the bit pattern counter for a new course. | 2 |
| | Store the B register at the address in | RESET | Store it in the actuator routine. | 3 |
| | Rotate the A register right one bit. | | UL<br>DR111111111111111 | 2 |
| | A register and memory | INITV | Merge the initial values of the number of half patterns to be completed in a course and the number of words in a half pattern into the status word. | 2 |
| | Store the A register at the address in | ASTAT | Store the new status word in the actuator store. | 3 |
| | Increment memory and then skip if the result is zero | RESET | RESET points to the 'Load A register with - AnnWS' instruction. | 3 |

The following instruction is not required in this case but may be needed if the movements at the start and end of a half pattern are not the same.

| Label | Operation | Operand | Comment | Cycles |
|---|---|---|---|---|
| | (Increment memory and then skip if the result is zero | RESET | RESET points to the 'Rotate A register N bits left or right' instruction) | (3) |
| | Load the B register with | ØUTN | Restore the current output word to the B register. | 2 |

For different movements:

| Label | Operation | Operand | Comment | Cycles |
|---|---|---|---|---|
| | Jump to | EXIT | (In addition to the other minor modifications not listed in this example of Program B) | (2) |

For similar movements:

| Label | Operation | Operand | Comment | Cycles |
|---|---|---|---|---|
| | Jump to the address in | RESET | | 3 |
| UP | Compare the B register with | TØPAV | Compare the result with the top of pattern store address value modified by PØFST. | 2 |
| | Jump to | TØP | | |
| RBØP | Add to the B register | MNWLP | Add minus the number of words in a half line of pattern. | 2 |

| Label | Operator | Operand | Comment | Cycles |
|---|---|---|---|---|
| | Jump to | RTØP+1 | | 2 |
| TØP | Exclusive or the A register and memory. | BIT15 | Change up to down. | 2 |
| | Jump to | RTØP | | 2 |
| BØP | Inclusive or the A register and memory | BIT15 | Change down to up. | 2 |
| | Jump to | RBØP | | 2 |

It has also been mentioned that the information concerning certain portions of the pattern is stored only once in the fast random access store of the computer, the information being extracted as and when required from the store. An inspection of the relevant program shows that the information comprises pattern data representing the blocks, the contents of the blocks and also information regarding the positions, sizes and axes of symmetry of the repeated areas.

The information is extracted from the store using the facilities of the logic unit 13 as instructed by the stored program of computer instructions which inspects and updates information stored in the fast random access storage regarding the position of each and every actuator relative to the information stored concerning the repeated areas.

Program A was for a pattern having contiguous rectangular repeated areas arranged as a matrix and all the actuators of the knitting machine were always inside the repeated areas. In view of this a comparatively small amount of information needed to be stored regarding the positions and sizes of the repeated areas. In the case where the pattern comprises repeated areas at irregular intervals on a background, the relative position of a particular actuator may be inside a repeated area as before, or it may be outside all the repeated areas. Therefore, the information which is stored regarding the positions and sizes of the repeated areas must be more complex.

A further difficulty arises because the knitting machine operates so quickly that there is insufficient time for the computer to calculate whether or not each is inside a repeated area at each stitch. For this reason the information regarding the position and sizes of the one or more repeated areas is stored and utilized in another manner now to be described.

The pattern of repeated areas in the present example, covers the entire width of the material and the pattern is divided into a number of zones across its width. Each zone includes a plurality of wales but may include only one wale. Assuming that the knitting machine rotates in the clockwise direction as viewed from above, the first zone commences at the end of course wale which is arbitarily chosen, and extends to the right across the width of the pattern to the start of the first repeated area. The next zone extends from the start of the first repeated area to the start of the second repeated area and so on across the width of the pattern. In some patterns two or more repeated areas may have their left hand wale coinciding however the division of the pattern as explained above is followed so that one zone may correspond to the start of two or more repeated areas or to the end of course and the start of one or more repeated areas.

It is arranged that when an actuator reaches the beginning of a zone a table is examined. The table contains the line numbers, relative to an arbitrarily chosen start of the pattern, of all the repeated areas whose left hand wales correspond to this zone. Thus the computer only tests whether or not an actuator is inside a repeated area when the actuator reaches the appropriate zone rather than at each stitch. Since zones occur less frequently than stitches in any reasonable size of pattern there is a great saving in the execution time of the stored program.

The last entry in the table for a particular zone holds the distance in stitches to the next zone, as a negative number to identify it both as the last entry and as a different type of entry in the table. This particular entry enables an easy test to be made to find out whether an actuator has reached a zone. It will be appreciated however that this entry may be positive instead of negative for identification or that some other means of identification may be used. Furthermore, an index value may be associated with each actuator and stored in the status word for that actuator to facilitate access to the appropriate zone in the table.

It will be appreciated that this table could be filled on a continuous basis by the input unit, but conveniently it will be fixed in length and refer to a fixed length of fabric.

By way of example reference will be made to FIG. 11 and Table 4.

TABLE 4

This table is limited to 64 entries by the number of bits available to store an index value in each actuator status word in this example of Program C. The information in and length of the table is dependent on the pattern. The following is an example corresponding to the fabric pattern illustrated in FIG. 1.

TABLE

| Decimal | −150 | The end of course stitch difference. |
|---|---|---|
| Decimal | 180 | Zone 1 repeated area. |
| Decimal | −250 | Zone 1 stitch difference. |
| Decimal | 470 | Zone 2 repeated area. |
| Decimal | 720 | Zone 2 repeated area. |

Table — Continued

| | | |
|---|---|---|
| Decimal | −120 | Zone 2 stitch difference. |
| Decimal | 810 | Zone 3 repeated area. |
| Decimal | −110 | Zone 3 stitch difference. |
| Decimal | 470 | Zone 4 repeated area. |
| Decimal | −160 | Zone 4 stitch difference. |
| Decimal | 1201 | Zone 5 repeated area. |
| Decimal | 0 | Zone 5 dummy repeated area. |
| Decimal | −160 | Zone 5 stitch difference. |
| Decimal | 700 | Zone 6 repeated area. |
| Decimal | −50 | Zone 6 stitch difference. (End of course zone repeated area, if any). |
| LASTV Defined | LASTV | End of table test address value. |

FIG. 11 shows a length of material provided with a pattern repeated at irregular intervals in both the horizontal and vertical directions. The length of material is divided into zones starting from the arbitrarily chosen end of course wale at the left hand side of the material. The numbers at the top of FIG. 11 indicate the number of wales in the particular zone and the numbers at the top left hand corners of each repeated area of pattern represent the line number of the top line of the repeated area counting down from an arbitrarily chosen reference line indicated in dotted outline.

As will be seen the end of course zone (9) extends from the arbitrarily chosen left hand edge of the material to the left hand edge of the first repeated area of pattern (1a) whilst the next zone (1) extends from the left hand edge of the repeated area 1a to the left hand edge of the next repeated area (2a). In this case two are three repeated areas starting at this position. The next zone (2) extends from the left hand edge of the repeated area 2a to the start of the next repeated area (3a). The remaining zones are created in the same manner and Table 4 is arranged as described and corresponds to the material shown in FIG. 11.

It will be seen in FIG. 11 that the pattern of repeated areas on the fabric repeats between the arbitrarily chosen top of the pattern, line 180, and the arbitrarily chosen bottom of the pattern, line numbered 1380. It will further be seen that a repeated area starts on line 180. The bottom of the repeated area starting at line 1201 is below the arbitrarily chosen bottom of the pattern at line 1380 and thus overlaps in the vertical direction the repeated area starting on line 180 in the next repeat of the pattern, but is not itself overlapped. It will be seen that line O in this repeat of the pattern has been chosen to correspond with the start of the repeated area starting at line 1201 in the previous repeat of the pattern. This method of choosing line O is used for program convenience, and two entries are made in the table for the overlapping repeated area, at lines O and 1201, for the appropriate zone. Program C assumes that live zone corresponds to the start of a repeated area which is not overlapped, but it will be appreciated that means may be provided to cater for such an overlap.

When an actuator enters a repeated area the following actions are taken by a computer obeying program C.

The line of that repeated area which the actuator will knit must first be calculated. If the repeated area has a horizontal axis of symmetry this must be taken into consideration. The line of words and the bit pattern position within those words must also be calculated and those instructions, which access masks, in the actuator routine must be set accordingly. The word pointer and the test address value for the first of the one or more left or right hand images in that repeated area must then be calculated, and the actuator routine set to cater for a left or right hand image and for the repeated area state. The number of images completed in the repeated area must be set to zero and, together with the new index value, stored in the status word for the actuator.

Vertical axes of symmetry within a repeated area are handled in exactly the same way as that described for program A.

The following actions are taken on an exit from a repeated area. The number of stitches to the next zone is calculated. If the repeated area has covered several zones this is taken into account and the updated index value placed in the status word for the actuator. The test address value is set to minus one, and the negative value of the number of stitches to the next zone is added to it and placed in the word pointer.

The actuator routine is returned to the background state. In the background state each actuator either knits or misses each stitch. It will therefore be appreciated that the background need not consists of only one colour but may consist of a spiral of horizontal stripes of several colours or types of stitch such as blister or double blister. If the colour on this actuator is to be knitted in the background the actuator routine is set to put the appropriate bit into the B register. This colour may also vary.

The storage of a line number for each actuator would require the use of an excessive number of words of storage. However, a circular knitting machine only knits a limited number of adjacent courses at any one time. Consequently, only one line number need be stored as a base line and the line number of any actuator may be found from it using an offset stored in the status word for that actuator.

However, the actuators reach the arbitrary end of course position at different times, so that there is no way that the base line number can be updated at the same time as all the actuator line numbers. Consequently, the base line number and an actuator line number may be in or out of phase as the cylinder rotates.

This relationship may be catered for by providing a phase flag in each actuator status word, and a base phase flag. If the phase is changed after reaching the arbitrary end of course position and the particular base line position chosen reaches the end of course position after all the actuators, then if the phase of the base and actuator are the same they are separated by the offset of the actuator. Otherwise, they are separated by the offset of the actuator plus the number of courses being knitted at that time. This separation must be added to the base line number to give the correct actuator line number.

The example of program C which is to be found later in this specification, is used to control one circular knitting machine by one computer to produce a pattern consisting of a single repeated area at irregular intervals on a background. The background may consist of one colour, or a spiral of horizontal stripes of several colours or types of stitch. The pattern may cover up to 32,000 courses and will cover the entire width of the fabric.

The program assumes a pattern of three or four colours but no stitch variations within the repeated area and blocks which store information concerning single face stitches. The repeated area is a rectangle of undetermined size with a horizontal and a vertical axis of symmetry. A block on an axis of symmetry never repeats adjacent to itself.

With this example of program C the pattern may consists of up to 30 repeats of the repeated area in all circumstances, and possibly more if for instance, the starts of several repeats share a zone. Two repeats may not touch their wales. If one repeat is superimposed on another repeat, part of the visible area of one of the repeats will be omitted.

The example program caters for circular knitting machines of up to 48 feeders.

The program is compatible with all the techniques described in the present specification, except that concerning the storage of lines of pattern in their order of use. In particular, modifications may be made to:
1. Cater for more than one type of repeated area.
2. Cater for any number of types of image.
3. Cater for any number of blocks or colours.
4. Cater for any number of feeders.
5. Control several textile machines.
6. Allow repeats to touch.
7. Allow one repeat to be superimposed upon another repeat without loss of part of the visible area of one of the repeats.
8. Buffer output.
9. Output large blocks.
10. Allow the pattern to cover part of the width of the fabric.
11. Allow more repeats in a pattern.
12. Repeat the blocks on an image line adjacent to themselves.

It will also be understood that programs A or B may be arranged so as to include any of the methods employed in program C.

PROGRAM C

This example of Program C does not include all the routines or storage areas required for its operation. The necessary routines should be included from the relevant sections of programs A and/or B.

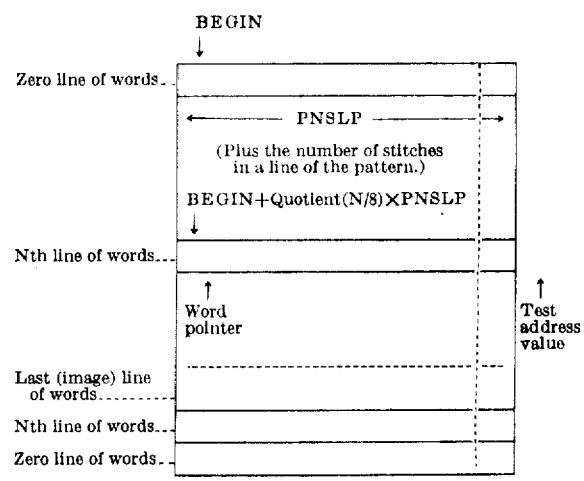

The storage words used by the actuator routines.
It should be noted that there are initial values for these
storage words but that the values given are not intended to be
significant.

| | | | |
|---|---|---|---|
| A00ST | Octal | 110064 | Actuator 00 status word:<br>Bits 0 - 1 Count of the half patterns completed in this repeated area.<br>Maximum value 3.<br>Bits 2 - 7 Index value.<br>Maximum value 63.<br>Bits 8 - 11 Offset.<br>Maximum value 15.<br>Bit 12 Background bit.<br>Bits 13 - 14 The colour on this actuator.<br>Bit 15 Phase flag. |
| A00W | Decimal | -7 | Actuator 00 word pointer. |
| A00T | Decimal | -1 | Actuator 00 test address value. |
| A01ST | Octal | 120070 | Actuator 01 status word. |
| A01W | Decimal | -60 | Actuator 01 word pointer. |
| A01T | Decimal | -1 | Actuator 01 test address value. |

·
·
·
·
·
·
·

| | | | |
|---|---|---|---|
| A15ST | Octal | 161411 | Actuator 15 status word. |
| A15W | Absolute | -BEGIN-(exp 31) | Actuator 15 word pointer. |
| A15T | Absolute | -BEGIN-(exp 32) | Actuator 15 test address value. |

Storage words used by the subroutines.

| | | | |
|---|---|---|---|
| BASEC | Octal | 177777 | Base line position count. |
| BASEP | Octal | 0 | Base line phase. |
| BASE | Octal | 0 | Base line number. |
| ØFSET | Octal | 0 | Stores the offset of this actuator from the baseline, and then the actuator line number, and then the bit pattern number. |
| HØLDA | Octal | 0 | Stores the A register temporarily. |
| CØLØR | Octal | 0 | Holds the phase, colour code, and offset. |
| TABPT | Octal | 0 | Holds the index value. |

Pointers.

| | | | |
|---|---|---|---|
| ASTAT | Octal | 0 | Points to the current actuator status word. |
| ASTØR | Octal | 0 | Points to the current actuator stores. |

Constants.

| | | | |
|---|---|---|---|
| M1 | Decimal | -1 | 1111111111111111 |
| M2 | Decimal | -2 | 1111111111111110 |
| M8 | Decimal | -8 | 1111111111111000 |
| NC | Decimal | C | The number of courses being knitted by this knitting machine at any one time. |
| MNL | Decimal | F | Minus the number of lines in the Fabric pattern. |
| MLEN | Decimal | L | Minus the length of the repeated area. |
| MNLHP | Decimal | -H | Minus the number of lines in a half pattern. |
| PNLHP | Decimal | H | Plus the number of lines in a half pattern. |
| PNSLP | Decimal | W | Plus the number of stitches in a half line of pattern. |
| PNSHM | Decimal | W-1 | Plus the number of stitches in a half line of pattern minus one. |
| MNSHM | Decimal | 1-W | Minus the number of stitches in a half line of pattern plus one. |
| PNWRA | Decimal | T | Plus the number of words in a line of the repeated area. |

Masks.

| | | | |
|---|---|---|---|
| MSK1 | Octal | 007400 | 0000111100000000 |
| MSK2 | Octal | 000374 | 0000000011111100 |
| MSK3 | Octal | 177400 | 1111111100000000 |
| ADDX | Octal | 001777 | 0000001111111111 |
| MASK | Octal | 7 | 0000000000000111 |

Instructions.

| | | |
|---|---|---|
| JSBRS | Jump to subroutine | RESET |
| JSBSU | Jump to subroutine | SETUP |
| JSB | Jump to subroutine | LDIW |
| LDAI | Load the A register with the contents of the address held in the A register. | |

| | | |
|---|---|---|
| IMASK | A register and memory | MASK8+1 |
| ISEL | Add to the A register | ISEL |
| ITSTB | Compare the A register with | BIT14+1 |
| ITSTC | Compare the A register with | BIT15+1 |
| ITSTD | Compare the A register with | MASK8+1 |
| JMPI | Jump to | 3 |

Address constants.

| | | |
|---|---|---|
| ABEGN | Defined | BEGIN |
| ATAB | Defined | TABLE |
| MATAB | Absolute | -TABLE |

| Label | Operation | Operand | Comment | Cycles |
|---|---|---|---|---|

The following actuator routine illustrates the background state:

| | | | | |
|---|---|---|---|---|
| | Increment memory and then skip the next instruction if the result is zero. | AOOW | | 3 |
| | Load the A register with | AOOW | | 2 |
| | Compare the A register with | AOOT | | 2 |
| | Jump to subroutine | SETUP | Equal, this actuator has reached a zone. | (2) |
| | Jump to | BGLOO | They differ. The colour on this actuator is being used for the background pattern, and must be knitted. Otherwise a 'Jump to - BGLOO+1' instruction is used, to avoid knitting. | 2 |
| | A register and memory | MASK1 | | N/A |
| | Skip if the A register is not zero. | | | N/A |
| BGLOO | Add to the B register | BIT0 | | (2) |

A routine in the background state takes 11 cycles if the actuator knits in the background pattern, and 9 cycles otherwise.

These instructions follow the actuator routines.

| | | | | |
|---|---|---|---|---|
| | Increment memory and then skip the next instruction if the result is zero | BASEC | Increment and test the base line position count. | 3 |
| | Jump to | WAIT | Not zero so the base line is not at the end of a course (feeder 1 and needle 1). | 2 |

| Label | Operation | Operand | Comment | Cycles |
|---|---|---|---|---|
| | Load the A register with | MNN | Minus the number of needles. | (2) |
| | Store the A register in | BASEC | Reset the base line position count. | (2) |
| | Load the A register with | BASEP | Load the base line phase. | (2) |
| | Add to the A register | BIT15 | Change phase | (2) |
| | Store the A register in | BASEP | Restore the new value. | (2) |
| | Load the A register with | BASE | Load the old base value. | (2) |
| | Add to the A register | NC | Add the number of courses being knitted. | (2) |
| | Store the A register in | BASE | Store as the new base value assuming that it is not the end of the fabric pattern. | (2) |
| | Add to the A register | MNL | Minus the number of lines in the fabric pattern. | (2) |
| | Skip the next instruction if the A register is negative. | | Test for the end of the fabric pattern. | (2) |
| | Store the A register in | BASE | Store as the new base value. | (2) |
| | Jump to | WAIT | | (2) |

This subroutine tests the line numbers of all the repeated areas for the zone which the actuator has just entered and, if appropriate, changes the actuator routine from the background state to the repeated area state.

| Label | Operation | Operand | Comment | Cycles |
|---|---|---|---|---|
| SETUP | No operation. | | Holds the return address. B/F | 2 |
| | Load the A register with | SETUP | Load the return address, | 2 |
| | Jump to subroutine | FIND | Calculate values for all the pointers. | (2) |
| | Load the A register with the contents of the address in | ASTAT | Load the status word. PCCBNNNNIIIIIIMM | 3 |
| | A register and memory | MSK1 | 0000111100000000 leaving: OOOONNNNOOOOOOOO | 2 |
| | Rotate the A register 8 bits left | | 000000000000NNNN | 2 |

| Label | Operation | Operand | Comment | Cycles |
|---|---|---|---|---|
| | Store the A regiser in | ØFSET | Store as the offset from the base line for this feeder. | 2 |
| | Load the A register with the contents of the address in | ASTAT | Load the status word PCCBNNNNIIIIIIMM | 3 |
| | Exclusive or the A register and memory | BASEP | P000000000000000 Test the actuator against the base phase. 1&1 or 0&0 is 0, 1 otherwise 1 OCCBNNNNIIIIIIMM | 2 |
| | Skip the next instruction if the A register is negative. | | | 2 |
| | Clear the A register and then skip the next instruction. | | Equal phase, so zeroise the A register and skip the next instruction. | (2) |
| | Load the A register with | NC | Load the number of courses being knitted. | 2 |
| | Add to the A register | ØFSET | Add the offset. | 2 |
| | Add to the A register | BASE | Add the base value. | 2 |
| | Store the A register in | ØFSET | Store the result temporarily. | 2 |
| | Add to the A register | MNL | Minus the number of lines in the fabric pattern. | 2 |
| | Skip the next instruction if the A register is negative. | | Test for the end of the fabric pattern. | 2 |
| | Store the A register in | ØFSET | Positive, so store the corrected value. | 2 |
| SLØØP | Jump to subroutine | TESTS | Test the table values. | (2) |
| | Skip the next instruction if the A register is positive. | | Positive, so this is a repeated area line number. | 2 |
| | Jump to | EXITR | Negative, so there are no more repeated areas in this zone. | (2) |
| | Complement and then increment the A register. | | Minus the repeated area line number. | 2 |

| Label | Operation | Operand | Comment | Cycles |
|---|---|---|---|---|
| | Add to the A register | ØFSET | The actuator line number minus the repeated area line number. | 2 |
| | Skip the next instruction if the A register is greater than or equal to zero. | | Test the result. | 2 |
| | Jump to | SLØØP | The actuator is outside this repeated area. | (2) |
| | Store the A register in | HØLDA | Store the A register value for later use. | 2 |
| | Add to the A register | MLEN | Minus the length of the repeated area. | 2 |
| | Skip the next instruction if the A register is less than zero. | | Test whether the result is greater than or equal to zero. | 2 |
| | Jump to | SLØØP | The actuator is outside this repeated area. | (2) |

The actuator is inside this repeated area.

| Label | Operation | Operand | Comment | Cycles |
|---|---|---|---|---|
| STEP | Jump to subroutine | TESTS | Step the index onto the next stitch difference. | (2) |
| | Skip the next instruction if the A register is negative. | | Test for a line number. | 2 |
| | Jump to | STEP | Line number. | (2) |
| | Load the A register with | HØLDA | The actuator line number minus the repeated area line number is positive. | 2 |
| | Add to the A register | MNLHP | Minus the number of lines in a half pattern. | 2 |
| | Skip if the A register is negative. | | Test for up or down. | 2 |
| | Complement the A register and skip if the result is negative. | | Make the value negative and substract one. Force a skip. | (2) |
| | Increment the A register | | Add one to the down value. | 2 |
| | Add to the A register | PNLHP | Plus the number of lines in a half pattern minus one. | 2 |
| | Store the A register in | HØLDA | Store the result temporarily. | 2 |
| | A register and memory memory | MASK | 0000000000000111 This gives the remainder on division by eight. | 2 |

| Label | Operation | Operand | Comment | Cycles |
|---|---|---|---|---|
| | Add to the A register | M8 | Minus eight | 2 |
| | Store the A register in | ØFSET | Store the bit pattern number. | 2 |
| | Load the A register with | HØLDA | Restore the A register value. | 2 |
| | Shift the A register right 2 bits. | | Divide the A register by 4. | 2 |
| | Shift the A register right 1 bit | | Divide the A register by 2. | 2 |
| | Multiply the A register by | PNSLP | Plus the number of stitches in a half line of pattern. The result is always less than 15 bits, positive, and in the A register. This instruction may be a hardware multiply, a standard software multiply routine, a shift and add routine, or a table look up routine. It may also be combined with the above divides | (?) |
| | Add to the A register | ABEGN | The address of BEGIN | 2 |
| | Jump to subroutine | EXIT | | (2) |

The following instructions change the actuator routine from the background state to the foreground state.

| Label | Operation | Operand | Comment | Cycles |
|---|---|---|---|---|
| | Load the A Register with | JSBRS | Load a 'Jump to subroutine - RESET ' instruction. | 2 |
| | Store the A register at the address in | RESET | Store it in the actuator routine. | 3 |
| | Increment memory and then skip the next instruction if the result is zero. | RESET | RESET points to the 'Load the A register with the contents of the address in the A register' instruction position. | 3 |
| | Load the A register with | LDAI | Load that instruction. | 2 |
| | Store the A register at the address in | RESET | Store it in the actuator routine. | 3 |
| | Load the A register with | ØFSET | Load the bit pattern number. | 2 |
| | Add to the A register | IMASK | Add an 'A register and memory - MASK8+1' instruction. | 2 |
| | Increment memory and then skip the next instruction if the result is zero | RESET | RESET points to the 'A register and memory - MASKN ' instruction. | 3 |

| Label | Operation | Operand | Comment | Cycles |
|---|---|---|---|---|
| | Store the A register at the address in | RESET | Store the modified instruction in the actuator routine. | 3 |
| | Load the A register with | CØLØR | PCCBNNNN00000000 | 2 |
| | Rotate the A register 3 bits left. | | BNNNN00000000PCC | 2 |
| | A register and memory | MASK1 | 000000000000000CC | 2 |
| | Skip the next instruction if the A register is not zero. | | | 2 |
| | Jump to | NØACT | Zero indicates colour A whose actuator routines do not use a compare instruction. | (2) |
| | Increment memory and then skip the next instruction if the result is zero. | RESET | RESET points to the 'Compare A register and - MASKN' instruction. | 3 |
| | Add to the A register | ISEL | The A register holds the colour. Use it to make up an instruction to select the correct set of masks for this colour. | 2 |
| | Store the A register in | I | Store that instruction for later use. | 2 |
| | Load the A register with | ØFSET | Load the bit pattern number to modify the compare instruction to make it select the correct bit patterns in the words. | 2 |
| I | No operation. | | Add the appropriate compare instruction. | 2 |
| | Store the A register at the address in | RESET | Store the modified instruction in the current actuator routine. | 3 |
| NØACT | Load the A register with | HØLDA | Load the word pointer value. | 2 |
| | Jump to the address in | SETUP | Return. | 3 |

The actuator is not inside a repeated area at this zone.

| Label | Operation | Operand | Comment | Cycles |
|---|---|---|---|---|
| EXITR | Jump to subroutine | EXIT | Set up the word pointer and test address value for the next zone. | (2) |

| Label | Operation | Operand | Comment | Cycles |
|---|---|---|---|---|
| | Jump to the address in | SETUP | Return. | 3 |

The RESET subroutine caters for the following conditions:

1. The actuator at the vertical axis of symmetry.
2. The actuator leaving the right hand side of the repeated area

| Label | Operation | Operand | Comment | Cycles |
|---|---|---|---|---|
| RESET | No operation. | | Holds the return address. | B/F 2 |
| | Load the A register with | RESET | Load the return address. | 2 |
| | Jump to subroutine | FIND | Calculate values for all the pointers. | (2) |
| | Load the A register with the contents of the address in | ASTAT | Load the status word PCCBNNNNIIIIIIMM | 3 |
| | Skip the next instruction if bit 0 of the A register is zero, and then increment the A register | | Increment the count of the half patterns complete in this repeated area. | 2 |
| | Jump to | EØRA | Bit 0 is zero, so this is the second time through RESET for this repeated area | (2) |
| | Store the A register at the address in | ASTAT | Store the incremented value of the number of half lines completed in this repeated area in the status word. | 3 |
| | Load the A register with | JSB | | 2 |
| | Increment memory and then skip the next instruction if the result is zero | RESET | Compensate for the addition of minus one in the FIND subroutine | 3 |
| | Store the A register at the adress in | RESET | Force a left movement. | 3 |
| | Load the A register with the contents of the address in | ASTØR | Load the word pointer. | 3. |
| | Complement and then increment the A register. | | Change its sign to go left. | 2 |
| | Add to the A register | BIT1 | Add plus two to correct the word pointer. | 2 |
| | Store the A register at the address in | ASTØR | Store as the new word pointer. | 3 |
| | Increment memory and then skip the next instruction if the result is zero | ASTØR | ASTØR now points to the test address value for the current actuator. | 3 |

| Label | Operation | Operand | Comment | Cycles |
|---|---|---|---|---|
| | Add to the A register | PNSHM | Add plus the number of stitches in a half line of pattern minus one. | 2 |
| | Store the A register at the address in | ASTØR | Store as the new test address value. | 3 |
| | Add to the A register | MNSHM | Restore the word pointer to the A register. | 2 |
| | Jump to the address in | RESET | Return. | 3 |

End of this repeat area.

| Label | Operation | Operand | Comment | Cycles |
|---|---|---|---|---|
| EØRA | Load the A register with the contents of the address in | TABPT | Load the stitch difference for the repeated area just completed. | 3 |
| | Add to the A register | PNWRA | Plus the number of words in a line of the repeated area. | 2 |
| | Jump to | FT | Test to see whether the first zone is inside this repeated area. | 2 |
| RLØØP | Store the A register in | HØLDA | HØLDA accumulates the stitch differences. | 2 |
| | Jump to subroutine | TESTS | Access and test the table entry. | (2) |
| | Skip the next instruction if the A register is negative. | | Test for a stitch difference or a line number. | 2 |
| | Jump to | RLØØP+1 | Positive values are repeated area line numbers. | (2) |
| | Add to the A register | HØLDA | Add the accumulated stitch differences. | 2 |
| FT | Skip the next instruction if the A register is negative. | | Test whether the last zone was in the repeated area. | 2 |
| | Jump to | RLØØP | Yes it was. | (2) |

The following instructions change the actuator routine from the repeated area state to the background state.

| Label | Operation | Operand | Comment | Cycles |
|---|---|---|---|---|
| | Jump to subroutine | EXIT | Store the appropriate values in the actuator stores. | (2) |
| | Load the A register with | JSBSU | Load a 'Jump to subroutine - SETUP' instruction. | 2 |
| | Store the A register at the address in | RESET | Store it in the actuator routine | 3 |

| Label | Operation | Operand | Comment | Cycles |
|---|---|---|---|---|
| | Increment memory and then skip the next instruction if the result is zero. | RESET | RESET points to the 'Jump to - BGLNN' instruction position. | 3 |
| | Load the A register with the contents of the address in | ASTAT | Load the status word: PCCBNNNNIIIIIIMM | 3 |
| | Rotate the A register 4 bits left. Skip the next instruction if bit 0 is 0. | | NNNNIIIIIIMMPCCB Test the background bit for 1 to knit or 0 to miss. | 2 |
| | Clear the A register Skip the next instruction | | Make the A register zero to knit in the background. | (2) |
| | Clear and then increment the A register. | | Make the A register one to miss in the background | 2 |
| | Add to the A register | RESET | Add the address of the 'Jump to- BGLNN' instruction position. | 2 |
| | Add to the A register | JMPI | Add a ' Jump to - 3' instruction. (Pages 0 and 1 only). | 2 |
| | Store the A register at the address in | RESET | Store the instruction made up as the 'Jump' instruction. | 3 |
| | Jump to the address in | RESET | The 'Jump' instruction is the return address. ('Jump to the address in the A register ' has the same effect and may save a cycle.) | 3 |

This subroutine calculates values for all the pointers.

| Label | Operation | Operand | Comment | Cycles |
|---|---|---|---|---|
| FIND | No operation. | | Holds the return address. | B/F 2 |
| | Add to the A register | M1 | Minus one. | 2 |
| | Store the A register in | RESET | Store as the return address for the RESET subroutine, and as the instruction pointer for the SETUP subroutine. | 2 |
| | Add to the A register | M2 | Adding minus two makes the A register hold the address of the 'Load A register with -AnnW' instruction in the actuator routine. | 2 |

| Label | Operation | Operand | Comment | Cycles |
|---|---|---|---|---|
| | Load the A register with the contents of the address held in the A register | | Load that instruction. | 3 |
| | A register and memory | ADDX | Extract the 10 bit address. | 2 |
| | Store the A register in | ASTØR | Store as the actuator stores pointer; pointing to the word pointer for this actuator. | 2 |
| | Add to the A register | M1 | Minus one. | 2 |
| | Store the A register in | ASTAT | Store as the status word pointer for this actuator. | 2 |
| | Load the A register with the contents of the address in | ASTAT | Load the status word. PCCBNNNNIIIIIIMM | 3 |
| | A register and memory | MSK2 | 0000000011111100 Extract the index value: 00000000IIIIII00 | 2 |
| | Rotate the A register 2 bits right. | | Leaves the index: 00000000000IIIIII | 2 |
| | Add to the A register | ATAB | Add the table address. | 2 |
| | Store the A register in | TABPT | Store the result as the table pointer. | 2 |
| | Jump to the address in | FIND | Return. | 3 |

This subroutine accesses the table entries, and changes the phase of the actuator at the end of course zone.

| Label | Operation | Operand | Comment | Cycles |
|---|---|---|---|---|
| TESTS | No operation. | | Holds the return address. | B/F 2 |
| | Increment memory and then skip the next instruction if the result is zero | TABPT | TABPT points to the next entry in the table. | 3 |
| | Load the A register with | TABPT | | 2 |
| | Compare the A register with | LASTV | Compare it with the address after the last entry in the table. | 2 |
| | Jump to | EØC | | (2) |
| REØC | Load the A register with the contents of the address in | TABPT | Load the entry. | 3 |

| Label | Operation | Operand | Comment | Cycles |
|---|---|---|---|---|
| | Jump to the address in | TESTS | Return with the A register holding the table entry. | 3 |
| EØC | Load the A register with | ATAB | Table address. | 2 |
| | Store the A register in | TABPT | TABPT points to the first entry in the table. | 2 |
| | Load the A register with the contents of the address in | ASTAT | Load the status word. | 3 |
| | Add to the A register | BIT15 | Change phase. | 2 |
| | Store the A register at the address in | ASTAT | Restore the status word. | 3 |
| | Jump to | REØC | | 2 |

This subroutine stores values for the word pointer, test address value, and status word.

| Label | Operation | Operand | Comment | Cycles |
|---|---|---|---|---|
| EXIT | No operation | | Holds the return address. | B/F 2 |
| | Store the A register in | HØLDA | Store the word pointer value for subsequent restoration to the A register. | 2 |
| | Skip the next instruction if the A register is positive. | | Test for the background state. | 2 |
| | Add to the A register | M1 | The word pointer value must never be incremented to zero. | (2) |
| | Store the A register at the address in | ASTØR | Store the (negative) stitch difference in the word pointer for this actuator. | 3 |
| | Skip the next instruction if the A register is positive. | | Test for the background state. | 2 |
| | Clear and then complement the A register. Skip the next instruction | | The word pointer is negative in the background (and also the right hand side of the repeated area but there is no EXIT call in that condition). Make the A register minus one and skip the next instruction. | (2) |

| Label | Operation | Operand | Comment | Cycles |
|---|---|---|---|---|
| | Add to the A register | PNSLP | The word pointer is positive in the left hand side of the repeated area. Add plus the number of stitches in a half line of pattern. | 2 |
| | Increment memory and then skip the next instruction if the result is zero. | ASTØR | ASTØR points to the test address value for this actuator. | 3 |
| | Store the A register at the address in | ASTØR | Store the new test address value. | 3 |
| | Load the A register with the contents of the address in | ASTAT | Load the status word: PCCBNNNNIIIIIIMM | 3 |
| | A register and memory | MSK3 | 1111111100000000 Extract the phase, colour code, and offset: PCCBNNNN00000000 | 2 |
| | Store the A register in | CØLØR | Store temporarily. | 2 |
| | Load the A register with | TABPT | Load the table pointer. | 2 |
| | Add to the A register | MATAB | Add minus the address of TABLE. The result is always positive: 00000000001IIIII | 2 |
| | Rotate the A register 2 bits left. | | Position the index value: 000000001IIIII00 | 2 |
| | Inclusive or the A register and memory | CØLØR | PCCBNNNN00000000 Merge in the phase, colour code, and offset: PCCBNNNNIIIIII00 Note that the initial value of the number of half patterns completed in this repeated area is 00. | 2 |
| | Store the A register at the address in | ASTAT | Store as the new status word. | 3 |
| | Jump to the address in | EXIT | Return. | 3 |

Another example of the way in which a textile producing machine may be controlled by a computer according to the invention will now be described with reference to the control of a warp knitting machine. There are several forms of such machine and the one to be briefly described has bearded needles and a pair of guide bars.

The description of the machine will be with reference to FIG. 7 whose several views show the important parts of the machine at various positions during the production of one course of fabric. The machine includes a needle bar 50 which carries the needles 51. The needles are inclined away from the vertical towards the rear of the machine, i.e. towards the left in the drawing. The needle bar is movable by a drive shaft in the machine so that the needles can move along their axes. Associated with the needles is a presser 52 whose duty is to close the beards of the needles at some point during the cycle of operation. The presser is movable in a horizontal direction and again its movement is controlled by the drive shaft of the machine.

Disposed below the pressure 52 is a sinker 53 and this extends forwardly between adjacent needles. The sinker is formed with a slot and the sinker's functions are to hold the knitted web and effect movement of a loop held on the needle during the knitting cycle. The sinker is movable in a generally horizontal direction and is also driven from the drive shaft by the machine. The machine also includes for each needle a front guide 54 and a rear guide 55. The guides are mounted on separate guide bars (not shown) one of the guide bars mounting all the front guides of the machine and the other bar mounting all the rear guides of the machine. The guide bars are capable of two types of movement. One movement imparts a swinging motion to the guides from the front to the rear of the machine and vice versa whilst the other movement moves the guides laterally. The first movement of the guide bars is obtained from the drive shaft of the machine whilst the second movement is derived from the drive shaft but the extent and direction of movement is determined in known forms of machine by a pattern wheel or chain. Each guide is provided with an aperture through which runs a warp thread, the thread being drawn from some suitable storage device.

In operation, the starting point in the cycle is as shown at FIG. 7a and the first movement is that of the guides 54 and 55 laterally of the needles and this is followed by the second movement of the guides towards the rear of the machine. The lateral movement is termed the "underlap" and the extent of such movement depends upon the pattern of the fabric being knitted. The third movement is a lateral movement of the guides which is known as the "overlap" and this is followed by a fourth movement to swing the guides towards the front of the machine. At the end of the fourth movement the parts have the positions shown in FIG. 7c with the warp threads wrapped around the needle. It will be appreciated that the guide bars may not be completely threaded and that either guide bar may move laterally in either direction depending upon the pattern of the fabric.

The fifth movement is that of the needle bar 50 which rises to move the newly formed loops onto the stem of the needle 51 as seen in FIG. 7d. The sixth movement is again that of the needle bar which moves downwardly so that the newly formed loops move behind the beard of the needle. During this movement the pressure 52 moves in the forward direction so that the beard of the needle is closed thereby enclosing the newly formed loops as shown in FIG. 7e. The seventh movement is that of the sinker 53 which moves to the rear of the machine and during this movement the old loops of the fabric are lifted onto the beard of the needle as seen in FIG. 7f and the next series of movements is a continued downward movement of the needle bar 50, a withdrawal of the presser 52 and a forward movement of the sinker. During this series of movements the old loops of the fabric slip over the head of the needle and the sinker regains control of the fabric. The final movement of the cycle is upward movement of the needle bar 50 from the position shown in FIG. 7g to the position shown in FIG. 7a. It will be appreciated that these movements may not occur during separate periods of time but that preceding and following movements may overlap.

The description above is of a simple form of warp knitting machine and is the simplest commonly used machine. More complex machines have three or more guide bars and therefore three or more sets of guides and as with the two bar machine described the guide bars may move laterally in different directions. In some cases the warp threads which are carried by the third or even the second set of guides may be laid into the fabric as the fabric is produced utilising the first and second set of guides or in the latter case using the first set of guides.

The machine described above has bearded needles but similar machines can be provided with compound needles. In such machines the presser is not required but the other movements of the machine are generally similar.

In the machine described above the pattern of the resulting fabric is dependent upon the movement of the guide bars during the overlap and underlap movements and in known machines this is determined by pattern wheels. For the control of the machine by the computer, the pattern wheel is replaced by a device capable of producing the desired movements at the appropriate time. The device is responsive to an electrical signal originating in the computer and it may be a purely electrical device such as an electromagnet or a stepping motor or an hydraulic device may be used the operation of which is controlled by the aforesaid signal. It is envisaged that only the guide bar or bars which control the laying in of yarn will be actuated by the aforesaid device since the other guide bar or bars will be performing a normal knitting motion.

A further form of warp knitting machine which may be controlled in accordance with the invention is known as a Raschel machine. This form of machine usually employs two needle beds containing latch needles and a plurality of sets of warp guides. Machines of this type are however known in which a single needle bed is provided with as few as two sets of warp guides. The sets of guides are mounted on guide bars in the same manner as in the warp knitting machine discussed above and the motions of the guide bars are also similar to those of the machines described, that is to say the bars can be moved angularly to effect swinging of the guides between the needles and they can be moved axially in either direction to achieve overlap and underlap. As with the warp knitting machines discussed above some of the guides may be employed only for the purpose of laying in thread.

A modern form of Raschel machine particularly for producing net employs three guide bars but also embodies a jacquard mechanism or mechanisms which can control the individual guides of one or both of the guide bars which are normally used to produce the net inlay. The action of the jacquard mechanism is to determine the height at which the guides pass between the needles and this affects the effective overlap or underlap. The other guide bar is utilised to provide the normal stitch which produces the basic net. The fact that each guide is capable of individual control means that a true jacquard pattern can be obtained. In known machines mechanical means are utilized to control the height of the guides. In a machine of this type adapted for control by electrical signals originating from the computer, electromechanical means such for instance as a solenoid may be used to effect the required adjustment of the height of the guides.

A more recent form of Raschel machine utilizes a single bed of latch needles and whereas in the Raschel machines described above, the needle beds are moved so that the needles are moved substantially along their axes only, in the present machine the needle bed also executes a swinging motion. In this machine the guide bars are not moved angularly to achieve swinging of the guides. The bars are however capable of axial movement to achieve the overlap and underlap. In this form of machine a jacquard mechanism is provided and which is capable of effecting lateral movement of the warp carrying end portions of the guides of one bar. The effect of such lateral movement is similar to the effect produced by adjusting the height of the guide in the machine described in the preceding paragraph. In some machines of this type a pair of jacquard mechanisms are provided for controlling the guides of two bars respectively and whilst other conventional guide bars and guides are usually provided, a machine of this type is available in which only two sets of guides are provided each being controlled by a jacquard mechanism.

The jacquard mechanism generally consists of a displacement pin associated with each guide. These displacement pins are mounted on a displacement bar which is shogged so that when a displacement pin is extended from the bar it engages its associated guide and effects a lateral movement of that guide.

The displacement pins are generally controlled mechanically but they may be controlled by electromagnetically controlled actuators operable under the control of electrical signals from the computer to obtain the desired lateral movement of the end portion of the guides.

In this case it is undesirable to provide one hardware buffer stage and one amplifier for each electromechanically controlled actuator and its associated guide. It is of course possible to divide the guides into groups and control one guide from each group from one buffer stage. This has the disadvantage however of producing several identical strips in the fabric which always have a width equal to the width of a group of needles.

The guides are divided up into groups and one guide from each group is associated with one buffer stage but the buffer is filled with a fresh set of information for each group of guides. When the guides within a group have been selected or otherwise and the selected guides have been displaced means for the purpose hold the selected guides in place. The buffer may then be filled with a further set of information for the next group of guides.

A further example of the control of a textile producing machine by a stored program digital computer according to the invention will now be described with reference to a flat knitting machine.

In such a machine a carriage is provided which is movable along a stationary frame. This frame carries two latch needle beds. Four rails each mounting two thread feeds are also provided. The two thread feeds on a rail cannot move past each other. The carriage includes yarn selecting means which can engage with two thread feeds comprising any one of the left threads feeds and any one of the right thread feeds when the carriage is at the left or at the right of the frame. Consequently these two thread feeds will move along their associated rails as the carriage moves along the frame. Consequently not more than two thread feeds can be in operation at any one time and not more than two threads can be fed to the needle beds at any one time.

The carriage mounts a cam box which includes two sets of cams associated with the two operative thread feed positions respectively. Each set of cams can effect a knitting or tucking action on either needle bed as the carriage moves. Two further sets of cams for stitch transfer are provided on either side of the two sets of knitting or tucking cams. Only the transfer cam which is trailing can operate.

In such a machine it is known to provide an electrically controlled needle selection mechanism in association with each needle. Each selector mechanism includes a pivotal needle jack having a butt, the butt being operable by any one of the cams in the cam box when the leading edge of that cam is adjacent to it. Raising the needle jack by means of the butt causes the needle to rise so that if the butt engages the leading edge of a cam the needle will rise through a certain distance according to the form of the cam.

The jack is spring biased to its operative position in which the butt will be engaged by a cam. A re-setting cam on the carriage causes it to move to its inoperative position. An electromechanical actuator is provided which includes a solenoid and an armature which consists of a spring at right angles to the jack. The spring is biased away from the poles of the electromagnet and is caused to move into contact with the poles of the electromagnet by a further re-setting cam on the carriage. When this re-setting cam releases the armature it will return to its original position unless held by the electromagnet being energised. In its original position its end will prevent the jack from returning to the operative position so that the needle will only be selected when the electromagnet is energised.

If the butt of a needle jack engages with the leading edge of the first cam in a set the needle will be caused to move to its fully extended position in which case a thread will be inserted in the hook of the needle and the previous loop will be knocked over when the needle is moved to the retracted position. Thus if the butt is selected at the correct time to engage with the first cam in a set its associated needle will knit.

If the butt of a needle jack engages with the leading edge of the second cam in a set the needle will be caused to move to an intermediate position in which case a thread will be inserted into the hook of the needle but the previous loop will not be knocked over when the needle is moved to the retracted position. Thus if the butt is selected at the correct time to engage with the second cam in a set its associated needle will tuck.

If the butt is allowed to remain in its retracted position the needle will not rise and the thread will not be inserted into the hook of the needle thus causing the needle to miss.

It will be appreciated that there may be other cams in the cam box not associated with a thread feed.

Such machines generally have too many needles to allow the economic provision of an amplifier for each electromechanical actuator. In addition it is desirable to increase the time available for an actuator to actuate so that at any point in time several actuators may be selecting needles to engage the leading edge of a particular cam. It is therefore known to arrange the spacing of the leading edges of the cams on such machines to limit the number of amplifiers required and allow the time available for the operation of the actuators to be increased by the simultaneous selection of several needles for each cam.

For this purpose the needles are grouped together in sets of n needles, and all the needles numbered $m$, $n+m$, $2n+m$, etc. are connected to the mth amplifier. The spacing of the leading edges of the cams is arranged so that the plurality of amplifiers selecting needles for one cam do not have to select needles for any other cam at the same time. Such a machine generally includes a distributor to distribute control signals from a storage medium such as magnetic tape to the different amplifiers selecting needles for the different cams to engage as the carriage traverses the needle beds.

The storage of control signals in a plurality of hardware buffers in the computer to allow the operation of the actuators to overlap according to the invention has already been described. A further feature of the invention lies in the use of this buffer to distribute the control signals to the actuators to allow for the movement of the carriage left or right across the needle beds thereby eliminating the distributor.

The manner in which the control information is placed in the plurality of hardware buffers will now be described with reference to FIG. 13. In FIG. 13 there are five cams 121, 122, 123, 124 and 125 which provide five control functions for every needle during a traverse according to whether that needle is in the selected state or otherwise when the leading edge of the cam passes it. Six needles may be undergoing selection by their associated actuators to engage a particular cam at any one point in time and there are five such cams. Six buffers 131, 132, 133, 134, 135 and 136 are provided according to the invention as described above to hold the control information and each such buffer includes five bistables in order to be able to store one bit for each of the five cams. All the bits stored in a buffer are stored at the same time as described above. Thirty amplifiers 100 are provided to feed the amplified control signals to the actuators in groups of thirty so that a signal from the first amplifier selects needles numbered 1, 31, 61 etc.

The bistables in the buffer 131 are connected to amplifiers 1, 7, 13, 19, 25 respectively, those in the buffer 132 to amplifiers 2, 8, 14, 20, 26 respectively, those in the buffer 133 to amplifiers 3, 9, 15, 21, 27 respectively, those in the buffer 134 to amplifiers 4, 10, 16, 22, 28 respectively, those in the buffer 135 to amplifiers 5, 11, 17, 23, 29 respectively, and those in the buffer 136 to amplifiers 6, 12, 18, 24, 30 respectively.

One tooth is provided for each carriage position at which a needle selection must be initiated. Each tooth is sensed to cause an interrupt of normal computer operation so that the computer will initiate the needle selection.

The interrupt for the first and all subsequent needles must occur a certain period in advance of the cams reaching the needles in order to allow time for actuation. This period is equivalent to the time taken by the carriage to traverse six needles at full speed. The sensor must therefore be positioned and teeth provided to cause at least six interrupts before the first cam reaches the first needle.

Interrupts must be provided until the last needle is selected for the last cam. Consequently when the last cam is positioned six needles before the last needle the sensor must sense a tooth in order that the computer may make its last needle selection. Teeth must therefore be provided past the last needle.

These requirements must be met for both left and right hand traverses. It will therefore be appreciated that a number of teeth are provided either side of as well as in the needle bed. Further teeth may be provided for use when one or both needle beds are racked.

A sensing device causes an interrupt of normal computer operation during a traverse when the leading edge of the knit cam for the first feed is six needle spaces before needle number one. At this point in time the cams to the rear of the knit cam for the first feed have not yet reached the needle bed. If the pattern requires that needle number one should knit with the first feed during this traverse the computer as instructed by the stored program of computer instructions places a bit in the first bistable in the first buffer. Since this bistable is connected via the first amplifier to the actuator for the first needle, the actuator will commence the selection of that needle. By the time that this first needle has been selected the leading edge of the knit cam for the first feed will have arrived at the first needle in time to operate it. Needles numbered 31, 61 etc. cannot operate as no cam is at their position to engage them.

Meanwhile further interrupts of normal computer operation will have taken place causing the computer to place control information into the first bits of buffers two to six to select needles 2 to 6 or otherwise as required for the pattern.

It will be appreciated that during this time the leading edge of none of the cams has passed a needle selected by any of the amplifiers 1 to 6.

The next interrupt of normal computer operation will cause the contents of buffer one to change but by this time needle number one will have commenced its operation. This interrupt causes the computer to change the second bit of the first buffer according to whether the pattern requires that needle number 7 should knit with the first feed during this traverse.

This mode of operation for the knit cam for the first feed continues until the computer has placed control information in the fifth bistable of the sixth buffer for needle number 30, when the cycle of operation beings again with the placing of information in the first bistable in the first buffer.

After appropriate time intervals the other cams reach the needle bed and begin to operate needles. As has been stated the values of all the bistables in a buffer are changed at the same time. Thus for the sixth buffer at a certain point in the cycle the computer sets the 1st bistable in respect of the 1st cam for needles numbered 6, the 2nd bistable in respect of the 2nd cam for needles numbered 12, the 3rd bistable in respect of the 3rd cam for needles numbered 18, the 4th bistable in respect of the 4th cam for needles numbered 24, and the 5th bistable in respect of the 5th cam for needles numbered 30, all at the same time.

After this operation needles numbered 1 to 6 may be selecting in respect of the 1st cam, needles numbered 7 to 12 may be selecting in respect of the 2nd cam, needles numbered 13 to 18 may be selecting in respect of the 3rd cam, needles numbered 19 to 24 may be selecting in respect of the 4th cam, and needles numbered 25 to 30 may be selecting in respect of the 5th cam. It will be seen that none of the cams is in a position to operate any needle of the same number as any other cam at the same point in time and that none of the amplifiers selecting needles for one cam is selecting needles for any other cam. Moreover as the cams move sequentially over the needles it will be appreciated that no two needles of a particular number can ever be operated on by two cams.

During a traverse in the opposite direction the needles are selected in a reverse manner to that described by placing information in the buffers to access needles numbered 30, 29, 28 etc. for each cam at the appropriate points in time.

FIG. 14 shows successive positions suffixed a, b, c, d, e, f and g of the knit cam 151 and the tuck cam 152 for the leading feed, the knit cam 153 and the tuck cam 154 for the trailing feed, the transfer cam 155, and the sensor 156, during a left traverse of the needle beds 161 and the teeth 162. FIG. 14 also shows successive positions suffixed i, j and k of the sensor 156 and corresponding cams with the above functions and reference numerals during a right traverse. A second sensor not shown but aligned with the sensor 156 is provided to sense the single tooth 163.

In this particular example there are 120 needles in each of the needle beds each needle having a corresponding tooth. In addition there are 55 teeth to the right of the needle beds and 54 teeth to the left of the needle beds.

A row of stitches will be formed on the needles 161 with a pattern comprising repeats 141, 142 and 143 of a particular repeated area. The repeats 141, 142 and 143 are shown in diagrammatic form in FIG. 14 above the needles for the left traverse and below the needles for the right traverse. These repeats are in symmetry so that the repeat 143 is a mirror image of the repeat 142. The repeat 141 is a part repeat in symmetry to the repeat 142. Each axis of symmetry passes through one stitch in the row rather than between two identical stitches in the row. The numbers on the first line below each representation of the repeats show the address or "word pointer" values used to access information in the fast random access store concerning particular stitches within the repeats. The numbers on the second line below each representation of the repeats show the test address values corresponding to particular stitches. A test address value is provided for each actuator routine so that the state of that actuator routine may change when appropriate.

FIG. 14 also shows successive positions relative to the repeats suffixed a, b, c, d, e, f, g and h of the actuator routines 171, 172, 173, 174 and 175 associated with the knit front cams, the tuck front cams, the knit rear cams, the tuck rear cams, and the cams 155 respectively.

FIG. 14 also shows successive positions relative to the repeats suffixed a, b, c, d, and h of the test address values 131, 132, 133, 134 and 135 used by the actuator routines 171, 172, 173, 174 and 175 respectively.

One cycle of operation of the machine will now be described with reference to FIG. 14. The stored program begins by assuming that the cams are positioned to the right of the needles and that the sensor 156 is positioned to the right of the teeth. In such a position the carriage carrying the cams and the sensor will be ready to commence a left traverse of the needle bed. If the yarn selecting means on the machine is of a type which can only select thread feeds when the carriage is at one or other extreme end of the frame the stored program assumes that the carriage is at the position where the particular thread feeds to be used in the first traverse may be selected. Signals are output by the computer as instructed by the stored program of computer instructions to the yarn selecting means to select two thread feeds according to the pattern requirements for the first traverse.

Six software buffers are provided associated with the six hardware buffers respectively. These software buffers are full at the start of operation so that the computer is effectively six needles ahead of the machine at the start of operation. However, the computer may not be so far ahead of the machine during the remainder of the cycle of operation.

Operation commences with the carriage moving left. After a certain period of time the sensor 156 reaches a position 156a and senses the first tooth. As already described the resulting signal causes an interrupt of normal computer operation. The computer loads a particular hardware buffer with the contents of its associated software buffer in response to this interrupt. These contents will be zero in the example because the cams are not yet sufficiently near the needles for the needles to actuate.

The computer then fills the software buffer it used by obeying the actuator routines. The positions of the actuator routines relative to the pattern are incremented with the result that they lie at positions 171a, 172a, 173a, 174a and 175a. It will be seen from FIG. 14 that these positions are outside the pattern. The actuator routines are arranged to fill the software buffer with zeroes in this case.

The carriage meanwhile has continued to move left so that at some later time the sensor 156 reaches the second tooth causing a second interrupt of normal computer operation. The computer loads the next hardware buffer to be used with the contents of its associated software buffer. The manner in which the hardware buffers are used has already been described. As a matter of program convenience this procedure is used throughout the cycle of operation. It will therefore be appreciated that the first bistable in the first hardware buffer will not necessarily output to needles numbered one at the start of operation unless of course the positions 151a and 151c are identical or suitably separated.

The computer then fills the second software buffer used which in this particular example is the first software buffer. Since the position of the actuator routine 171 now lies at the address value 200 inside the pattern, the computer as instructed by the stored program of computer instructions sets up the actuator routine 171 to extract information relating to the pattern and then returns to the actuator routine to allow it to extract said information. The first software buffer will thus hold information relating to the first stitch in the pattern in its first bit position.

The carriage continues to move left. After a period of time the cam 151 reaches a position 151c. At this time the sensor 156 reaches a position 156c and causes another interrupt of computer operation. The computer loads the first hardware buffer with the contents of the first software buffer. The first bit position of this software buffer was filled with information relating to the first stitch in the pattern. It will be assumed that this stitch is a knit rather than a tuck in which case the first bistable of the hardware buffer will now hold a one.

As previously described the first bistable of the first hardware buffer is associated with needles numbered 1. Consequently actuation of the jack associated with needle number one will commence.

The carriage continues to move left and after a further period of time the cam 151 reaches the first needle and its associated jack whose butt by this time has reached the cam engaging position. The first needle is thus raised to form a stitch.

At or about this time the sensor 156 reaches a tooth and causes an interrupt of normal computer operation to fill the first hardware buffer with new information.

The carriage continues to move left over the needle beds. The remaining actuator routines will be set up in the same way as the knit front actuator routine, as they enter the pattern. All the actuator routines will traverse the pattern to produce repeats in the manner already described for a circular knitting machine with the exception that as the carriage traverses the needles in both directions a part repeat may occur at the end of a right traverse as well as the beginning of a left traverse. The additional sensor which is aligned with the sensor 56 will sense the tooth 163 during this traverse.

As the carriage moves further left the position of the actuator routine 171 relative to the pattern reaches a position 171e at the address value for information relating to the last stitch for this traverse. The relevant control signal is stored in the sixth software buffer.

At its next position 171f the actuator routine 171 finds that its relative position is the same as that of its word pointer at 131d. The computer as instructed by the stored program of computer instructions resets the actuator routine to a state where it will not cause any further bits to be inserted in any of the buffers for further actuation. The position of the word pointer 131d is not altered.

As the carriage moves further left the actuator routines 172, 173, 174 and 175 are reset one by one. When the actuator routine 175 is reset the computer as instructed by the stored program of computer instructions takes action to prepare the stored program for the next traverse. This action will be described later but it will be appreciated that this action takes place during the last part of a left traverse.

When the cam 155 has reached the position 155g the sensor 156 has reached the last tooth at 156g. The resulting interrupt causes information to be placed in the fifth bistable of the sixth buffer. The fifth bistable of the sixth buffer is connected to needles numbered 30. Consequently all the information necessary for the machine to knit this traverse has been output to it. There is thus no need for further teeth to the left of the position 156g unless the time taken for an actuator to operate is such that the position 156i of the sensor 156 which causes an output for cam 151 to actuate the first needle in a right traverse, is to the left of the position 156g.

The order in which the hardware buffers and the bistables within them are used may now be reversed as previously described to change from a left to a right traverse.

It has already been mentioned that the computer as instructed by the stored program of computer instructions must prepare the program for the next traverse and that this takes place after the actuator routine for the cam 155 has reached the position 175f.

The appropriate thread feeds must be selected and the program adjusted accordingly. The yarn selecting means may operate when the carriage reaches its extreme left position according to the setting of electromagnetically controlled plungers provided for each of the thread feeds at both ends of the needle beds. The electromagnetically controlled plungers may be set before the feed changing operation provided they are set after the last feed changing operation since the same signals are fed to the actuators at both ends of the needle beds.

Any course in the fabric may be knitted using one or more thread feeds according to the nature of the pattern. Since the carriage of the machine can engage two thread feeds at any one time it is possible to knit two courses each of one colour or one course with two colours in a traverse. Since this example of the machine includes means for changing one or both of the thread feeds at the end of any traverse it is possible to knit one course with three colours using two thread feeds in one traverse and either the front feed of the next traverse or the rear feed of the preceding traverse. For the same reason it is possible to knit a course with four colours either in two traverses or in three traverses by using two thread feeds in one traverse together with the front feed of the next traverse and the rear feed of the preceding traverse.

It will be seen that the program must include means for the feeds to proceed to the next course and for the other conditions associated with a new course all of which have been previously described with reference to a circular knitting machine.

A table entry holding information relevant to the next traverse is examined. This table entry holds the right and left thread feeds to be used which for convenience will be equated with the colours of the yarns on these feeds. The table entry also indicates whether the front and/or rear sets of cams will knit a new course during the next traverse. The table entries thus define both the number of colours and the particular colours to be used to knit the various courses. It will be appreciated that the number of colours used to knit a course may vary from course to course using this method.

The test address value 131 is used to calculate the test address values and the word pointers for the next traverse since it has remained at position 131d. At the beginning of the next traverse the actuator routines will access the same portion of the pattern which they accessed at the end of the last traverse, but in reverse so that the address values used will be of the opposite sign. The sign of the test address value 131d is thus changed. It must then be incremented to position it inside the pattern at position 131h. All the test address values will have this value in this example in order that their respective actuator routines can be set up after they have entered the pattern.

When the sensor 156 reaches the position 156*i* during the right traverse the knit front cam 151 will be at the position 151*i*. But actuation for the first needle in the right traverse need not commence until the cam 151 is at the position 151*j*. It will be seen that seven interrupts of normal computer operation will be caused by the seven extra teeth at the left-hand side of the needle bed before the interrupt of normal computer operation as a result of the sensor 156 detecting the tooth at position 156*j* causes the computer to commence said actuation.

Consequently when the computer as instructed by the stored program of computer instructions prepares the program for the right traverse, after the actuator routine for the cam 155 has reached the position 175*f*, it places the word pointers 171, 172, 173, 174 and 175 outside the pattern. The number of extra teeth will be added to the new test address value which corresponds to the first stitch in the pattern to give the new position 171*h* of the word pointer 171, and the remaining word pointers will be positioned according to the spacing of their associated cams with respect to the knit front cam 151. The knit front actuator routine will increment the word pointer 171 seven times before it reaches the first stitch in the pattern but it will be appreciated that this takes place independently of the interrupts caused by the extra teeth because of the action of the software buffers. It will also be appreciated that it is convenient in programming terms if, as in the program example which will be given, the number of extra teeth at either side of the needle bed is the same.

It will also be appreciated that the carriage may not traverse the entire needle bed if it is not desired to knit a fabric of width corresponding to the width of the needle bed. In this case it is more convenient to shorten the travel of the carriage at the left-hand side of the needle bed in order to continue sensing the tooth 163. The yarn selecting means for a right traverse should also be able to operate in this case.

It has been mentioned that it is convenient in programming terms if the computer uses the same procedure to fill the software and thus the hardware buffers whatever the position of the actuator routines. It is therefore necessary when preparing the actuator routines for a new traverse to change the buffer being used together with the bit positions in that buffer being used by the various actuators. Table 5 gives the buffer and bit positions in use at the beginning and end of both traverses.

The cycle of operation of the machine now continues in the manner already described until the sensor not shown but aligned with the sensor 56 senses the tooth 163 for the second time. The function of the tooth 163 is to allow the computer to put itself into step and then remain in step with the knitting machine in the manner already described for a circular knitting machine. However, it must be possible to differentiate between the two signals caused by the sensor detecting the tooth 63 in one cycle of operation of the machine. This is achieved by gating the signal from the sensor with a signal identifying a left traverse thus allowing the output signal from said gate to reach the "Device Busy" circuits during a left traverse but not during a right traverse. It will be appreciated that even if the assumptions made by the stored program of computer instructions at the start of operation were incorrect the computer will put itself into step with the machine.

It will be appreciated that this method of hardware buffering may be applied to flat circular and circular knitting machines as well as flat knitting machines.

In this program only the needles in one bed are provided with control signals. Furthermore, only four thread feeds are used. At the start of operation the left feed on the first rail mounts a yarn of colour A, the right feed on the second rail mounts a yarn of colour B, the left feed of the third rail a yarn of colour C, and the right feed of the fourth rail a yarn of colour D. The first two feeds mentioned above are on the right of their rails while the other two feeds are on the left of their rails. The inoperative feeds are positioned so as not to interfere with the operative feeds.

TABLE 5

| Function | Position | Needle | Buffer | Bit | Position | Needle | Buffer | Bit |
|---|---|---|---|---|---|---|---|---|
| Knit front | End of left traverse | 12 | 6 | 1 | Start of left traverse | 24 | 6 | 3 |
| Tuck front |  | 6 |  | 0 |  | 18 |  | 2 |
| Spare |  | 30 |  | 4 |  | 12 |  | 1 |
| Knit rear |  | 24 |  | 3 |  | 6 |  | 0 |
| Tuck rear |  | 18 |  | 2 |  | 30 |  | 4 |
| Knit front | Start of right traverse | 7 | 1 | 1 | End of right traverse | 19 | 1 | 3 |
| Tuck front |  | 13 |  | 2 |  | 25 |  | 4 |
| Spare |  | 19 |  | 3 |  | 1 |  | 0 |
| Knit rear |  | 25 |  | 4 |  | 7 |  | 1 |
| Tuck rear |  | 1 |  | 0 |  | 13 |  | 2 |

| Label | Operation | Operand | Comment | Cycles |
|---|---|---|---|---|
| Storage for the interrupt routine |  |  |  |  |
| TESTJ | Jump to | BSET6 | The comparison value for the jump instruction. |  |
| INITJ | Jump to | BSET1-3 | The initial value of the jump instruction minus 3 to compensate for the later addition. |  |

| Label | Operation | Operand | Comment | Cycles |
|-------|-----------|---------|---------|--------|
| NEWLA | Octal | 0 | Temporary store for the contents of the A register. | |
| CPØS | Decimal | -1 | Minus count of the carriage position. An initial value of -1 forces the textile machine and the computer into step as soon as possible. | |
| INITP | Defined | ØUT1 | An address constant to reset the store pointer to the first buffer. | |
| STP | Defined | ØUT1 | This initial value forces the use of the first software buffer at the start of the operation. | |
| ØUT1 | Octal | 0 | The output for the interrupt from the first extra tooth is zero. | |
| ØUT2 | Octal | 0 | The output for the interrupt from the second extra tooth is zero. | |
| ØUT3 | Octal | 0 | The output for the interrupt from the third extra tooth is zero. | |
| ØUT4 | Octal | 0 | The output for the interrupt from the fourth extra tooth is zero. | |
| ØUT5 | Octal | 0 | The output for the interrupt from the fifth extra tooth is zero. | |
| ØUT6 | Octal | 0 | The output for the interrupt from the sixth extra tooth is zero. | |
| ENDB | Defined | ENDB | The comparison value for the end of buffer condition. | |
| FLAG | Octal | 0 | No buffers are empty at the start of operation. | |
| SFLAG | Decimal | 1 | The swapped flag has an initial value of one to indicate that the order of use of the output buffers is correctly set. | |
| CNT6 | Decimal | -1 | This count is used to test when the sixth software output buffer has been filled so that the instructions which insert bits into the software output buffers may be swapped around. Its initial value corresponds to the position of the carriage at the | |

| Label | Operation | Operand | Comment | Cycles |
|-------|-----------|---------|---------|--------|
| ØPB02 | Add to the B register | BIT3 | A store must be provided for the fifth output instruction even though the spare cam is not in use in order to access all the needle positions. The instruction in this store corresponds to the position of the spare cam at the start of a left traverse. | |
| A00ST | Octal | 005775 | DOOOMMMMIIIIIIII Actuator routine 00 status word. Bits 0-7: Count of the number of half patterns completed in this course. Maximum value 256 Bits 8-11: Bit pattern number Maximum value 16 Bit 15: Up/down flag. | |
| A00W | Defined | BEGIN+W-R+6 | Actuator routine 00 word pointer. R is the number of teeth to the right of the needle bed. | |
| A00T | Defined | BEGIN+W-1 | Actuator routine 00 test address value. | |
| A01ST | Octal | 005775 | Actuator routine 01 status word. | |
| A01W | Defined | BEGIN+W-R-A+5 | Actuator routine 01 word pointer. | |
| A01T | Defined | BEGIN+W-1 | Actuator routine 01 test address value. | |
| A03ST | Octal | 005775 | Actuator routine 03 status word. | |
| A03W | Defined | BEGIN+W-R-B+5 | Actuator routine 03 word pointer. | |
| A03T | Defined | BEGIN+W-1 | Actuator routine 03 test address value. | |
| A04ST | Octal | 005775 | Actuator routine 04 status word. | |
| A04W | Defined | BEGIN+W-R-C+5 | Actuator routine 04 word pointer. | |
| A04T | Defined | BEGIN+W-1 | Actuator routine 04 test address value. | |

Bit pattern extract and compare masks to knit or tuck 4 colours.

Knit colour A bit pattern is always zero.

| Label | Operation | Operand | | |
|-------|-----------|---------|--|--|
| NØBT1 | Octal | 0 | | |
| NØBT2 | Octal | 0 | | |
| NØBT3 | Octal | 0 | | |

| Label | Operation | Operand | Comment | Cycles |
|---|---|---|---|---|
| NØBT4 | Octal | 0 | | |
| NØBT5 | Octal | 0 | | |
| Knit colour B masks | | | | |
| BIT0 | Octal | 1 | 001 | |
| BIT3 | Octal | 10 | 001000 | |
| BIT6 | Octal | 100 | 001000000 | |
| BIT9 | Octal | 1000 | 001000000000 | |
| BIT12 | Octal | 10000 | 001000000000000 | |
| Knit colour C masks | | | | |
| BIT1 | Octal | 2 | 010 | |
| BIT4 | Octal | 20 | 010000 | |
| BIT7 | Octal | 200 | 010000000 | |
| BIT10 | Octal | 2000 | 010000000000 | |
| BIT13 | Octal | 20000 | 010000000000000 | |
| Knit colour D masks | | | | |
| B01 | Octal | 3 | 011 | |
| B34 | Octal | 30 | 011000 | |
| B67 | Octal | 300 | 011000000 | |
| B910 | Octal | 3000 | 011000000000 | |
| B1213 | Octal | 30000 | 011000000000000 | |
| Tuck colour A masks | | | | |
| BIT2 | Octal | 4 | 100 | |
| BIT5 | Octal | 40 | 100000 | |
| BIT8 | Octal | 400 | 100000000 | |
| BIT11 | Octal | 4000 | 100000000000 | |
| BIT14 | Octal | 40000 | 100000000000000 | |
| Tuck colour B masks | | | | |
| B02 | Octal | 5 | 101 | |
| B35 | Octal | 50 | 101000 | |
| B68 | Octal | 500 | 101000000 | |
| B911 | Octal | 5000 | 101000000000 | |
| B1214 | Octal | 50000 | 101000000000000 | |
| Tuck colour C masks | | | | |

| Label | Operation | Operand | Comment | Cycles |
|---|---|---|---|---|
| B12 | Octal | 6 | 110 | |
| B45 | Octal | 60 | 110000 | |
| B78 | Octal | 600 | 110000000 | |
| B1011 | Octal | 6000 | 110000000000 | |
| B1314 | Octal | 60000 | 110000000000000 | |

Tuck colour D and unpacking masks

| Label | Operation | Operand | Comment | Cycles |
|---|---|---|---|---|
| MASK1 | Octal | 7 | 111 | |
| MASK2 | Octal | 70 | 111000 | |
| MASK3 | Octal | 700 | 111000000 | |
| MASK4 | Octal | 7000 | 111000000000 | |
| MASK5 | Octal | 70000 | 111000000000000 | |

Storage words used by the RESET/SETUP subroutines.

| Label | Operation | Operand | Comment |
|---|---|---|---|
| ANNW | Octal | 0 | Holds the word pointer currently in the A register. |
| ØUTN | Octal | 0 | Holds the output word currently in the B register. |
| ENTRY | Octal | 0 | Temporary storage for the aligned table entry. |
| CØLØR | Octal | 0 | Temporary storage for the colour on a feed. |
| ADDN | Octal | 0 | Temporary storage for the possible end of course correction. |
| ASW | Octal | 0 | Temporary storage for the status word. |
| CNTBP | Octal | 0 | Temporary storage for the bit pattern number. |

Pointers

| Label | Operation | Operand | Comment |
|---|---|---|---|
| ASTAT | Octal | 0 | Points to the status word in the current actuator routine. |

Constants

| Label | Operation | Operand | Comment |
|---|---|---|---|
| M1 | Decimal | -1 | 1111111111111111 |
| M2 | Decimal | -2 | 1111111111111110 |
| M4 | Decimal | -4 | 1111111111111100 |
| M5 | Decimal | -5 | 1111111111111011 |
| M6 | Decimal | -6 | 1111111111111010 |

| Label | Operation | Operand | Comment | Cycles |
|---|---|---|---|---|
| P20 | Decimal | 20 | 0000000000010100 | |
| MTNT | Decimal | -2T | Minus twice the number of teeth in use. | |
| NTM2 | Decimal | T-2 | The number of teeth in use minus two. | |
| METTH | Decimal | -E | Minus the number of extra teeth which cause interrupts before the interrupt for the first stitch. | |
| MSP01 | Decimal | -A-1 | Minus the sum of the separation between the knit front word pointer and the tuck front word pointer plus one. | |
| MSP03 | Decimal | -B-E | Minus the sum of the separation between the knit from word pointer and the knit rear word pointer plus the number of extra teeth. | |
| MSP34 | Decimal | -C | Minus the separation between the knit rear word pointer and the tuck rear word pointer. | |
| PØFST | Decimal | X | The part of the pattern left over at the left hand side of the course. | |
| PNSLP | Decimal | W | The number of stitches in a half line of pattern. | |
| MNSLP | Decimal | -W | Minus the number of stitches in a half line of pattern. | |
| EØPCV | Decimal | -Y | The end of pattern value of the bit pattern number. | |
| ICNTB | Decimal | -Z | The initial value of the bit pattern number at the bottom of the pattern. | |
| PNSHM | Decimal | W-1 | The number of stitches in a half line of pattern minus one. | |
| TRAVC | Defined | 2xTABLE | The traverse counter's initial value is for the first entry in the table (which is a left traverse). | |
| ITRVC | Defined | 2xTABLE | The initial value for the traverse count is twice the table address. | |

| Label | Operation | Operand | Comment | Cycles |
|---|---|---|---|---|
| TABLE | Octal | 000633 | 0000000110011011<br>Bits 0,1: Colour on right hand side feed during a right traverse<br>Bits 2,3: Colour on left hand side feed during a right traverse<br>Bit 4: New course on front flag during a left traverse<br>Bit 7: New course on rear flag during a left traverse<br>Bits 8, 9: Colour on right hand side feed during a left traverse.<br>Bits 10,11: Colour on left hand side feed during a left traverse.<br>Bit 12: New course on front flag during a right traverse<br>Bit 15: New course on rear flag during a right traverse | |
| | Octal | 005621 | 0000101110010001 | |
| ETRVC | Defined | 2xTABLE+N | The comparison value for the end of table is twice the table address plus the number of table entries. The number of table entries is four in this example. | |
| Masks | | | | |
| ADDX | Octal | 001777 | 0000001111111111 | |
| MSK1 | Octal | 177400 | 1111111100000000 | |
| MSK2 | Octal | 170377 | 1111000011111111 | |
| MSK3 | Octal | 107400 | 1000111100000000 | |
| MSK4 | Octal | 000017 | 0000000000001111 | |
| IAST | Octal | 007400+V | 00001111BBBBBBBB<br>Leading ones and the initial value of the minus number of half patterns completed in a course. | |
| BIT15 | Octal | 100000 | 1000000000000000 | |
| Instructions | | | | |
| JSBRS | Jump to subroutine | RESET | | |
| JSBSU | Jump to subroutine | SETUP | | |
| JSB | Jump to subroutine | LDIW | | |

| Label | Operation | Operand | Comment | Cycles |
|---|---|---|---|---|
| LDAI | Load the A register with the contents of the address held in the A register. | | | |
| IMASK | A register and memory | MASK5+1 | | |
| JMP5I | Jump to | 5 | | |
| ISEL | Add to the A register | ISEL | | |
| ITKA | Compare the A register with | NØBT5+1 | | |
| ITKB | Compare the A register with | BIT12+1 | | |
| ITKC | Compare the A register with | BIT13+1 | | |
| ITKD | Compare the A register with | B1213+1 | | |
| ITTA | Compare the A register with | BIT14+1 | | |
| ITTB | Compare the A register with | B1214+1 | | |
| ITTC | Compare the A register with | B1314+1 | | |
| ITTD | Compare the A register with | MASK5+1 | | |

Address constants

| Label | Operation | Operand | Comment |
|---|---|---|---|
| AA4ST | Defined | AO4ST | The address of the status word for the last cam in operation |
| LBPAV | Defined | END-W+X+1 | The left hand side bottom corner of the pattern address value |
| RBPAV | Absolute | -(END-W) | The right hand side bottom corner of the pattern address value |
| LTPAV | Defined | BEGIN+X | The left hand side top corner of the pattern address value |
| RTPAV | Absolute | -(BEGIN-1) | The right hand side top corner of the pattern |

| Label | Operation | Operand | Comment | Cycles |
|---|---|---|---|---|
| Interrupt location | | | | |
| | Jump to subroutine | NEWL | | 2 |
| Interrupt routine | | | | |
| NEWL | No operation | | | - |
| | Store the A register in | NEWLA | Store the contents of the A register temporarily. | 2 |
| | Jump to | BSET1 | This initial value forces the use of the first buffer for the first output of a left traverse | 2 |
| BSET1 | Load the A register with | ØUT1 | | 2 |
| | Output the A register to | N | | 2 |
| | Jump to | CØM | | 2 |
| BSET2 | Load the A register with | ØUT2 | | N/A |
| | Output the A register to | N+1 | | N/A |
| | Jump to | CØM | | N/A |
| BSET3 | Load the A register with | ØUT3 | | N/A |
| | Output the A register to | N+2 | | N/A |
| | Jump to | CØM | | N/A |
| BSET4 | Load the A register with | ØUT4 | | N/A |
| | Output the A register to | N+3 | | N/A |
| | Jump to | CØM | | N/A |
| BSET5 | Load the A register with | ØUT5 | | N/A |
| | Output the A register to | N+4 | | N/A |
| | Jump to | CØM | | N/A |
| BSET6 | Load the A register with | ØUT6 | | N/A |
| | Output the A register to | N+5 | | N/A |

| Label | Operation | Operand | Comment | Cycles |
|---|---|---|---|---|
| CØM | Increment memory and then skip the next instruction if the result is zero | CPØS | Increment and test the carriage position. Its value should become zero on the first tooth sensed during a left traverse. Since we assume that the carriage is positioned at the right hand side of its bed at the start of operation the initial value of the carriage position is minus one | 3 |
| | Jump to | IEXIT | The carriage position is still negative so make a normal exit as the computer says it is not the beginning of a left traverse | 2 |

The computer has calculated that the carriage has begun a left traverse. A suitably aligned tooth and a sensor to sense that tooth are provided to generate a signal to identify any interrupt caused by the rightmost tooth on the bed. A signal is also provided to identify a left as opposed to a right traverse. These two signals are "added" together to identify the first tooth on a left traverse so that the computer can keep in step with the knitting machine. The travel of the carriage should be shortened from the left hand side to reduce the width of the fabric in order to maintain this signal.

| Label | Operation | Operand | Comment | Cycles |
|---|---|---|---|---|
| | Input into the A register | N | Load the input signal from the input buffer on channel N. Bit 15 set signifies the beginning of a left traverse | (2) |
| | Skip the next instruction if the A register is negative | | Test for the presence of the signal | (2) |
| | Jump to | HØLD | Positive, so no signal and the computer and the textile producing machine are out of step | N/A |

Negative, so the computer and the textile producing machine are in step.

| Label | Operation | Operand | Comment | Cycles |
|---|---|---|---|---|
| | Load the A register with | MTNT | Minus twice the number of teeth in use. The carriage traverses the teeth twice between input signals | (2) |
| | Store the A register in | CPØS | Reset the carriage position count | (2) |
| IEXIT | Load the A register with | NEWL+2 | Load the jump instruction which selects the buffer to be output | 2 |
| | Compare the A register with | TESTJ | Compare it with its value for the last buffer | 2 |
| | Load the A register with | INITJ | Load the initial value of the jump instruction | 2 |
| | Add to the A register | B01 | Add plus three to generate the next jump instruction | 2 |

| Label | Operation | Operand | Comment | Cycles |
|---|---|---|---|---|
| | Store the A register in | NEWL+2 | Store the new jump instruction in the interrupt routine | 2 |
| | Clear and then complement the A register | | Minus one | 2 |
| | Add to the A register | FLAG | FLAG= 0: No buffers empty<br>FLAG=-E: E buffers empty | 2 |
| | Store the A register in | FLAG | | 2 |
| RHØLD | Load the A register with | NEWLA | Restore the A register | 2 |
| | Set and clear the control bistables | N | | 2 |
| | Jump to the address in | NEWL | Return | 3 |
| HØLD | Clear and then complement the A register | | Minus one | N/A |
| | Store the A register in | CPØS | | N/A |
| | Jump to | RHØLD | | N/A |

The entry point at the start of operation.

The program assumes that the carriage is at the right hand end of the bed and at the colour selection position.

| Label | Operation | Operand | Comment | Cycles |
|---|---|---|---|---|
| START | Enable all interrupts | | | N/A |
| | Set and clear the control bistables on channel | N | | N/A |
| | Load the A register with | BIT0 | 0000000000000001<br>The initial colour output for a left traverse | N/A |
| | Output the A register to | N+6 | Select the appropriate colours. These colours will be selected as soon as the knitting machine and computer are in step. | N/A |

Wait loop

| Label | Operation | Operand | Comment | Cycles |
|---|---|---|---|---|
| WAIT | Load the A register with | CPØS | Load the carriage position. The program expects the first needle of a left traverse so the initial value is -1. | 2 |

| Label | Operation | Operand | Comment | Cycles |
|---|---|---|---|---|
| | Complement the A register and then skip the next instruction if the result is zero | | The complement of minus one is zero. Test for the first needle in a left traverse. | 2 |
| | Compare the A register with | NTM2 | The complement of minus the value of the number of teeth minus one. Test for the first needle in a right traverse. | 2 |
| | Jump to | SWAP | First needle in a left or right traverse. | (2) |
| | Clear the B register. | | Zeroise the B register. | 2 |
| | Store the B register in | SFLAG | Reset the buffer order of use swapped flag. | 2 |
| DØNE | Load the A register with | FLAG | The number of empty buffers is zero initially. | 2 |
| | Skip the next instruction if the A register is not zero. | | Test for empty buffers. | 2 |
| | Jump to | WAIT | No empty buffers. | 2 |
| | Increment memory and then skip the next instruction if the result is zero | FLAG | Decrement the number of empty buffers. FLAG is only tested by the wait loop so this can be done anywhere. A single instruction cannot be interrupted. | 3 |

None of the four actuator routines have been set up at the start of operation.

| Label | Operation | Operand | Comment | Cycles |
|---|---|---|---|---|
| | Clear the B register. | | Clear the B register to hold the output bits. | 2 |
| KNITF | Increment memory and then skip the next instruction if the result is zero | AOOW | AOOW is always large and negative when going left so there is no skip and the word pointer becomes $-N+1=-(N-1)$ to point to the next word left. | 3 |
| | Load the A register with | AOOW | Load this word pointer value. | 2 |
| | Compare the A register with | AOOT | Compare it with the (negative) test address value. | 2 |
| | Jump to subroutine | SETUP | They are equal so set up the actuator routine. | (2) |
| | Jump to | TUCKF | They are unequal so there is no output for this | 2 |

| Label | Operation | Operand | Comment | Cycles |
|---|---|---|---|---|
| AOOMI | A register and memory | MASK1 | Extract the bit pattern in the word using the appropriate masks for this course. | (2) |
| AOOCI | Compare the A register with | NØBT1 | Compare the bit pattern with the knit colour A bit pattern (000) in the appropriate position in the word for this course. | (2) |
| ØPB00 | Add to the B register | BIT0 | The output bit instruction remains in the same location for six buffers. This function starts from needle number 1 at the beginning of a left traverse. All the needles numbered 1 are connected to the first bistable in the first buffer. | ((2)) |
| TUCKF | Increment memory and then skip the next instruction if the result is zero | A01W | Increment the word pointer for this function | 3 |
|  | Load the A register with | A01W | Load this word pointer value | 2 |
|  | Compare the A register with | A01T | Compare it with the test address value | 2 |
|  | Jump to subroutine | SETUP | They are equal so set up the actuator routine | (2) |
|  | Jump to | KNITR | They are unequal so there is no output for this function | 2 |
| A01MI | A register and memory | MASK1 | Extract the bit pattern in the word using the appropriate mask for this course | (2) |
| A01CI | Compare the A register with | BIT2 | Compare the bit pattern with the tuck colour A bit pattern (100) in the appropriate position in the word for this course | (2) |
| ØPB01 | Add to the B register | BIT4 | This actuator starts at needles numbered 25. Needles numbered 25 are connected to the fifth bistable in the first buffer | ((2)) |

The transfer function is not being used

| Label | Operation | Operand | Comment | Cycles |
|---|---|---|---|---|
| KNITR | Increment memory and then skip the next instruction if the result is zero | A03W | Increment the word pointer for this function | 3 |
|  | Load the A register with | A03W | Load this word pointer value | 2 |

| Label | Operation | Operand | Comment | Cycles |
|---|---|---|---|---|
|  | Compare the A register with | AO3T | Compare it with the test address value | 2 |
|  | Jump to subroutine | SETUP | They are equal so set up the actuator routine | (2) |
|  | Jump to | TUCKR | They are unequal so there is no output for this function | 2 |
| AO3MI | A register and memory | MASK1 | Extract the bit pattern in the word using the appropriate mask for this course. Both the front and rear feeds start on the same course | (2) |
| AO3CI | Compare the A register with | BITO | Compare the bit pattern with the knit colour B bit pattern (001) in the appropriate position in the word for this course | (2) |
| ØPBO3 | Add to the B register | BIT2 | This actuator starts at needles numbered 13. Needles numbered 13 are connected to the third bistable in the first buffer | ((2)) |
| TUCKR | Increment memory and then skip the next instruction if the result is zero | AO4W | Increment the word pointer for this function | 3 |
|  | Load the A register with | AO4W | Load this word pointer value | 2 |
|  | Compare the A register with | AO4T | Compare it with the test address value | 2 |
|  | Jump to subroutine | SETUP | They are equal so set up the actuator routine | (2) |
|  | Jump to | ØPBO4+1 | They are unequal so there is no output for this function | 2 |
| AO4MI | A register and memory | MASK1 | Extract the bit pattern in the word using the appropriate mask for this course | (2) |
| AO4CI | Compare the A register with | BO2 | Compare the bit pattern with the tuck colour B bit pattern (101) in the appropriate position in the word for this course | (2) |
| ØPBO4 | Add to the B register | BIT1 | This actuator starts at needles numbered 7. Needles numbered 7 are connected to the second bistable in the first buffer | ((2)) |
|  | Store the B register in the location at the | STP | Store the assembled output word in the appropriate buffer | 3 |

| Label | Operation | Operand | Comment | Cycles |
|---|---|---|---|---|
| | Load the A register with | STP | Load the store pointer | 2 |
| | Increment the A register | | Select the next output buffer | 2 |
| | Compare the A register with | ENDB | Test for the end of the buffers | 2 |
| | Load the A register with | INITP | Start again at the first buffer | 2 |
| | Store the A register in | STP | | 2 |
| | Increment memory and then skip the next instruction if the result is zero | CNT6 | Test for every sixth output. This count has an initial value of -1 if the number of extra teeth is 7. The counter values at the beginning and end of each traverse are -1 if the number of extra teeth is 7 | 3 |
| | Jump to | WAIT | Not a sixth output | 2 |

The instructions which insert bits into the software output buffers have to be swapped around every sixth output. The way in which they are swapped is the same for both left and right traverses. Swapping of the instruction for the spare cam takes place even when the spare cam is not in use in order to access all the needle positions.

| Label | Operation | Operand | Comment | Cycles |
|---|---|---|---|---|
| | Load the A register with | ØPB00 | | (2) |
| | Load the B register with | ØPB01 | | (2) |
| | Store the A register in | ØPB01 | The instruction in ØPB00 is moved to ØPB01 | (2) |
| | Load the A register with | ØPB02 | The fifth output bit instruction has to be used even when the spare function is not used | (2) |
| | Store the B register in | ØPB02 | The instruction in ØPB01 is moved to ØPB02 | (2) |
| | Load the B register with | ØPB03 | | (2) |
| | Store the A register in | ØPB03 | The instruction in ØPB02 is moved to ØPB03 | (2) |
| | Load the A register with | ØPB04 | | (2) |
| | Store the B register in | ØPB04 | The instruction in ØPB03 is moved to ØPB04 | (2) |
| | Store the A register in | ØPB00 | The instruction in ØPB04 is moved to ØPB00 | (2) |
| | Load the A register with | M6 | Minus six | (2) |

| Label | Operation | Operand | Comment | Cycles |
|---|---|---|---|---|
| | Store the A register in | CNT6 | Reset CNT6 | (2) |
| | Jump to | WAIT | | (2) |

One tooth is provided for each carriage position at which a needle selection must be initiated. The teeth are sensed by a sensor to cause an interrupt for each such carriage position. The relative position of the cams is such that the cam which causes the front needle to knit is at needle position X when the spare function cam is at needle position 1. In order to provide the necessary number of interrupts there must be at least 2(X-1) more teeth than needles. There may be several teeth to be traversed before the first cam reaches the selection position for the first needle. Hence actuator output will be suppressed for four or all five cams before said cams reach the first needle position.

| Label | Operation | Operand | Comment | Cycles |
|---|---|---|---|---|
| SETUP | No operation | | This location holds the address of the "Jump" instruction | - |
| | Add to the A register | BIT1 | Add two to the value of the word pointer in the A register to cancel out the unnecessary correction which will be made later | 2 |
| | Store the A register in | ANNW | Store this value temporarily | 2 |
| | Load the A register with | SETUP | Load the return address | 2 |
| | Jump to subroutine | FIND | Calculate the pointer values | 2 |
| | Load the A register with | JSBRS | Load a "Jump to Subroutine-RESET" instruction | 2 |
| | Store the A register at the address in | RESET | Store it in the actuator routine | 3 |
| | Increment memory and then skip if result is zero | RESET | RESET points to the "Jump" instruction | 3 |
| | Load the A register with | TRAVC | Load the traverse counter | 2 |
| | Skip the next instruction if bit 0 of the A register is not zero | | Test for a left or right traverse | 2 |
| | Jump to | FULLP | Left traverse, so we start off with a full left moving pattern repeat. Leave the "Jump" instruction to obtain a "Jump to subroutine-LDIW" instruction later | (2) |

| Label | Operation | Operand | Comment | Cycles |
|---|---|---|---|---|
|  | Load the A register with | JSB | Right traverse. Load a "Jump to subroutine-LDIW" instruction to obtain a "Load the A register with the contents of the address in the A register" instruction later for a right traverse over a left moving (half) pattern | 2 |
|  | Store the A register at the address in | RESET | Store this instruction in the actuator routine | 3 |
|  | Jump to | PARTP | Right traverse, so we start off with a part pattern repeat | 2 |
| RESET | No operation |  | This word holds the address after the "Jump to subroutine RESET" instruction | – |
|  | Store the A register in | ANNW | Save the current word pointer for use in the remainder of the actuator routine | 2 |
|  | Load the A register with | RESET | Load the return address | 2 |
|  | Jump to subroutine | FIND | Calculate the pointer values | 2 |
|  | Increment memory and then skip the next instruction if the result is zero | RESET | RESET points to the return instruction again | 3 |
|  | Load the A register with the contents of the address in | ASTAT | Load the status word for this actuator | 3 |
|  | Inclusive or the A register and memory | MSK1 | 1111111100000000 Extract the number of (half) lines of pattern completed this course while leaving leading ones | 2 |
|  | Increment the A register and then skip the next instruction if the result is not zero |  | Increment that negative number and then test the result | 2 |
|  | Jump to | QEØT | Zero result. The traverse may be complete | 2 |
|  | Increment memory and then skip if the result is zero, using the contents of the address in | ASTAT | The stored value of the number of (half) lines of pattern completed this course was not minus one and cannot therefore overflow, so this instruction only increments the stored value directly | 4 |

| Label | Operation | Operand | Comment | Cycles |
|---|---|---|---|---|
| | Load the B register with | TRAVC | Load the traverse counter | 2 |
| | Skip the next instruction if bit 0 of the B register is not zero | | Test for a left or right traverse | 2 |
| | Jump to | TSTLF | Left traverse | (2) |
| FULLP | Load the A register with | PNSHM | Load the number of stitches in a (half) line of pattern minus one, using a positive value as the test address value is always numerically greater than or equal to the word pointer | 2 |
| | Load the B register with | ANNW | Load the word pointer | 2 |
| | Complement and then increment the B register | | Change the sign of the word pointer as the common stitch does not repeat using this program | 2 |
| | Add to the B register | BIT1 | Add plus two to correct the value of the word pointer | 2 |
| | Increment memory and then skip the next instruction if the result is zero | ASTAT | ASTAT now points to the word pointer for the current actuator | 3 |
| | Store the B register at the address in | ASTAT | Store the new word pointer | 3 |
| | Increment memory and then skip the next instruction if the result is zero | ASTAT | ASTAT now points to the test address value for the current actuator | 3 |
| | Add the B register to the A register | | The test address value equals the word pointer plus either the number of stitches in a (half) line of pattern minus one, or the offset | 2 |
| | Store the A register at the address in | ASTAT | Store the new test address value | 3 |
| | Load the A register with | JSB | Load the A register with a "Jump to subroutine-LDIW" instruction | 2 |
| | Compare the A register with the contents of the address in | RESET | Compare this instruction with the return instruction | 3 |

| Label | Operation | Operand | Comment | Cycles |
|---|---|---|---|---|
| | Load the A register with | LDAI | They are equal, so we have just moved left or entered the pattern. Load the A register with a "Load the A register with the contents of the address held in the A register" instruction | 2 |
| EXIT | Store the A register at the address in | RESET | Store the appropriate instruction in order to go left or right | 3 |
| | Load the A register with the B register | | Restore the new word pointer to the A register for the remainder of the actuator routine | 2 |
| | Load the B register with | ØUTN | Restore the current output word to the B register | 2 |
| | Jump to the address in | RESET | Return to the actuator routine | 3 |

* Left traverse

| Label | Operation | Operand | Comment | Cycles |
|---|---|---|---|---|
| TSTLF | Increment the A register and skip the next instruction if the result is zero | | Test for a bit pattern number equal to minus one | (3) |
| | Jump to | FULLP | Not minus one therefore a full (half) pattern | (2) |

* Minus one. The last (half) pattern in a left traverse is the part pattern.

| Label | Operation | Operand | Comment | Cycles |
|---|---|---|---|---|
| PARTP | Load the A register with | PØFST | Load the offset for a part pattern | 2 |
| | Jump to | FULLP+1 | Rejoin the main routine | 2 |

Test for the end of a traverse

| Label | Operation | Operand | Comment | Cycles |
|---|---|---|---|---|
| QEØT | Load the A register with | ASTAT | Load the address of the current status word | 2 |
| | Compare the A register with | AA4ST | Compare it with the address of the status word for the last cam in operation | 2 |
| | Jump to | YEØT | They are equal so it is the end of a traverse | (2) |

Actuator output must be suppressed for each cam after it has passed the last needle selection position. Each cam including the fifth cam if it is operation therefore requires an interrupt to suppress its actuator output. But because the computer is working ahead of the knitting machine the interrupt which will cause the last actuator output to be suppressed is an interrupt before the last tooth in the traverse. There is therefore no requirement for an extra tooth to cause an interrupt to suppress the last actuator output or initiate the end of traverse routine.

| Label | Operation | Operand | Comment | Cycles |
|---|---|---|---|---|
| STØP | Load the B register with | JSBSU | Load a "Jump to subroutine SETUP" instruction | 2 |

| Label | Operation | Operand | Comment | Cycles |
|---|---|---|---|---|
| | Clear and then complement the A register | | Minus one | 2 |
| | Add to the A register | RESET | The A register points to the "Jump to subroutine" instruction in the actuator routine | 2 |
| | Store the B register at the address held in the A register | | Store the "Jump to subroutine SETUP" instruction | 3 |
| | Add to the A register | JMP5I | Add a "Jump to 5" instruction | 2 |
| | Jump to | EXIT | | 2 |

End of traverse

| Label | Operation | Operand | Comment | Cycles |
|---|---|---|---|---|
| YEØT | Load the A register with | TRAVC | Load the traverse count | 2 |
| | Increment the A register | | Increment the traverse count | 2 |
| | Compare the A register with | ETRVC | Compare its new value with its end of table value. The table does not necessarily contain a number of entries equal to the number of traverses required to repeat with the available colours or to the length of the pattern. It may be of any length of repeat. | 2 |
| | Load the A register with | ITRVC | Equal, so load an initial value for the traverse count of twice the table address | 2 |
| | Store the A register in | TRAVC | Store the new traverse count | 2 |
| | Shift the A register right one bit | | Divide the traverse count by two to obtain the double table entry address | 2 |
| | Load the A register with the contents of the address held in the A register | | Load the double table entry | 3 |
| | Load the B register with | TRAVC | Load the traverse counter | 2 |
| | Skip the next instruction if bit 0 of the B register is not zero | | Test whether the new traverse will be a left or a right traverse | 2 |
| | Rotate the A register 8 bits left | | Move the table entry for the left traverse to the operative position in the A | 2 |

| Label | Operation | Operand | Comment | Cycles |
|---|---|---|---|---|
|  | Store the A register in | ENTRY | Store it temporarily | 2 |
|  | A register and memory | MSK4 | 0000000000001111<br>000000000000LLRR | 2 |
|  | Output the A register to | N+6 | Output the colours to be placed on the left and right hand side feeds | 2 |

Select the colour on the front feed

| Label | Operation | Operand | Comment | Cycles |
|---|---|---|---|---|
|  | Skip the next instruction if bit 0 of the B register is not zero |  | Test for a left or right traverse | 2 |
|  | Shift the A register two bits right |  | 00000000000000LL<br>This is a left traverse so the left feed leads and the colour on the left feed is brought to the right hand side of the A register | 2 |
|  | A register and memory | B01 | B01=0000000000000011<br>A =00000000000000LL; or if this is a right traverse and the right feed leads:<br>000000000000LLRR<br>Extract the colour for the front feed:<br>00000000000000CC | 2 |
|  | Store the A register in | CØLØR | Store it temporarily | 2 |
|  | Clear the A register |  | Zero | 2 |
|  | Store the A register in | ADDN | Initialise ADDN | 2 |
|  | Load the A register with | AOOST | Load the knit front actuator status word | 2 |
|  | Load the B register with | ENTRY | Load the table entry | 2 |
|  | Rotate the B register four bits left and then skip the next instruction if bit 0 of the B register is zero |  | Test the front new course flag | 2 |
|  | Jump to | FNEWC | Yes, new course on front feed | (2) |

No new course on front feed

| Label | Operation | Operand | Comment | Cycles |
|---|---|---|---|---|
|  | Jump to subroutine | NXTCL |  | 2 |

| Label | Operation | Operand | Comment | Cycles |
|---|---|---|---|---|
| FRØNT | Store the A register in | A00ST | Store the initial value of the new knit front actuator status word | 2 |
| | Store the A register in | A01ST | Store the initial value of the new tuck front actuator status word. | 2 |
| | Load the B register with | A0CT | Load a test address value for the front feed. | 2 |
| | Add to the B register | ADDN | Select the correct course. | 2 |
| | Complement and then increment the B register. | | Change the sign to change direction. | 2 |
| | Increment the B register. | | Point to the first stitch in the course. | 2 |
| | Store the B register in | A00T | Store the result as the knit front test address value. | 2 |
| | Store the B register in | A01T | Store the result as the tuck front test address value. | 2 |
| | Add to the B register | METTH | Add minus the number of extra teeth which cause interrupts before the interrupt for the first stitch. | 2 |
| | Store the B register in | A00W | Store the result as the knit front word pointer. | 2 |
| | Add to the B register | MSP01 | Add a negative value which consists of the separation between the knit front word pointer and the tuck front word pointer plus one. | 2 |
| | Store the B register in | A01W | Store the result as the tuck front word pointer. | 2 |
| | Jump to subroutine | GENI | Jump to a subroutine to generate instructions leaving the extract instruction in the B register and the compare instruction in the A register. | 2 |
| | Store the B register in | A00MI | Store the knit front extract instruction. | 2 |
| | Store the B register in | A01MI | Store the tuck front extract instruction. | 2 |
| | Store the A register in | A00CI | Store the knit front compare instruction. | 2 |
| | Add to the A register | P20 | 0000000000010100 Add plus twenty to the instruction so that it accesses | 2 |

| Label | Operation | Operand | Comment | Cycles |
|---|---|---|---|---|
| | Store the A register in | A01CI | Store the tuck front compare instruction | 2 |
| Rear | | | | |
| | Load the A register with | ENTRY | Load the correctly aligned table entry | 2 |
| | Load the B register with | TRAVC | Load the traverse counter | 2 |
| | Skip the next instruction if bit 0 of the B register is zero | | Test for a left or right traverse | 2 |
| | Shift the A register two bits right | | This is a right traverse so the left hand side feed trails. Move the colour on the left hand side feed to bits 0,1 of the A register | 2 |
| | A register and memory | B01 | This is a left traverse so the right hand side feed trails. Extract the colour for the rear feed. | 2 |
| | Store the A register in | CØLØR | Store it temporarily | |
| | Clear the A register | | Zero | 2 |
| | Store the A register in | ADDN | Reset ADDN | 2 |
| | Load the A register with | A03ST | Load the knit rear actuator status word | 2 |
| | Load the B register with | ENTRY | Load the table entry | 2 |
| | Skip the next instruction if the B register is positive | | Test the rear new course flag | 2 |
| | Jump to | RNEWC | Yes, there is a new course on the rear feed | (2) |

There is no new course on the rear feed.

| | | | | |
|---|---|---|---|---|
| | Jump to subroutine | NXTCL | Extract the bit pattern number and calculate the initial value of the status word. | 2 |
| | Jump to | REAR | | 2 |
| FNEWC | Load the B register with | A00W | Load the knit front word pointer. | 2 |
| | Jump to subroutine | NEWC | New course. | 2 |
| | Jump to | FRØNT | | 2 |

| Label | Operation | Operand | Comment | Cycles |
|---|---|---|---|---|
| RNEWC | Load the B register with | A03W | Load the knit rear word pointer. | 2 |
| | Jump to subroutine | NEWC | New course. | 2 |
| REAR | Store the A register in | A03ST | Store the initial value of the new knit rear actuator status word. | 2 |
| | Store the A register in | A04ST | Store the initial value of the new tuck rear actuator status word. | 2 |
| | Load the B register with | A03T | Load a test address value for the rear feed. | 2 |
| | Add to the B register | ADDN | Select the correct course. | 2 |
| | Complement and then increment the B register. | | Change sign to change direction. | 2 |
| | Increment the B register. | | Point to the first stitch in the course. | 2 |
| | Store the B register in | A03T | Store as the knit rear test address value | 2 |
| | Store the B register in | A04T | Store as the tuck rear test address value. | 2 |
| | Add to the B register | MSP03 | Add a negative value which consists of the separation between the knit front word pointer and the knit rear word pointer plus the number of extra teeth which cause interrupts before the interrupt for the first stitch. | 2 |
| | Store the B register in | A03W | Store the result as the knit rear word pointer | 2 |
| | Add to the B register | MSP34 | Add minus the separation between the knit rear word pointer and the tuck rear word pointer | 2 |
| | Store the B register in | A04W | Store the result as the tuck rear word pointer | 2 |
| | Jump to subroutine | GENI | Calculate the extract and compare instructions for the rear actuator routines | 2 |
| | Store the B register in | A03MI | Store the knit rear extract instruction | 2 |
| | Store the B register in | A04MI | Store the tuck rear extract instruction | 2 |
| | Store the A register in | A03CI | Store the knit rear compare instruction | 2 |

| Label | Operation | Operand | Comment | Cycles |
|---|---|---|---|---|
| | Add to the A register | P20 | 0000000000010100<br>Add plus twenty to the instruction so that it accesses a tuck instead of a knit mask | 2 |
| | Store the A register in | A04CI | Store the tuck rear compare instruction | 2 |

Exchange the output instructions in the actuator routines to reverse the order of the operative cams relative to the needle bed and place those cams in their initial positions.

| Label | Operation | Operand | Comment | Cycles |
|---|---|---|---|---|
| | Load the A register with | ØPB01 | Swap the output instructions in the tuck front and rear actuator routines | 2 |
| | Load the B register with | ØPB04 | | 2 |
| | Store the A register in | ØPB04 | | 2 |
| | Store the B register in | ØPB01 | | 2 |
| | Load the A register with | ØPB02 | Swap the output instructions in the spare and knit rear actuator routines. The fifth output instruction must be used to access all the needle positions | 2 |
| | Load the B register with | ØPB03 | | 2 |
| | Store the A register in | ØPB03 | | 2 |
| | Store the B register in | ØPB02 | | 2 |

CNT6 does not have to change in this case but might well have to change in other circumstances.

| Label | Operation | Operand | Comment | Cycles |
|---|---|---|---|---|
| | Jump to | STØP | Return to the main routine in order to store zeros in the appropriate buffer | 2 |

The following instructions alter the order of use of the buffers. All the interrupts for the last traverse must have occurred before these instructions can be executed.

| Label | Operation | Operand | Comment | Cycles |
|---|---|---|---|---|
| SWAP | Load the B register with | SFLAG | Load the swap flag. The swap flag has an initial value of 1 to avoid swapping at the start of operation | 2 |
| | Skip the next instruction if bit 0 of the B register is zero | | Test the swap flag to avoid swapping the buffers twice after a traverse | 2 |
| | Jump to | DØNE | The swap has already been done | 2 |

| Label | Operation | Operand | Comment | Cycles |
|---|---|---|---|---|
| | Load the A register with | BSET1+1 | Swap the order of use of buffer 1 with buffer 6 | (2) |
| | Load the B register with | BSET6+1 | | (2) |
| | Store the A register in | BSET6+1 | | (2) |
| | Store the B register in | BSET1+1 | | (2) |
| | Load the A register with | BSET2+1 | Swap the order of use of buffer 2 with buffer 5 | (2) |
| | Load the B register with | BSET5+1 | | (2) |
| | Store the A register in | BSET5+1 | | (2) |
| | Store the B register in | BSET2+1 | | (2) |
| | Load the A register with | BSET3+1 | Swap the order of use of buffer 3 with buffer 4 | (2) |
| | Load the B register with | BSET4+1 | | (2) |
| | Store the A register in | BSET4+1 | | (2) |
| | Store the B register in | BSET3+1 | | (2) |
| | Increment memory and then skip the next instruction if the result is zero | SFLAG | Set the swap flag | (2) |
| | Jump to | DØNE | | (2) |
| FIND | No operation | | | - |
| | Store the B register in | ØUTN | Store the output word temporarily | 2 |
| | Add to the A register | M1 | RESET must point to the "Jump to subroutine" instruction | 2 |
| | Store the A register in | RESET | Store the value in RESET to allow the use of one return address | 2 |
| | Add to the A register | M2 | Adding minus two makes the A register hold the address of the "Load A register with AnnW" instruction in the actuator routine | 2 |

| Label | Operation | Operand | Comment | Cycles |
|---|---|---|---|---|
| | Load the A register with the contents of the address held in the A register | | Load the "Load A register with AnnW" instruction | 3 |
| | Add to the A register | M1 | Add minus one | 2 |
| | A register and memory | ADDX | Extract the 10 bit address of ANNW-1 | 2 |
| | Store the A register in | ASTAT | Store the status word address for later use | 2 |
| | Jump to the address in | FIND | Return | 3 |

This subroutine caters for a new course.

The relevant actuator status word and word pointer are in the A and B registers respectively.

| Label | Operation | Operand | Comment | Cycles |
|---|---|---|---|---|
| NEWC | No operation | | This location holds the return address | - |
| | Store the A register in | ASW | Store the actuator status word temporarily | 2 |
| | Skip the next instruction if the A register is positive | | Test the actuator status word for up or down U DOOOMMMMNNNNNNNN | 2 |
| | Jump to | UP | Up | (2) |
| | Inclusive or the A register with memory | MSK2 | Down. Extract the bit pattern number 1111000011111111 1111MMMM11111111 | 2 |
| | Rotate the A register 8 bits left | | Align the bit pattern number 111111111111MMMM | 2 |

The nature of the pattern may require only one test value or alternatively LBPAV and RBPAV may be the same value. Consequently two of the following four instructions may be superfluous.

| Label | Operation | Operand | Comment | Cycles |
|---|---|---|---|---|
| | Compare the B register with | LBPAV | Test for the bottom of the pattern on a left traverse | 2 |
| | Jump to | BØP | Possible bottom of pattern | (2) |
| | Compare the B register with | RBPAV | Test for the bottom of the pattern on a right traverse | 2 |
| | Jump to | BØP | Possible bottom of pattern | (2) |
| NØBØP | Increment the A register and then skip the next instruction if the result is zero | | Not the bottom of the pattern. Increment the bit pattern number and then test for the end of word condition | 2 |

| Label | Operation | Operand | Comment | Cycles |
|---|---|---|---|---|
| | Jump to | NØTEW | Not the end of word condition. | (2) |
| | Load the A register with | M5 | Minus five. | 2 |
| DNTST | Skip the next instruction if the B register is positive. | | Test the sign of the word pointer. | 2 |
| | Jump to | NEG | Negative. Jump to NEG to load a negative value of the number of stitches in a (half) line of pattern to increase the numeric value of the word pointer and go down the pattern. | (2) |

Positive, so load a positive value of the number of stitches in a (half) line of pattern to increase the numeric value of the word pointer and go down the pattern.

| Label | Operation | Operand | Comment | Cycles |
|---|---|---|---|---|
| PØS | Load the B register with | PNSLP | Plus the number of stitches in a (half) line of pattern. | 2 |
| NØTEW | Store the A register in | CNTBP | Store the initial value of the bit pattern number temporarily. | 2 |
| | Store the B register in | ADDN | Temporarily store the value to be added to the word pointer to give the next course. | 2 |
| | Load the A register with | ASW | Load the actuator status word.<br>U<br>DOOOMMMMNNNNNNNN | 2 |
| | A register and memory | BIT15 | Extract the UP/DOWN flag. | 2 |
| | Inclusive or the A register and memory | IAST | Merge the initial value in.<br>OOOOOOOOIIIIIIII<br>U<br>DOOOOOOOIIIIIIII | 2 |
| | Rotate the A register 8 bits left. | | IIIIIIIIḆOOOOOOO | 2 |
| | A register and memory | CNTBP | Merge the bit pattern number in.<br>1111111111111MMMM<br>U<br>IIIIIIIIDOOOMMMM | 2 |
| | Rotate the A register 8 bits left. | | U<br>DOOOMMMMIIIIIIII | 2 |
| | Jump to the address in | NEWC | Return. | 3 |

| Label | Operation | Operand | Comment | Cycles |
|---|---|---|---|---|
| UP | Inclusive or the A register and memory | MSK2 | Extract the bit pattern number.<br>1111000011111111<br>1111MMMM11111111 | 2 |
| | Rotate the A register 8 bits left. | | Align the bit pattern number.<br>111111111111MMMM | 2 |
| | Compare the A register with | M5 | Minus five. Test for a possible top of pattern or the end of word condition. | 2 |
| | Jump to | TØP | Equal, so possible top of pattern. | (2) |
| | Add to the A register | M1 | Increase the bit pattern number. | 2 |
| | Jump to | NØTEW | Join the main path. | 2 |

The nature of the pattern may require only one test value or alternatively LTPAV and RTPAV may be the same value. Consequently two of the following four instructions may be superfluous.

| Label | Operation | Operand | Comment | Cycles |
|---|---|---|---|---|
| TØP | Compare the B register with | LTPAV | Test for the top of the pattern on a left traverse. | 2 |
| | Compare the B register with | RTPAV | Test for the top of the pattern on a right traverse. | 2 |
| EØW | Jump to Clear and then complement the A register. | YTØP | Top of pattern. Minus one is the bottom bit pattern number. | (2)<br>2 |
| | Jump to | YTØP | Top of pattern. | (2) |
| | Jump to | UPTST | | (2) |
| YTØP | Load the A register with | ASW | Load the status word. | 2 |
| | Exclusive or the A register and memory | BIT15 | We came up so the status word is negative and bit 15 is one. Bit 15 of the A register is the only modulus two sum and thus changes to zero for a down movement. | 2 |
| | Store the A register in | ASW | Store the new status word | 2 |
| | Load the A register with | M4 | Load minus four as the next line must be the second line in the pattern | 2 |
| | Jump to | NØTEW | Return to the main routine | 2 |

Test for the bottom of the pattern

| Label | Operation | Operand | Comment | Cycles |
|---|---|---|---|---|
| BØP | Compare the A register with | EØPCV | Compare the bit pattern number with the one and only bit pattern number at the bottom of the pattern | 2 |

| Label | Operation | Operand | Comment | Cycles |
|---|---|---|---|---|
| | Jump to | YBØP | Equal | 2 |
| | Jump to | NØBØP | Different, so not the bottom of the pattern | (2) |

Bottom of pattern

| Label | Operation | Operand | Comment | Cycles |
|---|---|---|---|---|
| YBØP | Load the A register with | ASW | Load the actuator status word | 2 |
| | Inclusive or the A register with memory | BIT15 | We came down so the actuator status word is positive. BIT15 merges in with the actuator status word to change from down to up | 2 |
| | Store the A register in | ASW | Store the new actuator status word | 2 |

If the bottom line in the pattern is the only line stored in the last word, we need the next line of words up as the common line never repeats.

| Label | Operation | Operand | Comment | Cycles |
|---|---|---|---|---|
| | Load the A register with | ICNTB | Load the initial value of the bit pattern number at the bottom of pattern. In the case described above the value is -1 (The corresponding EØPCV=-5) | 2 |
| UPTST | Skip the next instruction if the B register is positive | | Test the sign of the word pointer | 2 |
| | Jump to | PØS | Negative. Jump to PØS to load a positive value of the number of stitches in a (half) line of pattern to reduce the numeric value of the word pointer and go back up the pattern | (2) |

Positive, so load a negative value of the number of stitches in a (half) line of pattern to reduce the numeric value of the word pointer and go back up the pattern.

| Label | Operation | Operand | Comment | Cycles |
|---|---|---|---|---|
| NEG | Load the B register with | MNSLP | Minus the number of stitches in a (half) line of pattern | 2 |
| | Jump to | NØTEW | | 2 |

This subroutine generates extract and compare instructions for both a knit and a tuck actuator routine

| Label | Operation | Operand | Comment | Cycles |
|---|---|---|---|---|
| GENI | No operation | | This location holds the return address | - |
| | Load the B register with | CNTBP | Load the bit pattern number | 2 |
| | Add to the B register | IMASK | Use the new bit pattern number to modify the "A register and memory MASK5+1" instruction leaving the result in the B register on exit from this subroutine | 2 |

| Label | Operation | Operand | Comment | Cycles |
|---|---|---|---|---|
| | Load the A register with | CØLØR | Load the colour on this feed | 2 |
| | Add to the A register | ISEL | The A register holds the colour. Use it to make up an instruction to select the correct set of masks for this colour | 2 |
| | Store the A register in | I | Store that instruction for later use | 2 |
| | Load the A register with | CNTBP | Load the bit pattern number to modify the compare instruction to make it select the correct bit patterns in the words | 2 |
| I | No operation | | Add the appropriate compare instruction leaving the result in the A register | 2 |
| | Jump to the address in | GENI | Return | 3 |
| NXTCL | No operation | | This location holds the return address | - |
| | Store the A register in | ASW | Store the status word in the A register temporarily<br>U<br>DOOOMMMM00000000 | 2 |
| | Inclusive or the A register with memory | MSK2 | 1111000011111111<br>Extract the bit pattern number leaving ones<br>1111MMMM11111111 | 2 |
| | Rotate the A register 8 bits left | | Align the bit pattern number<br>111111111111MMMM | 2 |
| | Store the A register in | CNTBP | Store the bit pattern number temporarily | 2 |
| | Load the A register with | ASW | Restore the status word to the A register | 2 |
| | A register and memory | MSK3 | 1000111100000000<br>Eliminate the count of half patterns<br>U<br>DOOOMMMM00000000 | 2 |
| | Inclusive or the A register with memory | IAST | 0000000IIIIIIII<br>Merge the initial value in<br>U<br>DOOOMMMMIIIIIIII | 2 |
| | Jump to the address in | NXTCL | Return | 3 |

The following program listing is an example of program A rewritten in the Assembler Language of the Data General Corporation NOVA 800 stored program digital computer. The program is used for the control of a Moratronik Mark 2 circular knitting machine with 1680 needles producing a pattern made up of contiguous repeated areas arranged as a matrix whose blocks store information concerning single face stitches. The repeated areas have both vertical and horizontal axes of symmetry which run through stitches so that a common stitch does not repeat adjacent to itself. The pattern has five colours. The lines of pattern are stored in their order of use and the dimensions of the half pattern stored are 70 by 70 stitches. The program caters for 24 stitches of left moving part pattern at the start of each course. The program includes software buffers.

The RESET routine can cater for up to eight colours and any size of pattern and may be shared by more than one machine.

```
       002000              .LOC    2000
02000  062677   START:     IORST
                ; BUFFERS ARE FILLED BEFORE INTERRUPTS ARE ALLOWED
02001  020432              LDA     0,IEMPT
02002  040432              STA     0,EMPTY
02003  020432              LDA     0,ABBM1
02004  040021              STA     0,21
02005  020430   RSTPT:     LDA     0,ABBM1
02006  040020              STA     0,20
02007  024425   WAIT:      LDA     1,EMPTY
02010  125004              MOV     1,1,SZR
02011  000402              JMP     .+2
02012  004411              JSR     AHALT
02013  002424              JMP     @AACRS
02014  014420              DSZ     EMPTY
02015  000401              JMP     .+1
02016  020020              LDA     0,20
02017  024417              LDA     1,AENDB
02020  106414              SUB#    0,1,SZR
02021  000766              JMP     WAIT
02022  000763              JMP     RSTPT
                ; ENABLE INTERRUPTS FROM TEXTILE MACHINE
02023  020406   AHALT:     LDA     0,KMASK
02024  062177              DOBS    0,CPU
02025  063077              HALT    ; START THE KM
02026  020404              LDA     0,JMPM3
02027  041777              STA     0,-1,3
02030  001774              JMP     -4,3
02031  177775   KMASK:     177775
02032  000775   JMPM3:     JMP     -3,1

02033  000006   IEMPT:     6
02034  000000   EMPTY:     0
02035  000227   ABBM1:     227
02036  000321   AENDB:     321

02037  001000   AACRS:     1000
       000001              .LOC    1
00001  002070              INTRP
       002070              .LOC    2070
02070  063602   INTRP:     SKPDN   2
02071  063077              HALT
02072  040435              STA     0,KMSAV
02073  044435              STA     1,KMSAV+1
02074  050435              STA     2,KMSAV+2
02075  054435              STA     3,KMSAV+3
02076  101200              MOVR    0,0
02077  040434              STA     0,KMSAV+4
02100  020000              LDA     0,0
02101  040433              STA     0,KMSAV+5
02102  022021              LDA     0,@21
02103  061002              DOA     0,2
02104  022021              LDA     0,@21
02105  062002              DOB     0,2
02106  022021              LDA     0,@21
```

```
02107 063102            DOCS     0,2              000075            .LOC    75
02110 020021            LDA      0,21       00075 000007  M111:    7
02111 024725            LDA      1,AENDB    00076 000070           70
02112 106414            SUB#     0,1,SZR    00077 000700           700
02113 000403            JMP      .+3        00100 007000           7000
02114 020721            LDA      0,ABBM1    00101 070000           70000
02115 040021            STA      0,21       00102 000006  M110:    6
02116 010716            ISZ      EMPTY      00103 000060           60
02117 020410  KMSDM:    LDA      0,KMSAV    00104 000600           600
02120 024410            LDA      1,KMSAV+1  00105 006000           6000
02121 030410            LDA      2,KMSAV+2  00106 060000           60000
02122 034410            LDA      3,KMSAV+3  00107 000002  M010:    2
02123 020410            LDA      0,KMSAV+4  00110 000020           20
02124 101100            MOVL     0,0        00111 000200           200
02125 060177            INTEN               00112 002000           2000
02126 002406            JMP      @KMSAV+5   00113 020000           20000
      002136  KMSAV:    .LOC .+7             00114 000001  M001:    1
              ;30 ACTUATOR ROUTINES          00115 000010           10
      001000            .LOC     1000        00116 000100           100
01000 102400            SUB      0,0         00117 001000           1000
01001 014403            DSZ      A00W        00120 010000           10000
01002 030075            LDA      2,M111      00121 000003  M011:    3
01003 006065            JSR      @ARC00      00122 000030           30
01004 003030  A00W:     3030                 00123 000300           300
01005 000030  A00C:     30                   00124 003000           3000
01006 163400  A00ST:    163400               00125 030000           30000
01007 034147            LDA      3,BIT0            000130           .LOC    130
01010 163000            ADD      3,0         00130 000001  BIT15:   1
                                             00131 000002  BIT14:   2
01011 014403            DSZ      A01W        00132 000004  BIT13:   4
01012 030102            LDA      2,M110      00133 000010  BIT12:   10
01013 006066            JSR      @ARC01      00134 000020  BIT11:   20
01014 003165  A01W:     3165                 00135 000040  BIT10:   40
01015 000057  A01C:     57                   00136 000100  BIT9:    100
01016 177401  A01ST:    177401               00137 000200  BIT8:    200
01017 034146            LDA      3,BIT1      00140 000400  BIT7:    400
01020 163000            ADD      3,0         00141 001000  BIT6:    1000
      000140            .BLK     140         00142 002000  BIT5:    2000
                                             00143 004000  BIT4:    4000
01161 042020            STA      0,@20       00144 010000  BIT3:    10000
01162 102400            SUB      0,0         00145 020000  BIT2:    20000
                                             00146 040000  BIT1:    40000
      000150            .BLK     150         00147 100000  BIT0:    100000
                                                   000400           .LOC    400
01333 042020            STA      0,@20       00400 027400  RC00:    LDA     1,@0,3
01334 102400            SUB      0,0         00401 015401           DSZ     1,3
                                             00402 000403           JMP     .+3
      000020            .BLK     20          00403 054126           STA     3,ACSV3
                                             00404 006127           JSR     @ARST
01355 010403            ISZ      A34W        00405 147404           AND     2,1,SZR
01356 030122            LDA      2,M011+1    00406 001405           JMP     5,3
01357 006071            JSR      @ARC04      00407 001403           JMP     3,3
01360 003023  A34W:     3023                 00410 027400  RC01:    LDA     1,@0,3
01361 000062  A34C:     62                   00411 015401           DSZ     1,3
01362 164003  A34ST:    164003               00412 000403           JMP     .+3
01363 034145            LDA      3,BIT2      00413 054126           STA     3,ACSV3
01364 163000            ADD      3,0         00414 006127           JSR     @ARST
01365 042020            STA      0,@20       00415 133414           AND#    1,2,SZR
01366 002401            JMP      @ARWT       00416 001405           JMP     5,3
                                             00417 151220           MOVZR   2,2
01367 002014  ARWT:     2014                 00420 147405           AND     2,1,SNR
      000065            .LOC     65          00421 001405           JMP     5,3
00065 000400  ARC00:    400                  00422 001403           JMP     3,3
00066 000410  ARC01:    410                  00423 027400  RC02:    LDA     1,@0,3
00067 000423  ARC02:    423                  00424 015401           DSZ     1,3
00070 000437  ARC03:    437                  00425 000403           JMP     .+3
00071 000452  ARC04:    452                  00426 054126           STA     3,ACSV3
```

```
00427 006127          JSR    @ARST
00430 133624          ANDZR  1,2,SZR
00431 133414          AND#   1,2,SZR
00432 001405          JMP    5,3
00433 153100          ADDL   2,2
00434 133404          AND    1,2,SZR
00435 001405          JMP    5,3
00436 001403          JMP    3,3
00437 027400  RC03:   LDA    1,00,3
00440 015401          DSZ    1,3
00441 000403          JMP    .+3
00442 054126          STA    3,ACSV3
00443 006127          JSR    @ARST
00444 133525          ANDZL  1,2,SNR
00445 001405          JMP    5,3
00446 133524          ANDZL  1,2,SZR
00447 133404          AND    1,2,SZR
00450 001405          JMP    5,3
00451 001403          JMP    3,3
00452 027400  RC04:   LDA    1,00,3
00453 015401          DSZ    1,3
00454 000403          JMP    .+3
00455 054126          STA    3,ACSV3
00456 006127          JSR    @ARST
00457 147414          AND#   2,1,SZR
00460 001405          JMP    5,3
00461 151120          MOVZL  2,2
00462 147405          AND    2,1,SNR
00463 001405          JMP    5,3
00464 001403          JMP    3,3
      000126          .LOC   126
00126 000000  ACSV3:  0
00127 000540  ARST:   540
      000540          .LOC   540
00540 040532  RESET:  STA    0,RSSV0
00541 044532          STA    1,RSSV1
00542 050532          STA    2,RSSV2
00543 054532          STA    3,RSSV3
00544 020534          LDA    0,LEFT
00545 034126          LDA    3,ACSV3
00546 025402          LDA    1,2,3
00547 030527          LDA    2,BIT7
00550 147022          ADDZ   2,1,SZC
00551 000414          JMP    EOC
00552 045402          STA    1,2,3
00553 031775          LDA    2,-3,3
00554 112405          SUB    0,2,SNR
00555 020524          LDA    0,RIGHT
00556 041775          STA    0,-3,3
00557 020524          LDA    0,NSHM1
00560 041401  EXIT:   STA    0,1,3
00561 020511          LDA    0,RSSV0
00562 024511          LDA    1,RSSV1
00563 030511          LDA    2,RSSV2
00564 002511          JMP    @RSSV3
00565 041775  EOC:    STA    0,-3,3
00566 021400          LDA    0,0,3
00567 030523          LDA    2,OFSET
00570 143000          ADD    2,0
00571 125220          MOVZR  1,1
00572 031776          LDA    2,-2,3
00573 132400          SUB    1,2
00574 051776          STA    2,-2,3
00575 030507          LDA    2,WPIN
00576 034507          LDA    3,BPNIN
00577 125003          MOV    1,1,SNC
00600 000434          JMP    UP
00601 143000  DOWN:   ADD    2,0
00602 167000          ADD    3,1
00603 034474          LDA    3,P5
00604 166433          SUBZ#  3,1,SNC
00605 000404          JMP    .+4
00606 166420          SUBZ   3,1
00607 030473          LDA    2,NSH
00610 143000          ADD    2,0
00611 030475          LDA    2,ABOTW
00612 034475          LDA    3,BOTBP
00613 136400          SUB    1,3
00614 142433          SUBZ#  2,0,SNC
00615 000440          JMP    EXDN
00616 112404          SUB    0,2,SZR
00617 000403          JMP    BOP
00620 175133          MOVZL# 3,3,SNC
00621 000434          JMP    EXDN
00622 024455  BOP:    LDA    1,P5
00623 136432          SUBZ#  1,3,SZC
00624 000404          JMP    EXBOP
00625 136400          SUB    1,3
00626 020454          LDA    0,NSH
00627 113000          ADD    0,2
00630 020456  EXBOP:  LDA    0,ABOTW
00631 024456          LDA    1,BOTBP
00632 150400          NEG    2,2
00633 174400          NEG    3,3
00634 142400  UP:     SUB    2,0
00635 166400          SUB    3,1
00636 034441          LDA    3,P5
00637 167033          ADDZ#  3,1,SNC
00640 000404          JMP    .+4
00641 167000          ADD    3,1
00642 030440          LDA    2,NSH
00643 142400          SUB    2,0
00644 030444          LDA    2,ATOPW
00645 112023          ADCZ   0,2,SNC
00646 000411          JMP    EXUP
00647 020434  TOP:    LDA    0,NSHM1
00650 112400          SUB    0,2
00651 020437          LDA    0,ATOPW
00652 136400          SUB    1,3
00653 126420          SUBZ   1,1
00654 000725          JMP    DOWN
00655 131120  EXDN:   MOVZL  1,2
00656 000402          JMP    .+2
00657 131140  EXUP:   MOVZL  1,2
00660 034126          LDA    3,ACSV3
00661 041400          STA    0,0,3
00662 021776          LDA    0,-2,3
00663 123000          ADD    1,0
00664 041776          STA    0,-2,3
00665 020424          LDA    0,MNHP
00666 143000          ADD    2,0
00667 041402          STA    0,2,3
00670 020422          LDA    0,OFSET
00671 000667          JMP    EXIT
00672 000000  RSSV0:  0
00673 000000  RSSV1:  0
00674 000000  RSSV2:  0
00675 000000  RSSV3:  0
00676 000400  BIT7:   400
00677 000005  P5:     5
00700 014403  LEFT:   014403
00701 010403  RIGHT:  010403
              ;PATTERN PARAMETERS
00702 000106  NSH:    106
00703 000105  NSHM1:  105
```

```
00704 000106 WPIN:    106
00705 000001 BPNIN:   1
00706 004646 ABOTW:   4646
00707 000004 BOTBP:   4
00710 003030 ATOPW:   3030
00711 163400 MNHP:    163400
00712 000030 OFSET:   30
```

What is claimed is:

1. The combination comprising a textile material producing machine including a plurality of electromechanical actuator means for determining the production of the material, a stored program digital computer including logic unit means, random access storage means in which is stored information relating to the control of the actuator means to determine the material to be produced by the machine and also a control program, at least one buffer storage means coupled to at least one of said actuator means for receiving the information supplied by the computer, storing the information and supplying it to said actuator means, and means including said control program for operating said logic unit means to supply information on a selective basis to at least one of said buffer storage means at a particular point or points in the cycle of operation of the machine according to its progress.

2. The combination comprising a textile material producing machine, including a plurality of electromechanical actuator means for determining the production of the material, a stored program digital computer including logic unit means, random access storage means in which is stored information relating to the control of the actuator means to determine the material to be produced by the machine and also a control program, a plurality of buffer storage means each comprising a plurality of stages, each of said buffer storage means being coupled to at least two of said actuator means for receiving information supplied by the logic unit means, storing the information and supplying it to its respectively coupled actuator means, and means including said control program for operating said logic unit means to supply distributed information to one or more selected buffer storage means at a particular point or points in the cycle of operation of the machine according to its progress.

3. Apparatus according to claim 2 wherein there are a plurality of said buffer storage means, said logic unit means operating to supply information to only one of said buffer storage means at each particular point in the cycle of operation of the machine.

4. Apparatus according to claim 3 wherein each buffer storage means is associated with at least one actuator means forming a set, the operation phases of the actuator means of at least two sets overlapping each other in time, said logic unit means operating each buffer storage means to store information for a period of time related to the operation phase of the actuator means of its corresponding set.

5. Apparatus according to claim 3 wherein said logic unit operates to supply information to the buffer storage means in a particular order according to the progress of the operation of the machine.

6. Apparatus according to claim 4 wherein said logic unit operates to supply information to the buffer storage means in a particular order according to the progress of the operation of the machine.

7. Apparatus according to claim 3 wherein the logic unit means operates to supply information to said buffer storage means in a certain order which varies depending on the mode of operation of the machine.

8. Apparatus according to claim 4 wherein the logic unit means operates to supply information to said buffer storage means in a certain order which varies depending on the mode of operation of the machine.

9. Apparatus according to claim 5 wherein the logic unit means operates to supply information to said buffer storage means in a certain order which varies depending on the mode of operation of the machine.

10. Apparatus according to claim 6 wherein the logic unit means operates to supply information to said buffer storage means in a certain order which varies depending on the mode of operation of the machine.

11. Apparatus according to claim 2 wherein said logic unit means operates to distribute information to said buffer storage means in a mode which varies depending on the mode of operation of the machine.

12. Apparatus according to claim 3 wherein said logic unit means operates to distribute information to said buffer storage means in a mode which varies depending on the mode of operation of the machine.

13. Apparatus according to claim 4 wherein said logic unit means operates to distribute information to said buffer storage means in a mode which varies depending on the mode of operation of the machine.

14. Apparatus according to claim 5 wherein said logic unit means operates to distribute information to said buffer storage means in a mode which varies depending on the mode of operation of the machine.

15. Apparatus according to claim 6 wherein said logic unit means operates to distribute information to said buffer storage means in a mode which varies depending on the mode of operation of the machine.

16. Apparatus according to claim 7 wherein said logic unit means operates to distribute information to said buffer storage means in a mode which varies depending on the mode of operation of the machine.

17. Apparatus according to claim 8 wherein said logic unit means operates to distribute information to said buffer storage means in a mode which varies depending on the mode of operation of the machine.

18. Apparatus according to claim 9 wherein said logic unit means operates to distribute information to said buffer storage means in a mode which varies depending on the mode of operation of the machine.

19. Apparatus according to claim 8 wherein said logic unit means operates to distribute information to said buffer storage means in a mode which varies depending on the mode of operation of the machine.

20. Apparatus according to claim 2 wherein the machine is a knitting machine having a plurality of needles, each needle of the machine being associated with a respective actuator means and further comprising means for producing signals indicating said particular point or points in the cycle of operation of the machine, the logic unit means being responsive to said signals.

21. Apparatus according to claim 20 wherein the needles of the machine and their associated actuator means are divided into groups.

22. Apparatus according to claim 21 wherein one actuator means of each group is associated exclusively with one stage of a said buffer storage means.

23. Apparatus according to claim 22 wherein the needles in each group are disposed adjacent to one another.

24. Apparatus according to claim 23 wherein there are N buffer storage means each with a sufficient number of stages that the $i^{th}$ stage of the $j^{th}$ hardware buffer is associated with the $[N(i-1)+j]^{th}$ needle in a group.

25. The combination comprising a textile material producing machine, including a plurality of electromechanical actuator means for determining the production of the material, a stored program digital computer including logic unit means, random access storage means in which is stored information relating to the control of the actuator means to determine the material to be produced by the machine and also a control program, a plurality of buffer storage means each of which is coupled to at least one of said actuator means for receiving information supplied by the logic unit means, storing the information and supplying it to said actuator means, and means including said control program for operating said logic unit means to supply information to one or more selected buffer storage means at a particular point or points in the cycle of operation of the machine according to its progress.

26. Apparatus according to claim 25 wherein there are a plurality of said buffer storage means, said logic unit means operating to supply information to only one of said buffer storage means at each particular point in the cycle of operation of the machine.

27. Apparatus according to claim 26 wherein each buffer storage means is associated with at least one actuator means forming a set, the operation phases of the actuator means of at least two sets overlapping each other in time, said logic unit means operating each buffer storage means to store information for a period of time related to the operation phase of the actuator means of its corresponding set.

28. Apparatus according to claim 26 wherein said logic unit means operates to supply information to the buffer storage means in a particular order according to the progress of the operation of the machine.

29. Apparatus according to claim 27 wherein said logic unit means operates to supply information to the buffer storage means in a particular order according to the progress of the operation of the machine.

30. Apparatus according to claim 25 wherein each buffer storage means comprises a plurality of stages of a predetermined number.

31. Apparatus according to claim 26 wherein each buffer storage means comprises a plurality of stages of a predetermined number.

32. Apparatus according to claim 27 wherein each buffer storage means comprises a plurality of stages of a predetermined number.

33. Apparatus according to claim 28 wherein each buffer storage means comprises a plurality of stages of a predetermined number.

34. Apparatus according to claim 29 wherein each buffer storage means comprises a plurality of stages of a predetermined number.

35. Apparatus according to claim 25 wherein the machine is a circular knitting machine, and further comprising means for producing signals indicating said particular point or points in the cycle of operation of the machine, the logic unit means being responsive to said signals.

36. Apparatus according to claim 35 wherein the circular knitting machine includes a stack of actuator means at each thread feed.

37. Apparatus according to subclaim 36 wherein each actuator means in a stack lies vertically above and/or below the remaining actuator means in the stack.

38. Apparatus according to claim 36 wherein there are n actuator means in each stack and the $m$th actuator means in a certain stack controls needles designated $m$, $n + m$, $2n + m$, etc.

39. Apparatus according to claim 38 wherein all those actuator means requiring information at the same point in time are associated with the same buffer storage means.

40. Apparatus according to claim 37 wherein there are n actuator means in each stack and the $m^{th}$ actuator means in a certain stack controls needles designated $m$, $n + m$, $2n + m$, etc.

41. Apparatus according to claim 40 wherein all those actuator means which require data at the same point in time are associated with the same buffer storage means.

42. The combination comprising a textile material producing machine, including a plurality of electromechanical actuator means for determining the production of the material, a stored program digital computer including logic unit means, random access storage means in which is stored information relating to the control of the actuator means to determine the material to be produced by the machine and also a control program, buffer storage means comprising a plurality of stages, said buffer storage means being coupled to said actuator means for receiving information supplied by the logic unit means, storing the information and supplying it to said actuator means, and means including said control program for operating said logic unit means to supply distributed information to the buffer storage means at a particular point or points in the cycle of operation of the machine according to its progress.

43. Apparatus according to claim 42 wherein the machine is a warp knitting machine further comprising means for producing signals indicating said particular point or points in the cycle of operation of the machine, the logic unit means being responsive to said signals.

44. Apparatus according to claim 43 wherein the warp knitting machine includes at least one jacquard guide bar the jacquard yarn guides of which are associated each with one actuator means.

45. Apparatus according to claim 44 wherein the yarn guides of the machine and their associated actuator means are divided into groups.

46. Apparatus according to claim 45 wherein one actuator means in each group is associated exclusively with one stage of a buffer storage means.

47. Apparatus according to claim 46 wherein the yarn guides in each group are adjacent to one another.

48. Apparatus according to claim 47 wherein the $n^{th}$ yarn guide in each group is associated with the $n^{th}$ stage in the buffer storage means.

49. Apparatus according to claim 45 wherein the machine includes a plurality of jacquard guide bars each of which is associated with one buffer storage means.

50. Apparatus according to claim 46 including a plurality of jacquard guide bars each of which is associated with one buffer.

51. Apparatus according to claim 47 including a plurality of jacquard guide bars each of which is associated with one buffer.

52. Apparatus according to claim 48 including a plurality of jacquard guide bars each of which is associated with one buffer.

53. Apparatus according to claim 25 wherein the random access storage means includes software buffer storage means in which information to be supplied to said buffer storage means is stored.

54. Apparatus according to claim 53 wherein each software buffer storage means is uniquely associated with each of said buffer storage means.

* * * * *